United States Patent
Greenfield et al.

(10) Patent No.: US 12,371,228 B2
(45) Date of Patent: Jul. 29, 2025

(54) REUSABLE MAILER BAG TO PLUSH TOY

(71) Applicant: Green Trek LLC, Merrick, NY (US)

(72) Inventors: Michael Greenfield, Merrick, NY (US); Kenneth Greenfield, Merrick, NY (US); John Kraljic, Riverhead, NY (US)

(73) Assignee: Green Trek LLC, Merrick, NY (US)

( * ) Notice: Subject to any disclaimer, the term of this patent is extended or adjusted under 35 U.S.C. 154(b) by 0 days.

(21) Appl. No.: 18/642,659

(22) Filed: Apr. 22, 2024

(65) Prior Publication Data

US 2024/0367861 A1  Nov. 7, 2024

Related U.S. Application Data

(60) Provisional application No. 63/572,890, filed on Apr. 1, 2024, provisional application No. 63/561,659, filed
(Continued)

(51) Int. Cl.
*B65D 27/38* (2006.01)
*B65D 27/14* (2006.01)
(Continued)

(52) U.S. Cl.
CPC ............ *B65D 27/38* (2013.01); *B65D 27/14* (2013.01); *B65D 33/18* (2013.01); *B65D 33/2508* (2013.01)

(58) Field of Classification Search
CPC ........ B65D 27/38; B65D 27/14; B65D 33/18; B65D 33/2508
See application file for complete search history.

(56) References Cited

U.S. PATENT DOCUMENTS

| 1,537,956 A | 5/1925 | McNally |
| 2,103,840 A | 12/1937 | Bauer |

(Continued)

FOREIGN PATENT DOCUMENTS

| GB | 2433729 A | 7/2007 |
| JP | 2023041572 A | 3/2023 |
| WO | 2022180507 A1 | 9/2022 |

OTHER PUBLICATIONS

International Search Report PCT/US2023/036042, dated Feb. 8, 2024, 14pp.
(Continued)

*Primary Examiner* — Derek J Battisti
(74) *Attorney, Agent, or Firm* — Carter, DeLuca & Farrell LLP

(57) ABSTRACT

A reusable mailer includes a carrying volume having a top opening configured to receive a package therein, the carrying volume defined by an outer and inner peripheral surfaces, the inner peripheral surface covered by a plush material. Protective tape having a first portion is configured to removably adhere to a rear portion of the outer surface and is configured to extend across the top opening and a second portion is configured to removably adhere to a front portion of the outer surface to close the carrying volume and configure the carrying volume for mailing purposes. After mailing, the protective tape is selectively removable from the front and rear surfaces to expose the package. Once the package is removed from the carrying volume, the carrying volume is selectively inverted to transition and expose the plush material on the inner peripheral surface.

5 Claims, 39 Drawing Sheets

Related U.S. Application Data on Mar. 5, 2024, provisional application No. 63/533,224, filed on Aug. 17, 2023, provisional application No. 63/463,849, filed on May 3, 2023.

(51) Int. Cl.
  *B65D 33/18* (2006.01)
  *B65D 33/25* (2006.01)

(56) References Cited

U.S. PATENT DOCUMENTS

| | | | |
|---|---|---|---|
| 2,197,490 A | 4/1940 | Norman | |
| 2,307,902 A | 1/1943 | Vogt | |
| 3,138,985 A | 6/1964 | Mills | |
| 3,784,087 A | 1/1974 | Styers | |
| 4,243,171 A | 1/1981 | Prin | |
| 4,421,150 A * | 12/1983 | Masters | A45C 11/22 206/811 |
| 4,729,507 A | 3/1988 | Kim | |
| 4,738,391 A | 4/1988 | Wiseman | |
| 4,818,120 A * | 4/1989 | Addiego | B65D 33/30 383/89 |
| 5,115,528 A * | 5/1992 | Lamle | A63H 3/003 5/636 |
| 5,370,461 A | 12/1994 | Smith et al. | |
| 5,429,576 A | 7/1995 | Doderer-Winkler | |
| 5,492,271 A | 2/1996 | Chereton | |
| 5,503,328 A | 4/1996 | Roccaforte | |
| 5,975,303 A * | 11/1999 | Morell | B65D 5/36 206/453 |
| 6,732,494 B1 | 5/2004 | Nolte | |
| 6,821,018 B1 | 11/2004 | Denko | |
| 7,581,886 B2 * | 9/2009 | Nitti | A45C 3/004 383/14 |
| 7,704,577 B2 | 4/2010 | Shoda | |
| 7,891,490 B2 | 2/2011 | Raming | |
| 8,033,447 B2 | 10/2011 | Katoh | |
| 8,287,188 B2 | 10/2012 | Hoyord et al. | |
| 8,448,828 B2 | 5/2013 | Nitti | |
| 8,590,774 B1 | 11/2013 | Sauer | |
| 8,602,651 B2 | 12/2013 | Nitti | |
| 10,011,394 B2 | 7/2018 | Greenwood et al. | |
| 11,851,245 B1 * | 12/2023 | Phillips | B65D 33/2541 |
| 2002/0164088 A1 | 11/2002 | Collins | |
| 2003/0183680 A1 | 10/2003 | Makofsky | |
| 2008/0164265 A1 * | 7/2008 | Conforti | B65D 81/3823 220/592.2 |
| 2009/0266722 A1 | 10/2009 | Rogers | |
| 2009/0294499 A1 * | 12/2009 | McKinney | B43L 1/00 224/153 |
| 2009/0304310 A1 | 12/2009 | Nitti | |
| 2010/0051497 A1 | 3/2010 | Meers | |
| 2010/0089958 A1 * | 4/2010 | Flagel | A47G 9/062 224/576 |
| 2010/0155279 A1 | 6/2010 | Wood | |
| 2010/0172603 A1 | 7/2010 | Lin | |
| 2010/0209019 A1 | 8/2010 | Confoy et al. | |
| 2011/0155794 A1 | 6/2011 | Russell | |
| 2012/0145773 A1 | 6/2012 | Petkovsek | |
| 2012/0189228 A1 | 7/2012 | Grossman | |
| 2013/0075284 A1 | 3/2013 | Yee | |
| 2014/0209332 A1 | 7/2014 | Burkett | |
| 2014/0220851 A1 * | 8/2014 | Bennett | A63H 33/003 446/72 |
| 2016/0039574 A1 * | 2/2016 | Barlas | B65D 27/06 206/459.5 |
| 2016/0088953 A1 * | 3/2016 | Benezri | A45F 4/00 5/655 |
| 2016/0228780 A1 | 8/2016 | Jabbour, Jr. et al. | |
| 2018/0305088 A1 | 10/2018 | Greenwood et al. | |
| 2020/0156852 A1 * | 5/2020 | Veiseh | B65D 81/3816 |

OTHER PUBLICATIONS

International Search Report PCT/US2024/025727, dated Aug. 19, 2024, 16pp.

\* cited by examiner

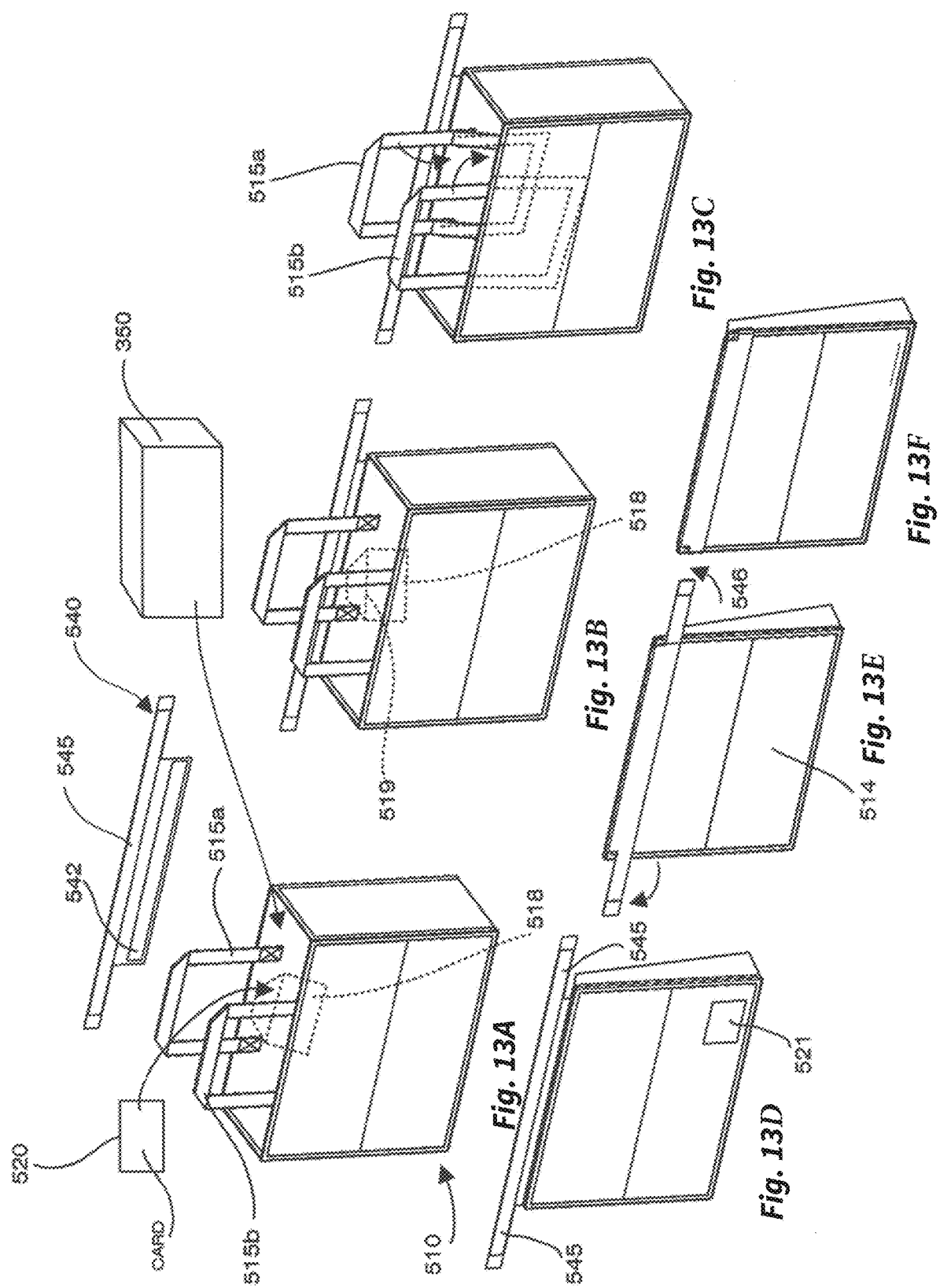

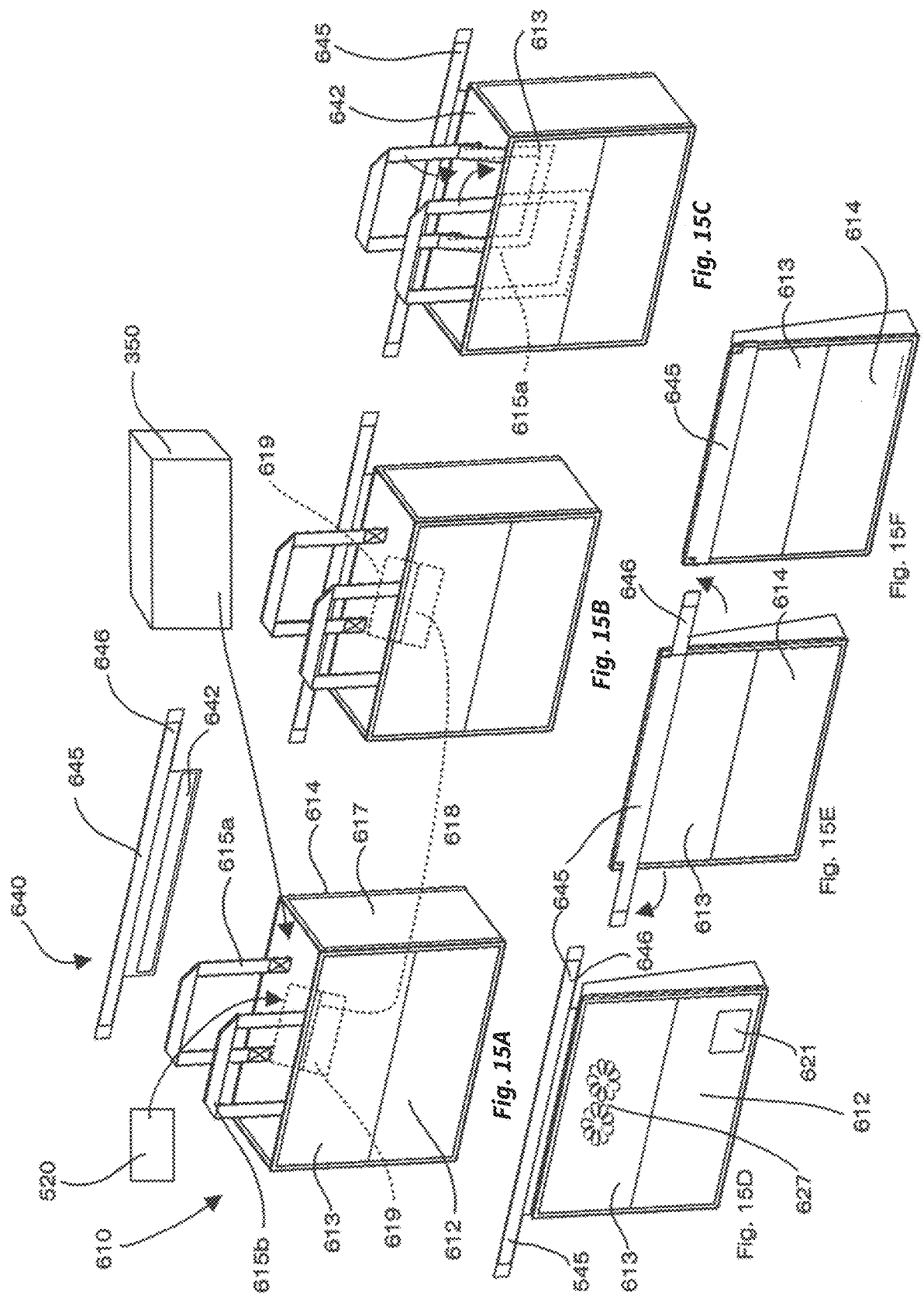

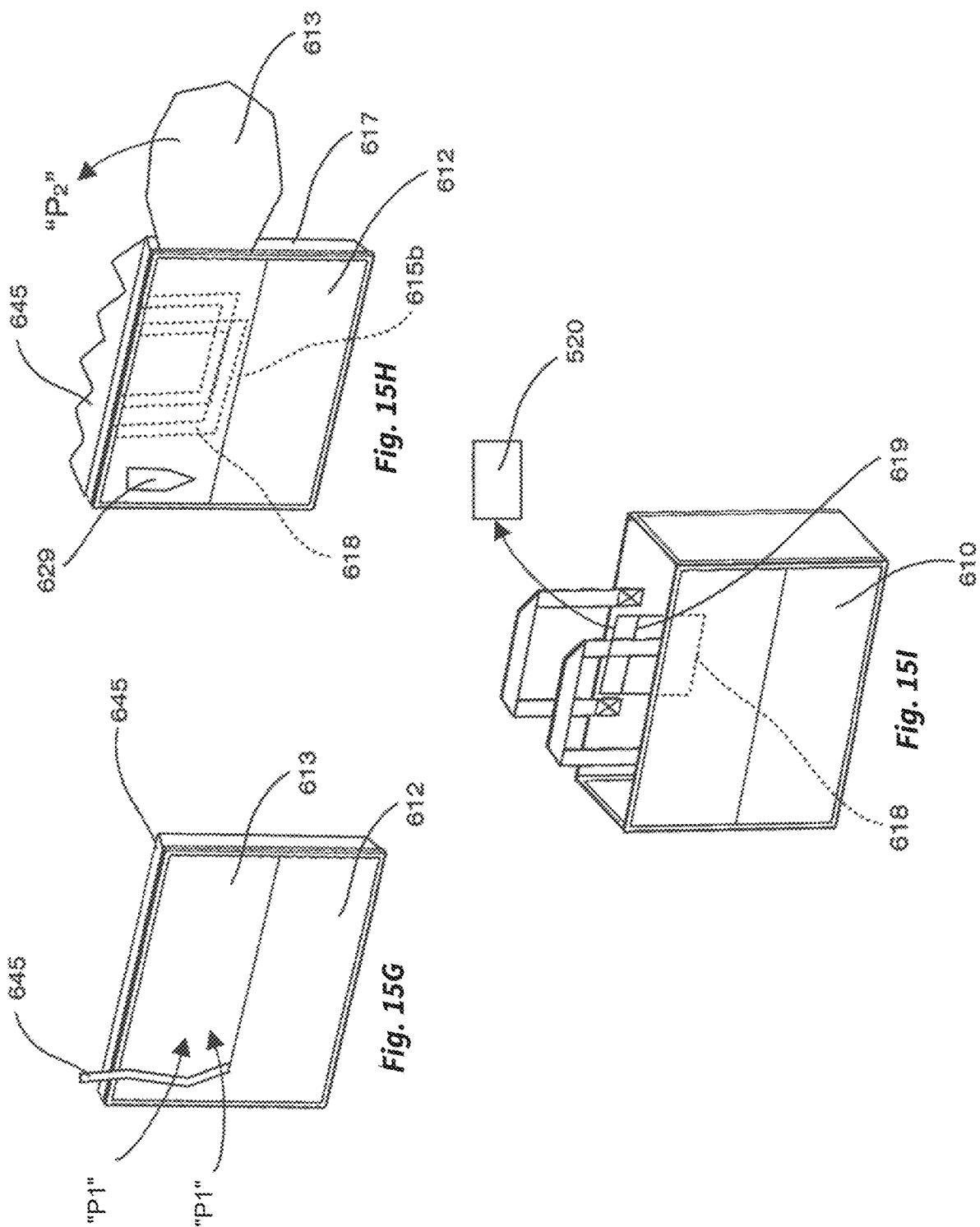

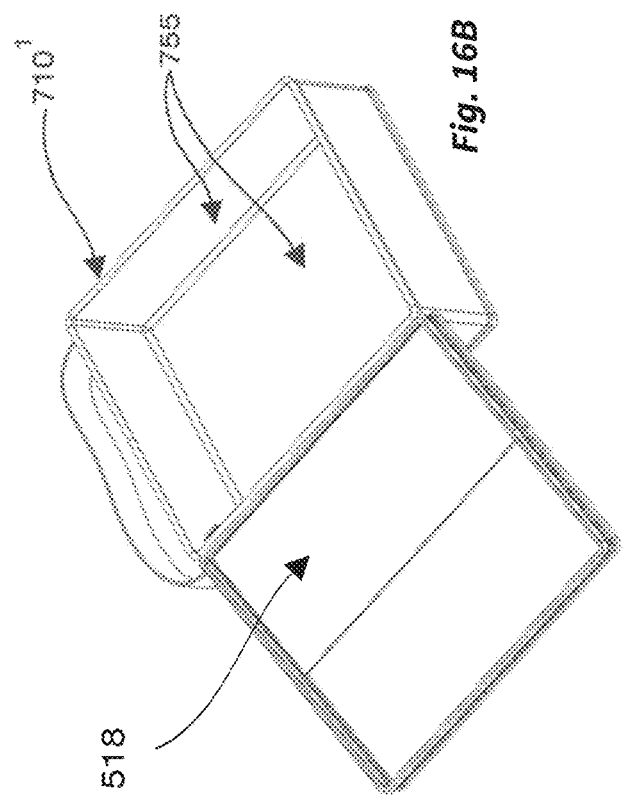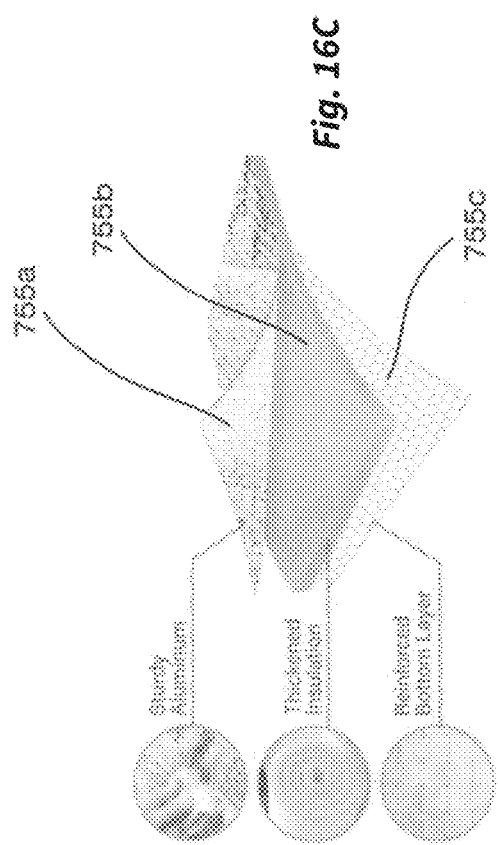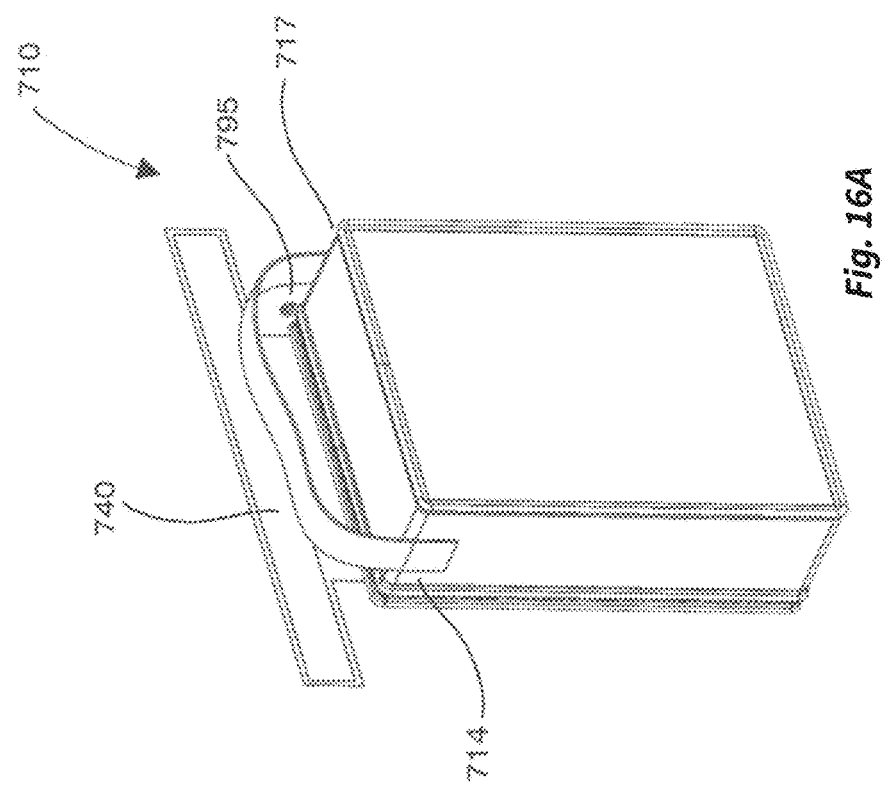

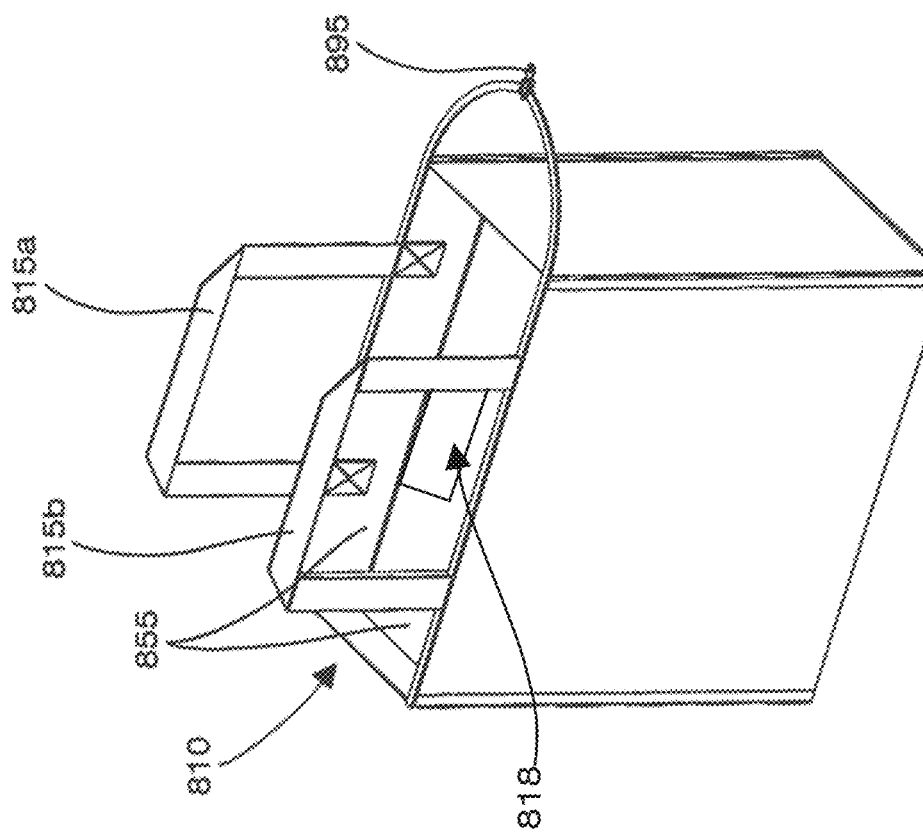
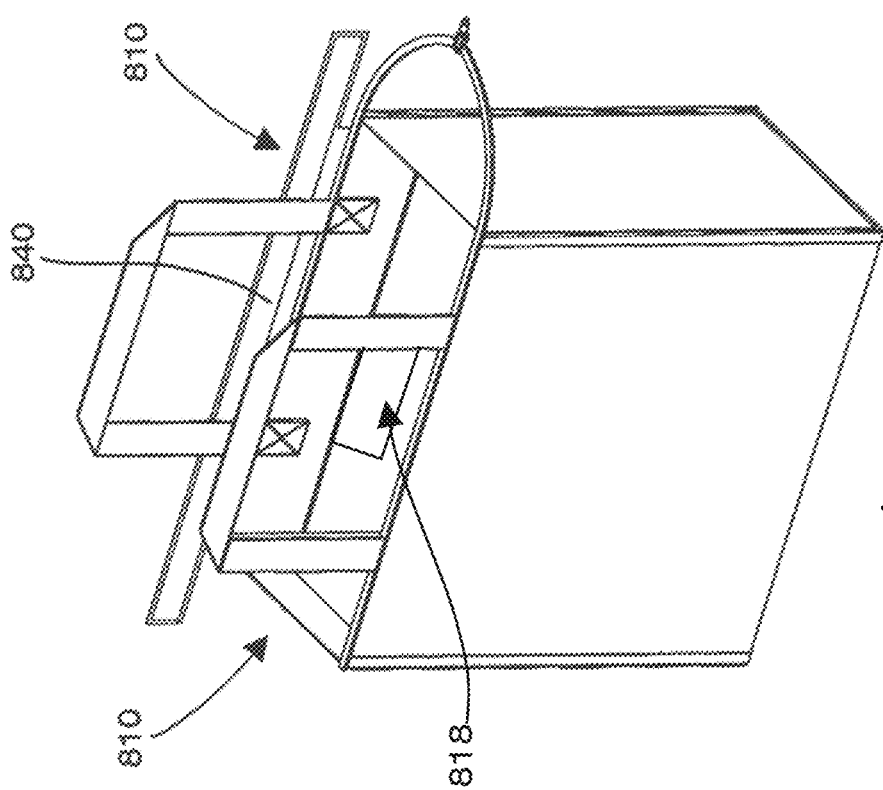

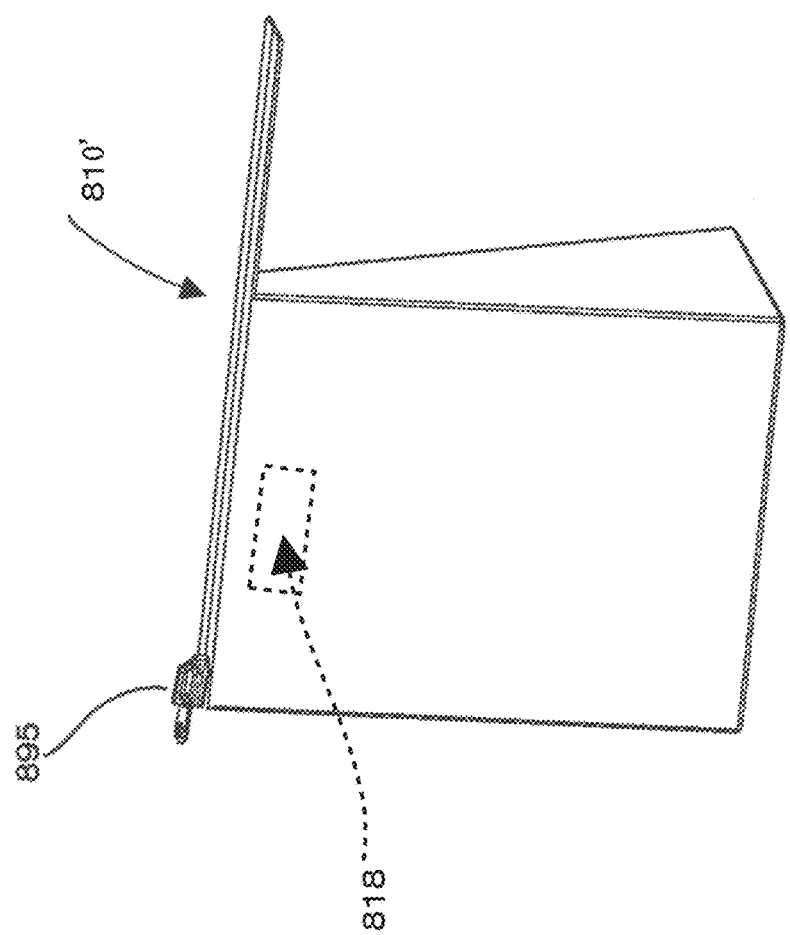
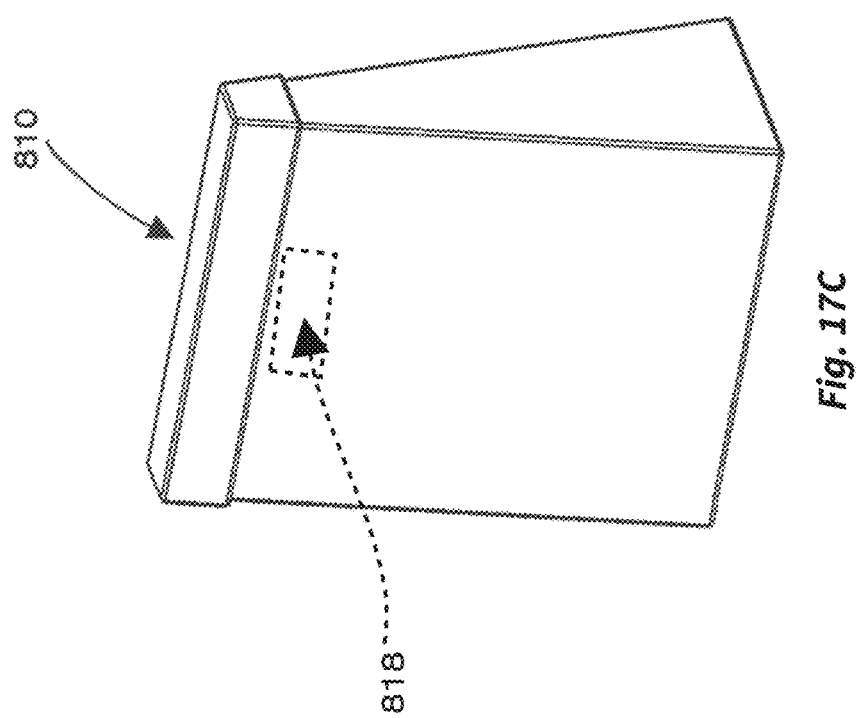
Fig. 17D
Fig. 17C

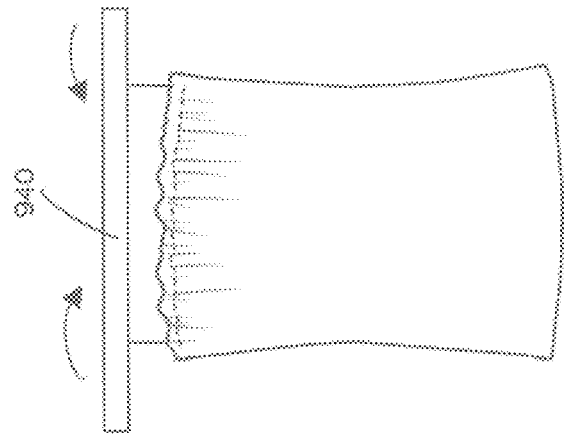
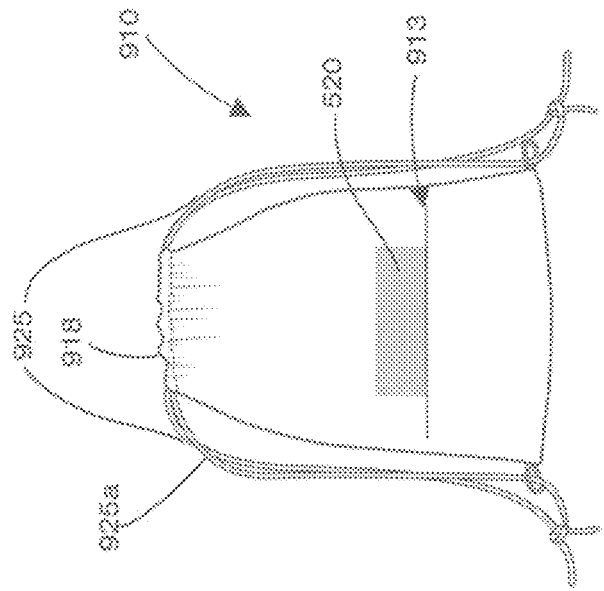
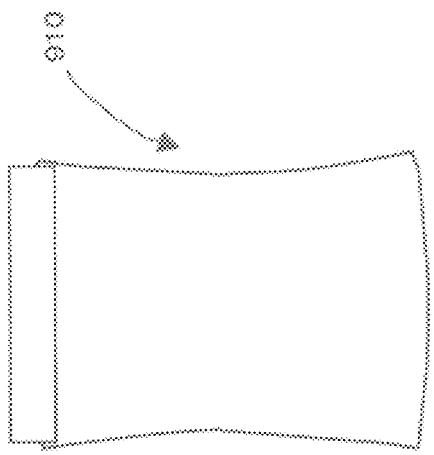
Fig. 18A
Fig. 18B
Fig. 18C

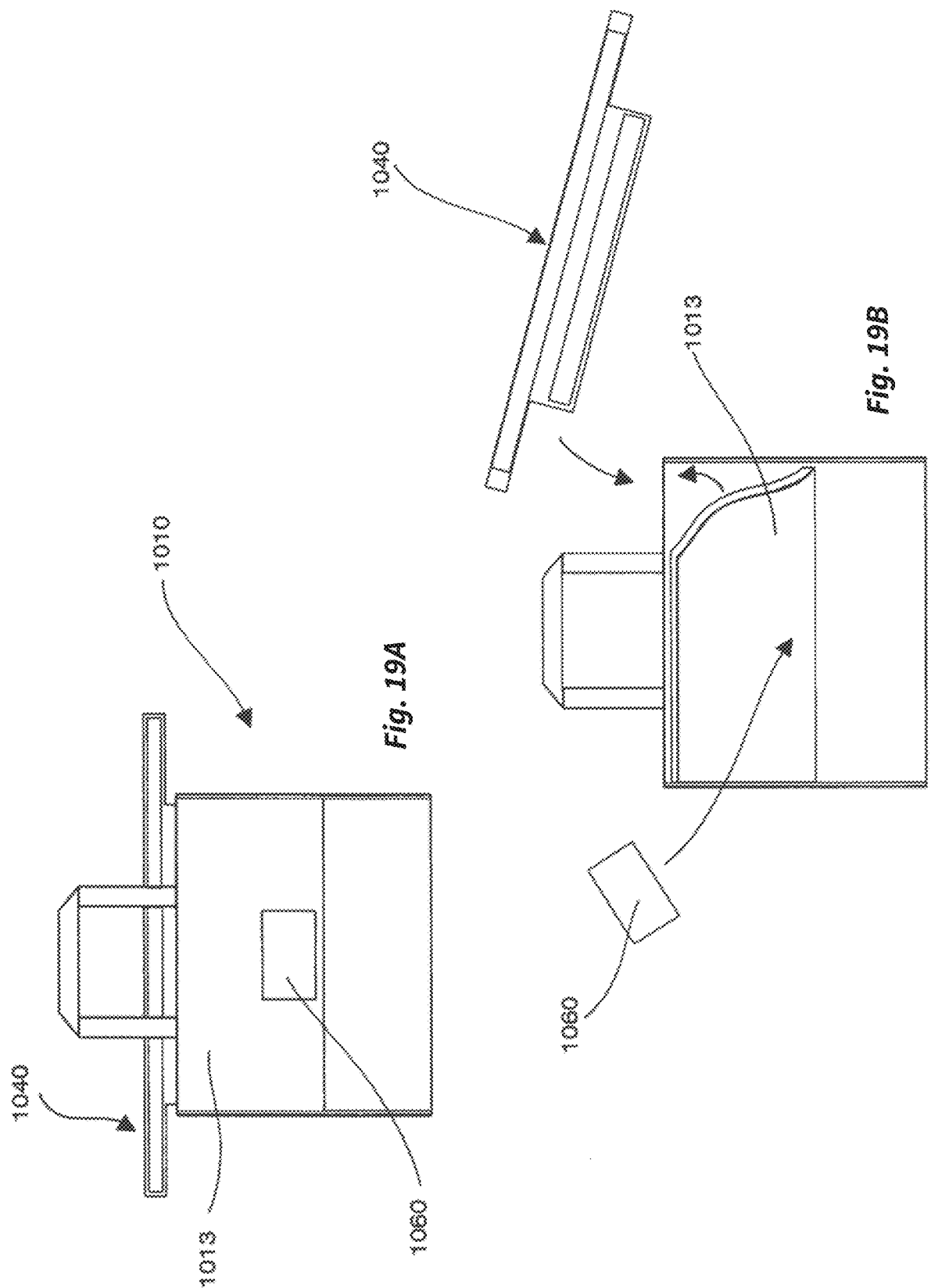

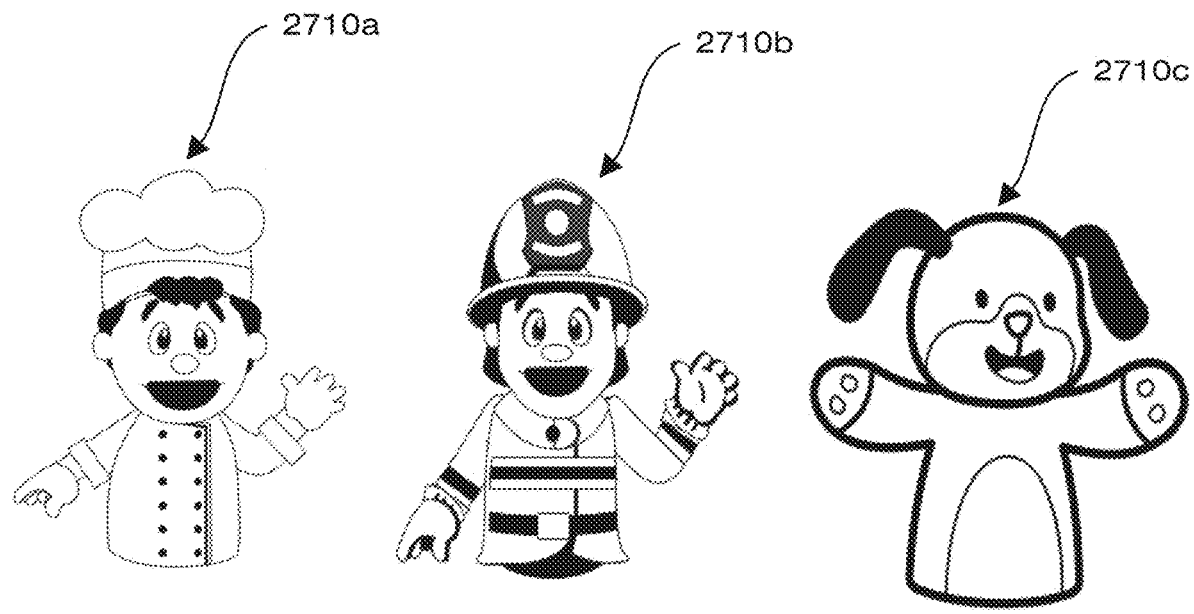
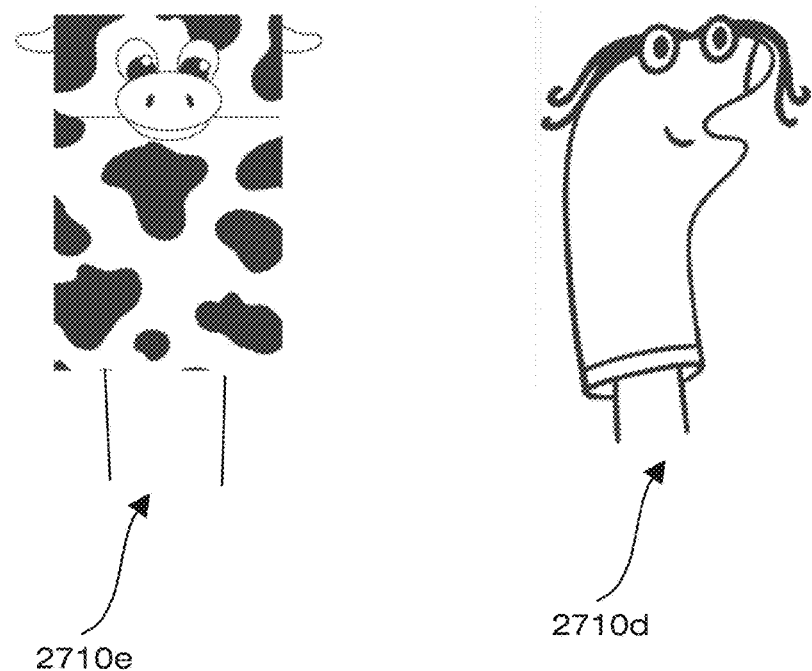
Fig. 25

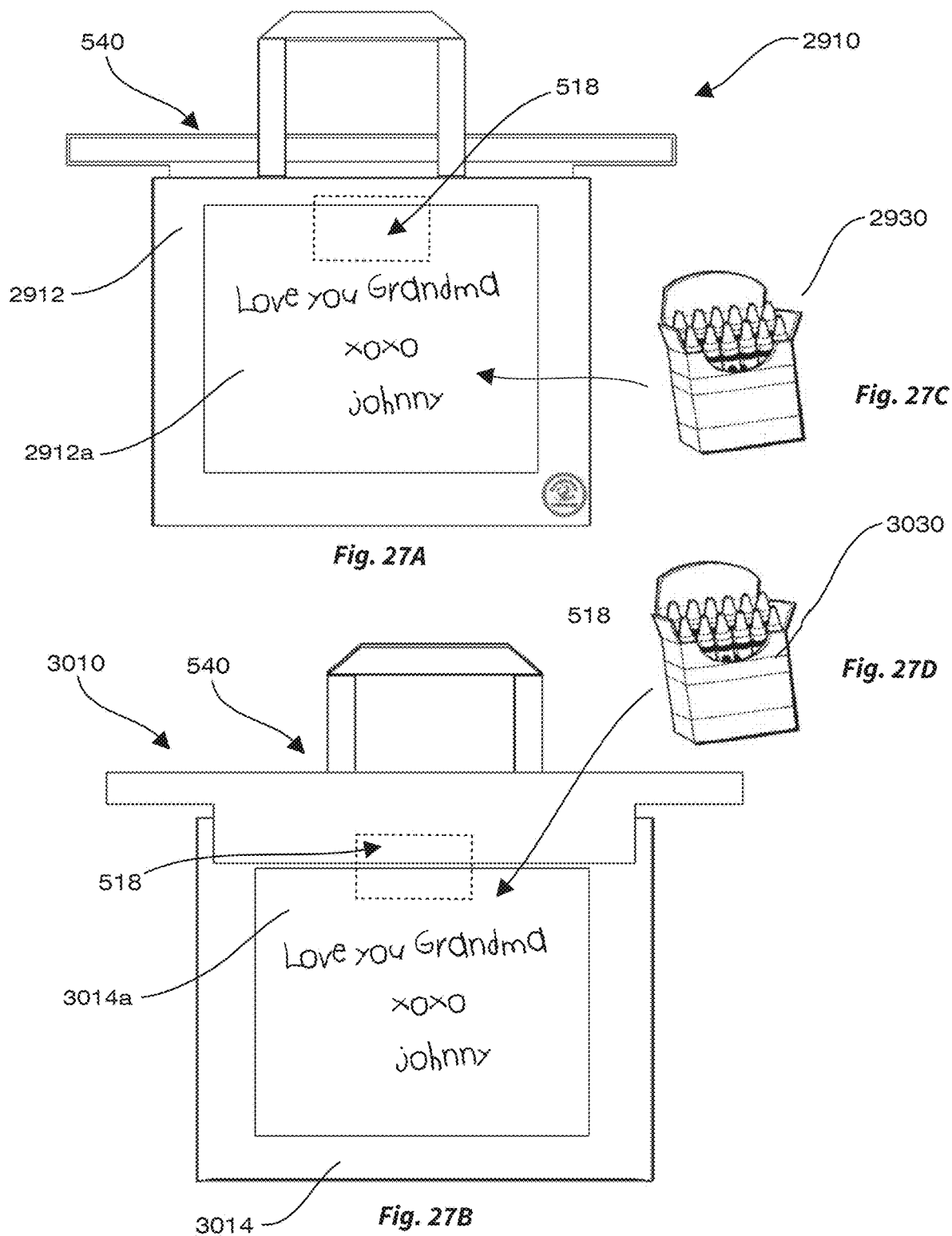

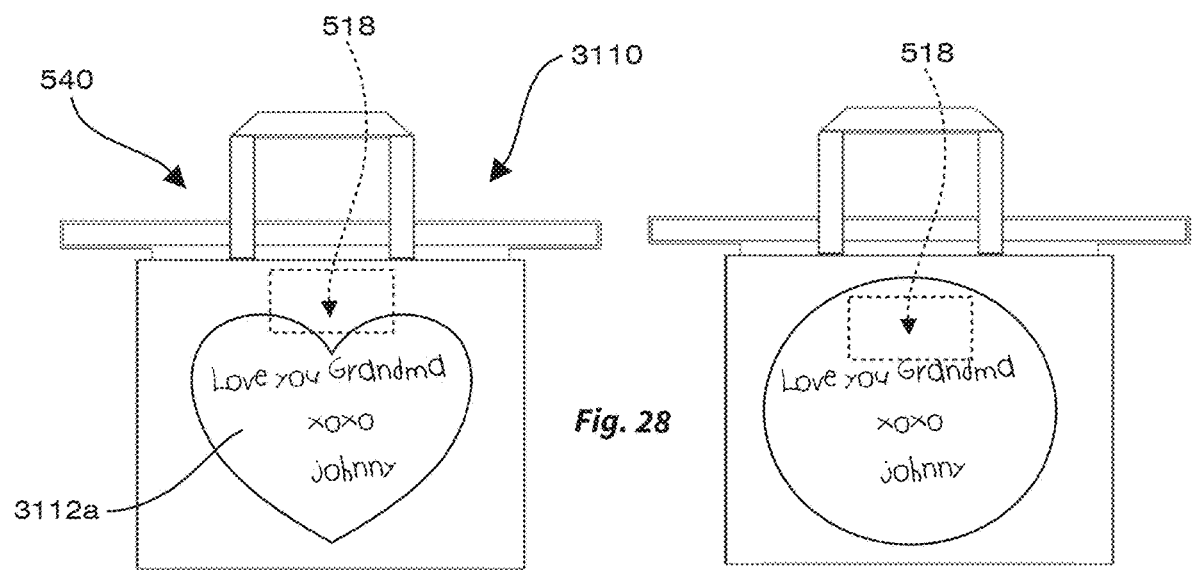
Fig. 28
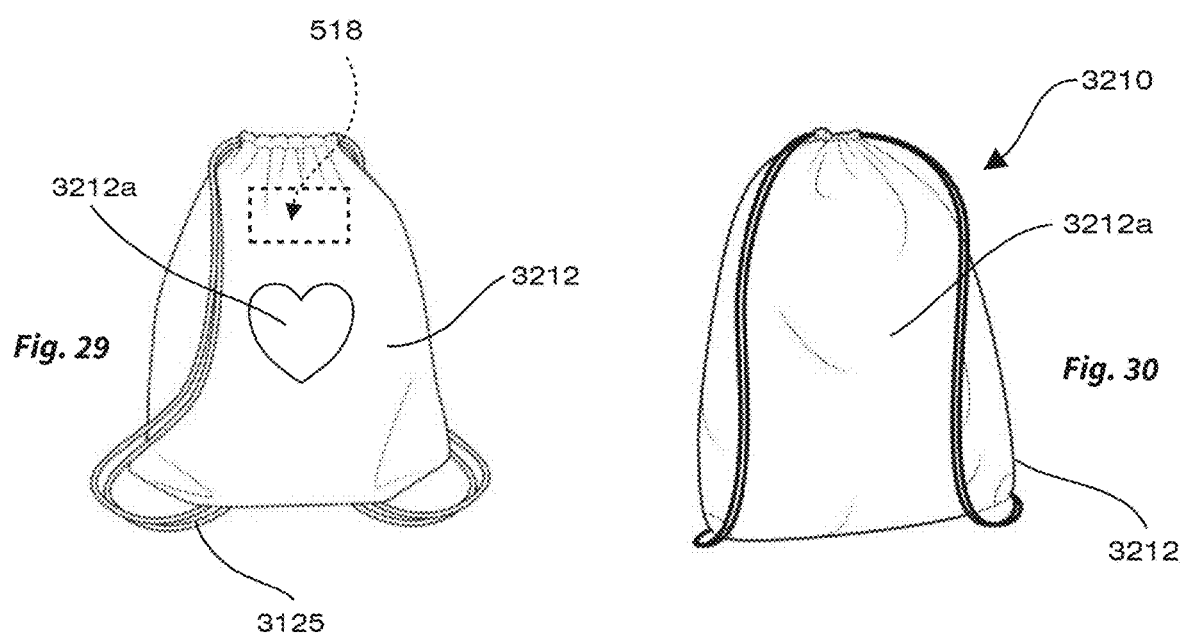
Fig. 29
Fig. 30

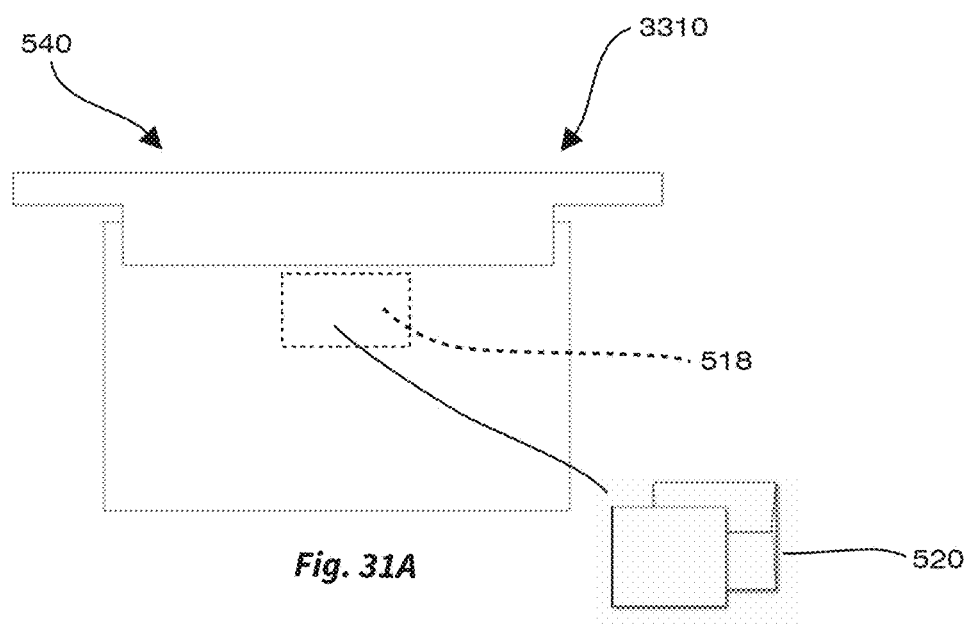
Fig. 31A
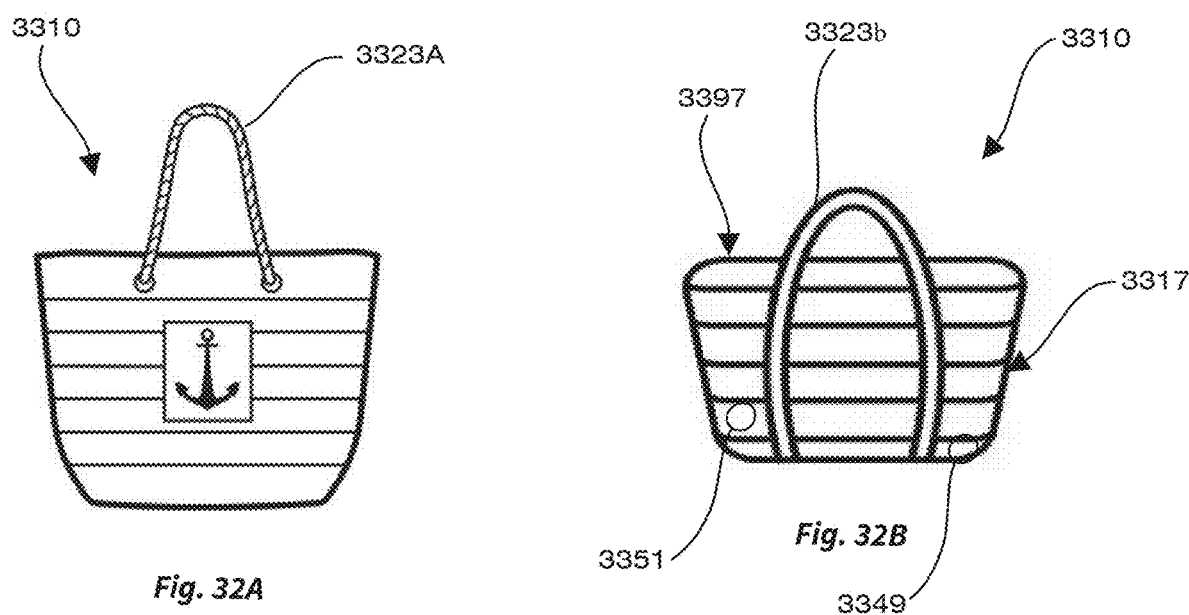
Fig. 32A
Fig. 32B

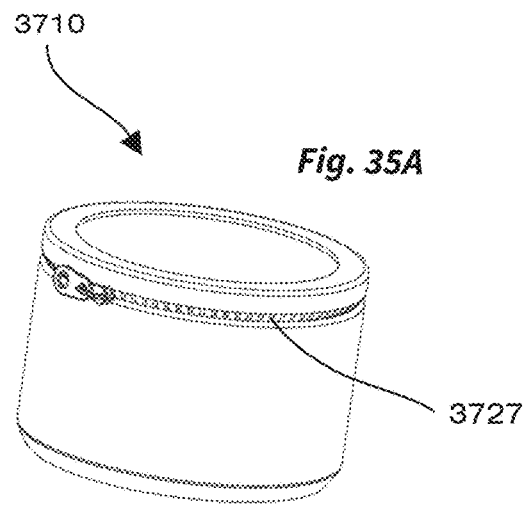
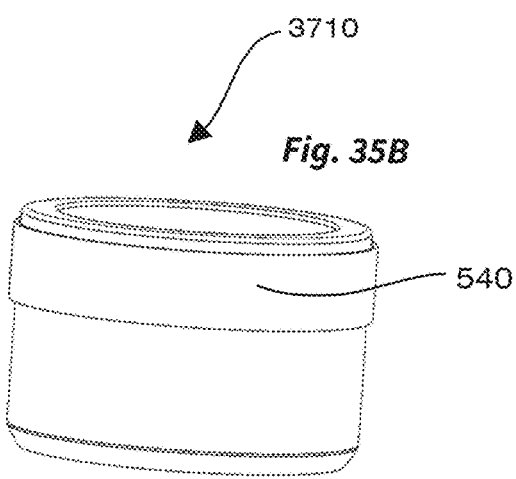
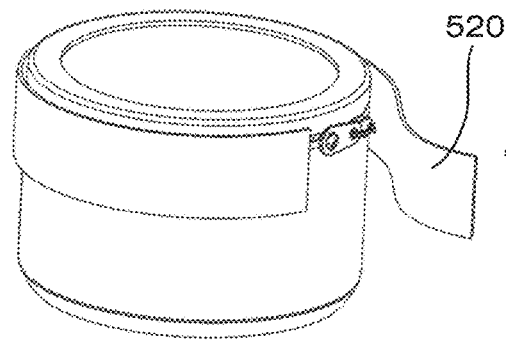
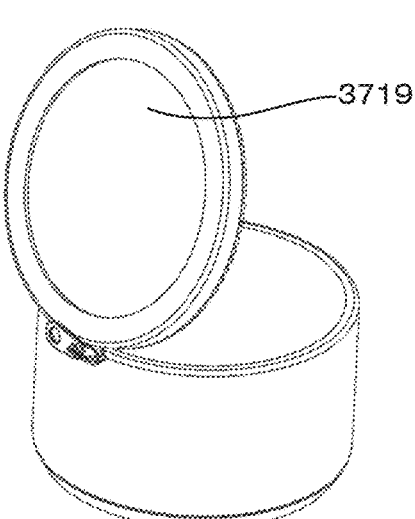
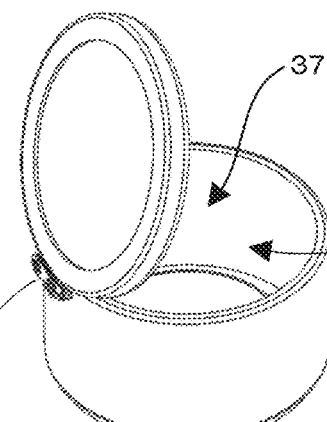
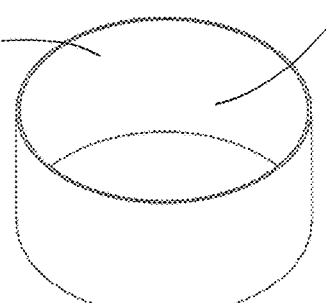

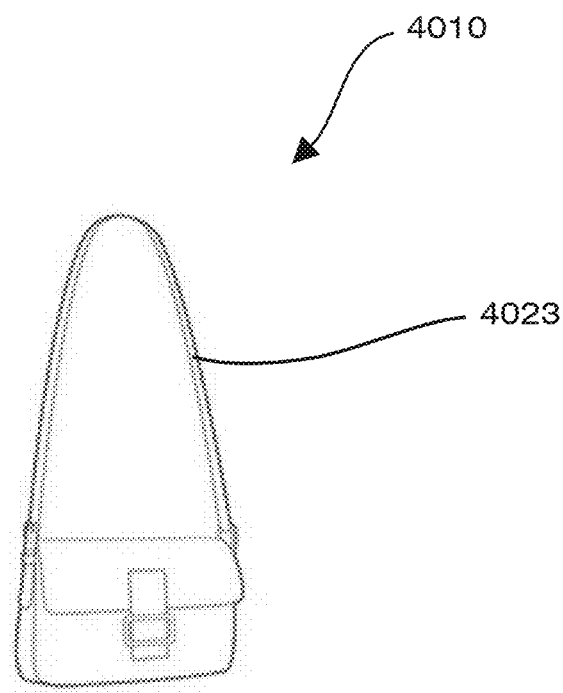
*Fig. 38A*
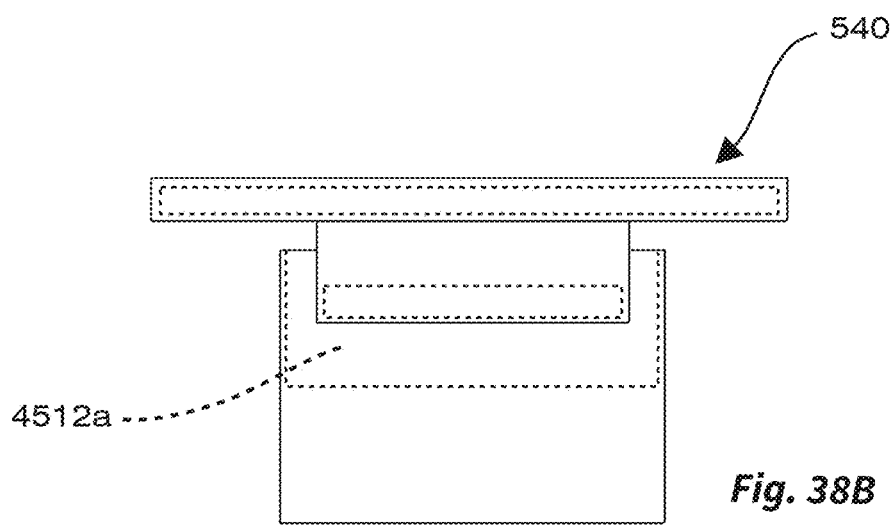
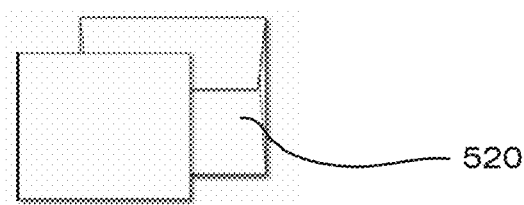
*Fig. 38B*

REUSABLE MAILER BAG TO PLUSH TOY

CROSS-REFERENCE TO RELATED APPLICATIONS

This application claims the benefit of and priority to U.S. Provisional Application Ser. No. 63/572,890 filed on Apr. 1, 2024, U.S. Provisional Application Ser. No. 63/561,659 filed on Mar. 5, 2024, U.S. Provisional Application Ser. No. 63/533,224 filed on Aug. 17, 2023, and U.S. Provisional Application Ser. No. 63/463,849 filed on May 3, 2023 the entire contents of all of which being incorporated by reference herein.

BACKGROUND

Technical Field

The present disclosure relates to a reusable mailer bag, gift bag and a method for customizing and using a reusable mailer bag which, after use as a mailer, is convertible into a toy, pillow or stuffed animal, etc.

Background of Related Art

Shipping packaging is typically provided in disposable form for a single use. In particular, boxes, envelopes, and other forms of shipping packaging are often transported from a merchant to an end user and are then subsequently thrown away or recycled by the end user. The end user typically does not gain any lasting value or use from the shipping packaging. Still further, when shipping a gift or other item for transport, a user typically must purchase several items, e.g., a gift card, individually (sometimes at different stores), assemble the items and the gift or shipping product for shipping and drop the item at a transport company for shipping. The recipient of the gift or shipping product often discards the shipping bag as waste.

As can be appreciated, the environmental waste from shipping/mailer bags, envelopes, and the like, while improving with recyclable and eco-friendly mailers, still places a huge strain on our environment. Eliminating the mailer bag from becoming waste or being commissioned for recycling efforts and repurposing or reusing the mailer bag is the ultimate solution to any environmental issue.

SUMMARY

A reusable mailer bag and a method of use according to aspects of the present disclosure are now described. The reusable mailer bag provides an end user with shipping packaging that may be repurposed for use as a carrying bag. The end user can therefore realize a return value on the cost of shipping.

In accordance with aspects of the present disclosure, a method includes extending a flap attached to a rear panel of a reusable mailer bag over an opening of the reusable mailer bag, securing the flap to a first removable tape layer of a front panel of the reusable mailer bag, detaching the flap from the front panel and the rear panel, and extending a pair of handles from a carrying volume of the reusable mailer through the opening of the reusable mailer.

In an aspect of the present disclosure, detaching the flap from the front panel includes tearing the flap along a first tear strip.

In a further aspect of the present disclosure, detaching the flap from the rear panel includes tearing the flap along a second tear strip.

In another aspect of the present disclosure, the first tear strip includes perforations.

In an aspect of the present disclosure, detaching the flap from the front panel includes detaching the first removable tape layer from the front panel.

In an aspect of the present disclosure, the method further includes attaching a shipping label to a second removable tape layer of the front panel.

In a further aspect of the present disclosure, the method further includes detaching the second removable tape layer from the front panel to remove the shipping label from the front panel.

In another aspect of the present disclosure, detaching the second removable tape layer reveals a hidden surface selected from the group consisting of a promotional code, an advertisement, and a writable surface.

In an aspect of the present disclosure, the reusable mailer bag is non-reversible.

In another aspect of the present disclosure, an interior surface of the carrying volume includes a bubble lined protective layer and the method further includes removing the bubble lined protective layer.

In accordance with aspects of the present disclosure, a reusable mailer bag is disclosed including a front panel, a rear panel, a pair of side panels, and a bottom panel. The panels together define a carrying volume including an opening opposite the bottom panel. A pair of handles is attached to an interior surface of the carrying volume and is configured for positioning entirely within the carrying volume during shipping. The pair of handles is configured to extend out of the opening. A flap is attached to the rear panel at a first end and is configured to extend across the opening to close the opening. The flap includes a second end that is securable to the front panel. The flap is configured to be removed from the mailer bag after shipping.

In an aspect of the present disclosure, the second end of the flap is securable to a first tape layer of the front panel.

In a further aspect of the present disclosure, the first tape layer is removable from the front panel to detach the flap from the front panel.

In another aspect of the present disclosure, the second end of the flap includes an adhesive layer. The adhesive layer is configured to adhere to the first tape layer of the front panel when the second end of the flap is secured to the front panel.

In an aspect of the present disclosure, the front panel further includes a second tape layer configured to receive a shipping label.

In a further aspect of the present disclosure, the front panel includes a hidden surface disposed under the second tape layer. The second tape layer may be removable to reveal the hidden surface. The hidden surface may be selected from the group consisting of a promotional code, an advertisement, and a writable surface.

In another aspect of the present disclosure, the flap includes a first tear strip adjacent the first end. The first tear strip is tearable to detach the flap from the rear panel.

In a further aspect of the present disclosure, the flap includes a second tear strip adjacent the second end. The second tear strip is tearable to detach the flap from the front panel.

In an aspect of the present disclosure, the side panels include recessed portions adjacent the opening. The recessed portions are secured to the front and rear panels adjacent the opening and are recessed relative to side edges of the front and rear panels. The recessed portions are configured to inhibit tampering with the carrying volume when the flap closes the opening.

In a further aspect of the present disclosure, the recessed portions inhibit the reusable mailer bag from being reversed.

In an aspect of the present disclosure, an interior surface of the carrying volume includes a bubble lined protective layer.

In a further aspect of the present disclosure, the bubble lined protective layer is removable.

In another aspect of the present disclosure, a reusable mailer bag includes front, rear, first side, second side, and bottom panels which include interior surfaces that define a carrying volume that has an opening which is opposite the bottom panel. The mailer bag also includes a flap and a first side extension. The flap is configured to extend across the opening to close the carrying volume during shipping. The flap includes a first end portion that is attached to the rear panel and a second end portion that is configured to secure to the front panel. The first side extension extends from a first edge of the second end portion of the flap that is adjacent the first side panel. The first side extension is configured to extend around the first side panel and to secure to the rear panel when the second end portion is secured to the front panel.

In aspects, the mailer bag includes a tape layer that is releasably secured to the rear panel. The first side extension may be configured to secure to the tape layer to secure to the rear panel.

In some aspects, the mailer bag includes a pair of handles that are attached to the interior surface of the front and rear panels. The pair of handles may be configured to be positioned entirely within the carrying volume during shipping and configured to extend out of the opening for transport.

In certain aspects, the flap is configured to be completely removed from the mailer bag after shipping.

In particular aspects, the mailer bag includes a tape layer that is releasably secured to the front panel. The second end portion of the flap may be securable to the tape layer. The tape layer may be removable from the front panel to detach the flap from the front panel. The second end portion of the flap may include an adhesive layer. The adhesive layer may be configured to adhere to the tape layer of the front panel to secure the second end portion of the flap to the front panel. The tape layer may be configured to receive a shipping label. The front panel may include a hidden surface that is disposed under the tape layer. The tape layer may be removable to reveal the hidden surface. The hidden surface may be a promotional code, an advertisement, and/or a writable surface.

In aspects, the flap includes a first tear strip that is adjacent the first end portion that is configured to detach the flap from the rear panel. The flap may include a second tear strip that is adjacent the second end portion and configured to detach the flap from the front panel. The flap may include a third tear strip along the first edge to detach the first side extension from the second end portion. The first, second, and third tear strips may form a continuous tear strip.

In some aspects, the mailer bag includes a second side extension that extends from a second edge of the second end portion that is opposite the first edge. The second side extension may be configured to extend around the second side panel and secure to the rear panel when the second end portion is secured to the front panel.

In another aspect of the present disclosure, a reusable mailer bag includes front, rear, first side, second side, and bottom panels, a flap, and a first side extension. The panels include interior surfaces that define a carrying volume that has an opening opposite the bottom panel. The flap is configured to extend across the opening to close the carrying volume during shipping. The flap includes a first end portion that is attached to the rear panel and a second end portion that is configured to secure to the front panel. The first side extension extends from a first edge of the flap between the first and second end portions adjacent the first side panel. The first side extension is configured to secure to the first side panel when the second end portion is secured to the front panel.

In aspects, the mailer bag includes a tape layer that is releasably secured to the first side panel. The lap may be configured to be completely removed from the mailer bag after shipping.

In another aspect of the present disclosure, a reusable mailer bag includes front, rear, first side, second side, and a bottom panel that include interior surfaces which define a carrying volume that has an opening opposite the bottom panel. The side panels include recessed portions that are adjacent the opening such that the side panels are spaced apart from side edges of the front and rear panels adjacent the opening to reduce a length of the opening opposite the bottom panel. A top edge of each of the first and second side panels are attached to each of the front and rear panels spaced apart from the side edges of the front and rear panels. The mailer bag also includes a flap that is formed separate and distinct from the front, rear, first side, second side, and bottom panels. The flap is configured to extend across the opening to close the carrying volume during shipping. The flap includes a first end portion that is attached to the rear panel and a second end portion that is securable to the front panel.

The present disclosure also relates to a reusable mailer bag which includes a front panel, a rear panel, a pair of side panels, and a bottom panel that include interior surfaces defining a carrying volume having a top opening opposite the bottom panel. One of the interior surfaces of the front panel and/or the rear panel includes a pouch defined therein configured to receive an item. A piece of protective tape including a first portion is configured to removably adhere to the rear panel and is configured to extend across the top opening. A second portion of the protective tape is configured to removably adhere to the front panel to close the carrying volume. One of the first or second portions of the protective tape includes side tabs on either side thereof configured to wrap around and removably adhere to the front or rear panel and close the side panels proximate the top opening.

In aspects in accordance with the present disclosure, the pouch is configured to carry a gift card therein. In other aspects in accordance with the present disclosure, the pouch includes a locking mechanism configured to secure items within the pouch. In still other aspects in accordance with the present disclosure, the locking mechanism includes at least one of a magnetic clasp, a hook and loop fastener, a snap-lock, or a tab lock.

In aspects in accordance with the present disclosure, a protective film is disposed on the front, side and rear panels and the first and second portions of protective tape are removably adhered to the protective film. In other aspects in accordance with the present disclosure, the protective film is adhered to the reusable mailer bag using an adhesive. In still other aspects in accordance with the present disclosure, the protective film is adhered to the reusable mailer bag using a first adhesive and the first and second portions of protective tape is removably adhered to the protective film using a second adhesive, the second adhesive having a higher coefficient of adhesion than the first adhesive such that the protective film peels away from the reusable mailer bag with less force than the first and second portions of protective tape peel away from the protective film facilitating opening of the reusable mailer bag.

In aspects in accordance with the present disclosure, a pair of handles is attached to the interior surfaces of the front and rear panels, the pair of handles is configured to be positioned entirely within the carrying volume during shipping and is configured to extend out of the top opening for transport.

In aspects in accordance with the present disclosure, the first and second portions of protective tape are configured to be completely removed from the reusable mailer bag after shipping. In other aspects in accordance with the present disclosure, indicia is disposed under the protective film which is revealed upon removal of the protective film, the indicia is selected from the group consisting of: additional advertising, a secondary layer of store indicia, a promotional item, a gift, a discount coupon/code, or prize.

In aspects in accordance with the present disclosure, the interior surface of the front panel, rear panel, pair of side panels or bottom panel includes an insulative layer.

In aspects in accordance with the present disclosure, the reusable mailer bag is selectively invertable after shipping to expose one or more components to facilitate utilizing the reusable mailer bag as a tote, lunch box, lunch bag, or backpack. In other aspects in accordance with the present disclosure, the one or more components is selected from the group consisting of straps, drawstrings, handles, stays, loops and insulative materials.

The present disclosure also relates to a method of converting a mailer bag into a reusable bag and includes placing an item into a top opening of a carrying volume defined by interior surfaces of a front panel, a rear panel, a pair of side panels, and a bottom panel. The method further includes: removably adhering a first portion of protective tape to the rear panel and extending a second portion of protective tape across the top opening in the carrying volume and removably adhering the second portion to the front panel to close the top opening of the carrying volume; extending a first side tab of the second portion of the protective tape around the side panel and removably adhering the first tab to the rear panel and extending a second side tab of the second portion of the protective tape around the opposite side panel and adhering the second tab to the rear panel; and removing the first and second portions of protective tape from the front, side and rear panels after shipping and using the mailer bag as at least one of a tote, lunch box, lunch bag, or backpack.

In aspects according to the present disclosure, prior to adhering the first portion of protective tape to the rear panel, the method further includes inserting an item into a pouch defined within the front and/or rear panels of the interior surfaces of the carrying volume.

In aspects according to the present disclosure, prior to removably adhering the first portion of protective tape to the rear panel, the method further comprises positioning a pair of handles entirely within the carrying volume during shipping and wherein after shipping the method further includes exposing the handles from the carrying volume to facilitate using the mailer bag as a tote, lunch box, lunch bag, and/or backpack.

In aspects according to the present disclosure, prior to removably adhering the first portion of protective tape to the rear panel, the method further includes: inverting the front panel, rear panel, pair of side panels and bottom panel to form an inverted carrying volume; and positioning one or more components within the inverted carrying volume employed to facilitate utilizing the mailer bag as a tote, lunch box, lunch bag, and/or backpack. In other aspects according to the present disclosure, the one or more components is selected from the group consisting of straps, drawstrings, handles, stays, loops and/or insulative materials.

In aspects according to the present disclosure, after removing the first and second portions of protective tape from the front, side and rear panels after shipping, the method further includes: re-inverting the front panel, rear panel, pair of side panels and bottom panel to expose the one or more components; and utilizing the mailer bag as a tote, lunch box, lunch bag, or backpack.

The present disclosure also relates to a reusable mailer bag which can be converted into a backpack after mailing and includes a carrying volume disposed as a reusable mailer defining a top opening configured to receive a package therein. A storage compartment is defined in the carrying volume and is configured to receive a secondary item therein. A drawstring is operably associated with the top opening and is configured to close the top opening with the package when cinched. A piece of protective tape is included having a first portion configured to removably adhere to a rear portion of the carrying volume and configured to extend across the top opening and a second portion configured to removably adhere to a front portion to close the carrying volume to configure the carrying volume for mailing purposes. After mailing, the piece of protective tape is completely (or in some cases partially) removed and the drawstring is uncinched to expose the package within the carrying volume and the secondary item in the storage compartment to a mail recipient. Opposite ends of the drawstring are reorientable to operably engage a respective loop defined on opposing sides of the carrying volume thereby transforming the carrying volume into a backpack.

In aspects according to the present disclosure, the storage compartment is configured to carry a gift card therein.

In aspects according to the present disclosure, the first and second portions of protective tape are configured to be completely removed from the reusable mailer bag after shipping.

In aspects according to the present disclosure, the reusable mailer further includes a pair of stays configured to secure each respective opposite end of the drawstring after transitioning through each respective loop.

The present disclosure also relates to a method of converting a reusable mailer into a backpack and includes placing a package into a top opening of a carrying volume when disposed as a reusable mailer; placing a secondary item into a storage compartment defined in the carrying volume and configured to receive a secondary item therein; cinching a drawstring operably associated with the top opening to close the top opening with the package disposed in the carrying volume; and removably adhering a piece of protective tape including a first portion to a rear portion of the carrying volume and extending the first portion across the top opening; removably adhering a second portion of the protective tape to a front portion to close the carrying volume and configure the carrying volume for mailing purposes; mailing the carrying volume to a mail recipient; removing a portion of the protective tape and uncinching the drawstring to expose the package within the carrying volume and the secondary item in the storage compartment to the mail recipient; and reorienting opposite ends of the drawstring to operably transition through a respective loop defined on opposing sides of the carrying volume to transform the carrying volume into a backpack.

In aspects according to the present disclosure, the storage compartment is configured to carry a gift card therein.

In aspects according to the present disclosure, the method further includes: completely removing the first and second portions of protective tape from the reusable mailer bag after shipping.

In aspects according to the present disclosure, the method further includes: securing opposite ends of the drawstring through a pair of opposing stays disposed on either side of the carrying volume after each respective opposite end of the drawstring transitions through each respective loop.

In aspects according to the present disclosure, the method further includes: prior to inserting a package into the carrying volume, the method includes: inverting the carrying volume such that the storage compartment is disposed within an interior periphery of the carrying volume and the loops and drawstring are unexposed.

In aspects according to the present disclosure, the method further includes: inserting an item into the storage compartment prior to inverting the carrying volume.

In aspects according to the present disclosure, the method further includes: closing the top opening of the carrying volume by at least one of cinching the drawstring, rolling the top of the bag, or by folding the top of the bag prior to applying the protective tape.

In aspects according to the present disclosure, the method further includes: after the mail recipient receives the package and prior to transforming the reusable mailer into the backpack, the method includes: inverting the carrying volume such that the storage compartment is disposed on the outer periphery of the carrying volume and the loops and drawstring are exposed; and reorienting opposite ends of the drawstring to operably transition through a respective loop defined on opposing sides of the carrying volume to transform the carrying volume into the backpack.

In aspects according to the present disclosure, the method further includes: securing opposite ends of the drawstring through a pair of opposing stays disposed on either side of the carrying volume after each respective opposite end of the drawstring transitions through each respective loop.

In aspects according to the present disclosure, after the mail recipient receives the reusable mailer, the method further comprises: removing the second portion of the protective tape from the front portion of the carrying volume and uncinching the drawstring to expose the package within the carrying volume and the secondary item in the storage compartment to the mail recipient; and overlapping the second portion of the protective tape around an upper edge of the rear portion of the carrying volume to enhance the durability of the rear portion of the carry volume.

The present disclosure also relates to a reusable mailer which can be converted into a lunch cooler after mailing and includes a top panel, opposing pairs of side panels, and a bottom panel defining a carrying volume configured to receive a package therein. The top panel is moveable to expose the carrying volume. The top panel, opposing pairs of side panels, and/or the bottom panel includes an interior surface having a storage compartment defined therein configured to receive a secondary item. A piece of protective tape includes a first portion configured to removably adhere to the top panel and includes one or more additional portions configured to extend across and removably adhere to one or more side panels to secure the top panel atop the carrying volume for mailing purposes. After mailing, the piece of protective tape is removed (completely or at least partially) from both the top panel and the one or more side panels to expose the package within the carrying volume and the secondary item in the storage compartment to a mail recipient.

In aspects according to the present disclosure, at least the bottom panel is made from a material having insulative properties, waterproof properties, thermally conductive properties, or thermally insulated material.

In aspects according to the present disclosure, the protective tape includes side tabs which are configured to wrap the protective tape around to adjacent side panels to further secure the top panel.

In aspects according to the present disclosure, the reusable mailer includes a strap configured to removably engage at least one panel.

In aspects according to the present disclosure, the reusable mailer includes a zipper operably associated with the top panel and a plurality of side panels, the zipper moveable along the top panel between a first position wherein the carrying volume is exposed for receiving a package to a second position wherein the carrying volume is closed for mailing the package.

In aspects according to the present disclosure, the reusable mailer includes a plurality of mechanically interlocking hook and loop fasteners operably associated with the top panel and a plurality of side panels, the plurality of mechanically interlocking hook and loop fasteners allowing the top panel to be moved relative to the plurality of side panels between a first position wherein the carrying volume is exposed for receiving a package to a second position wherein the carrying volume is closed for mailing the package.

In aspects according to the present disclosure, the reusable mailer includes a plurality of magnetically engaging elements operably associated with the top panel and a plurality of side panels, the plurality of magnetically engaging elements allowing the top panel to be moved relative to the plurality of side panels between a first position wherein the carrying volume is exposed for receiving a package to a second position wherein the carrying volume is closed for mailing the package.

In aspects according to the present disclosure, the reusable mailer includes a latch operably associated with the top panel and a catch operably associated with at least one of the plurality of side panels, the latch and catch allowing the top panel to be moved relative to the plurality of side panels between a first position wherein the carrying volume is exposed for receiving a package to a second position wherein the carrying volume is closed for mailing the package.

In aspects according to the present disclosure, the storage compartment is configured to carry a gift card therein.

The present disclosure also relates to a method of converting a reusable mailer into a lunch cooler after mailing and includes: placing an item into a carrying volume defined by interior surfaces of a top panel, opposing pairs of side panels, and a bottom panel defining the carrying volume configured to receive the item therein; placing a secondary item into a storage compartment defined one of the interior surfaces of the top panel, opposing pairs of side panels and bottom panel and configured to receive a secondary item therein; securing the top panel with the item disposed in the carrying volume; removably adhering a piece of protective tape including a first portion to the top panel and extending a second portion to at least one side panel of the opposing pairs of side panels; removably adhering the second portion of the protective tape to the at least one side panel of the opposing pairs of side panels and readying the carrying volume for mailing; mailing the carrying volume to a mail recipient; removing at least a portion of the protective tape and opening the top panel to expose the item and the secondary item in the storage compartment to the mail recipient; and using the carrying volume as a lunch cooler.

In aspects according to the present disclosure, the storage compartment is configured to carry a gift card therein.

In aspects according to the present disclosure, the method further includes: removably engaging a carrying strap to one of the opposing pairs of side panels.

In aspects according to the present disclosure, the top panel is secured by a zipper, mechanically interlocking hook and loop fasteners, magnetically engaging elements, or a latch and catch arrangement.

In aspects according to the present disclosure, at least the bottom panel is made from a material having insulative properties, waterproof properties, thermally conductive properties, or thermally insulated material.

In aspects according to the present disclosure, the protective tape includes side tabs which are configured to wrap the protective tape around to adjacent side panels to further secure the top panel.

Any of the above aspects and embodiments of the present disclosure may be combined without departing from the scope of the present disclosure.

The present disclosure also relates to a reusable mailer having a carrying volume including a top opening configured to receive a package therein, the carrying volume defined by an outer peripheral surface and an inner peripheral surface, the inner peripheral surface partially covered by a plush material. A piece of protective tape having a first portion is configured to removably adhere to a rear portion of the outer surface of the carrying volume and is configured to extend across the top opening. The protective tape includes a second portion configured to removably adhere to a front portion of the outer surface of the carrying volume to close the carrying volume and configure the carrying volume for mailing purposes. After mailing, the piece of protective tape is selectively removable from the front surface and the rear surface of the carrying volume to expose the package within the carrying volume. Once the package is removed from the carrying volume, the carrying volume is selectively inverted to expose the plush material on the inner peripheral surface and transition the mailer into plush object.

In aspects according to the present disclosure, the plush object is any one of the following: toys, sleeping pillows, throw pillows, co-sleepers, sleep pads for babies, neck pillows, heating pads, hand puppets, clothing such as hoodies, sweatshirts, jackets, tops, headwear, pants, t-shirts, polos, Christmas stockings, and/or cooling pads.

In aspects according to the present disclosure, the reusable mailer includes handles disposed within the carrying volume, the handles being selectively exposable when the carrying volume is inverted.

In aspects according to the present disclosure, the plush material is made from a material that is configured to at least one of insulate, waterproof, or protect the package disposed within the carrying volume during mailing.

In aspects according to the present disclosure, the reusable mailer includes a closing mechanism configured to close the carrying volume after inversion, the closing mechanism can include any one or combinations of: zippers, press-locks, hook and loop fasteners, buttons, snaps, interlocking tabs, magnetic locking devices, and additional pieces of protective tape.

In aspects according to the present disclosure, the reusable mailer includes an insertable filler selectively insertable within the carrying volume with the package prior to mailing, the insertable filler made from an expandable material and packed in the carrying volume in a greatly-reduced volume for mailing purposes, wherein, after the package and insertable filler are removed from the carrying volume and the carrying volume is inverted, the insertable filler is unpacked so that the insertable filler expands and is used to fill the inverted carrying volume.

In aspects according to the present disclosure, the insertable filler is configured to expand to match the shape of the plush object.

In aspects according to the present disclosure, the plush material is made from at least one of felt, fleece, cotton, polyester, acrylic, flannel, faux suede, faux fur, minky, wool, sherpa and rubber.

In aspects according to the present disclosure, the insertable filler is made from an expandable foam material.

In aspects according to the present disclosure, the insertable filler is made from a viscoelastic material and vacuum-packed in a greatly-reduced volume for mailing purposes, wherein, after the package and insertable filler are removed from the carrying volume and the carrying volume is inverted, the insertable filler is unpacked so that the insertable filler expands and is used to fill the inverted carrying volume.

In aspects according to the present disclosure, the carrying volume is lined with a filler made from an expandable material disposed in a greatly-reduced volume for mailing purposes, wherein, after the package is removed from the carrying volume and the carrying volume is inverted, the filler is unpacked so that the filler expands and is used to fill the inverted carrying volume.

In aspects according to the present disclosure, the reusable mailer includes a writable or drawing surface on at least one of the outer peripheral surface or the inner peripheral surface.

The present disclosure also relates to a reusable mailer having a carrying volume including a top opening configured to receive a package therein, the carrying volume defined by an outer peripheral surface and an inner peripheral surface, the inner peripheral surface including a writeable or drawing surface. A piece of protective tape having a first portion is configured to removably adhere to a rear portion of the outer surface of the carrying volume and is configured to extend across the top opening. The protective tape includes a second portion configured to removably adhere to a front portion of the outer surface of the carrying volume to close the carrying volume and configure the carrying volume for mailing purposes. Once the package is removed from the carrying volume, the carrying volume is selectively inverted to transition and expose the writable or drawing surface on the inner peripheral surface.

In aspects according to the present disclosure, the reusable mailer also includes a writable or drawing surface on the outer peripheral surface.

The present disclosure also relates to a reusable mailer having a carrying volume including a top opening configured to receive a package therein, the carrying volume defined by an outer peripheral surface and an inner peripheral surface. A piece of protective tape including a first portion is configured to removably adhere to a rear portion of the outer surface of the carrying volume and is configured to extend across the top opening and a second portion is configured to removably adhere to a front portion of the outer surface of the carrying volume to close the carrying volume and configure the carrying volume for mailing purposes. After mailing, the piece of protective tape is selectively removable from the front surface and the rear surface of the carrying volume to expose the package within the carrying volume for removal. A closure mechanism is disposed one or both of the outer peripheral surface or the inner peripheral surface, the closure mechanism is configured to selectively close the top opening of the carrying volume after mailing.

In aspects according to the present disclosure, the closing mechanism is configured to close the top opening such that the reusable mailer is watertight and leakproof. In other aspects according to the present disclosure, the carrying volume is made from a waterproof and leakproof material and is configured to retain air for flotation purposes.

In aspects according to the present disclosure, the carrying volume includes a valve disposed thereon to enable the closure volume to be filled with air.

BRIEF DESCRIPTION OF THE DRAWINGS

Various aspects of the present disclosure are described hereinbelow with reference to the drawings, wherein:

FIGS. 13A-13F show a flow diagram of one envisioned method of assembling a product within the reusable mailer bag with a gift card;

FIGS. 15A-15I show a flow diagram of one envisioned method of assembling a product within the reusable mailer bag with a gift card, receiving and opening the mailer bag and removing a mailing strip, and a method of reusing the reusable mailer bag;

FIGS. 16A-16C show various views of another embodiment of the reusable mailer bag shaped in the form of a lunch box having an internal insulating liner and a zipper;

FIGS. 17A-17D show various views of another embodiment of the reusable mailer bag shaped in the form of a conventional lunch bag or wine pouch having an internal insulating liner and zipper;

FIGS. 18A-18C show various views of another embodiment of the reusable mailer bag shaped in the form of a backpack having on or more storage compartments;

FIGS. 19A-19B show another embodiment of a reusable mailer bag with removeable components that may be sold separately enabling the mailer bag to be reused for mailing purposes;

FIG. 25 shows the embodiment of the reusable mailer bag of FIG. 24 with a variety of different hand puppet configurations;

FIGS. 27A-27D show another embodiment of a reusable mailer bag with a carrying volume that inverts to form a craft bag with a writing surface wherein the writing surface can be disposed on the inner peripheral surface of the carrying volume and/or the outer surface peripheral of the reusable bag;

FIG. 28 shows another embodiment of a reusable mailer bag with a carrying volume that inverts to form a tote bag/purse/lunch bag, etc. with a writing surface on the outer surface thereof;

FIGS. 29 and 30 show additional embodiments of a reusable mailer bag with a carrying volume that inverts to form a backpack with a writing or craft surface on the outer surface thereof;

FIGS. 31A-32B show another embodiment of a reusable mailer bag with a carrying volume that inverts to form a beach bag which may be waterproof, leak proof, floatable etc., and may be used as a safety floatation device in an emergency;

FIGS. 35A-35E show another embodiment of a reusable mailer container that can be used as a jewelry bag or jewelry case, the case comes with a stiffening material or stiffener which is inserted within the carrying volume to solidify the container for use;

FIGS. 38A-38B show another embodiment of a reusable mailer bag with a carrying volume that inverts to form an evening purse with an elegant chain-like handle.

DETAILED DESCRIPTION

Figure 1:
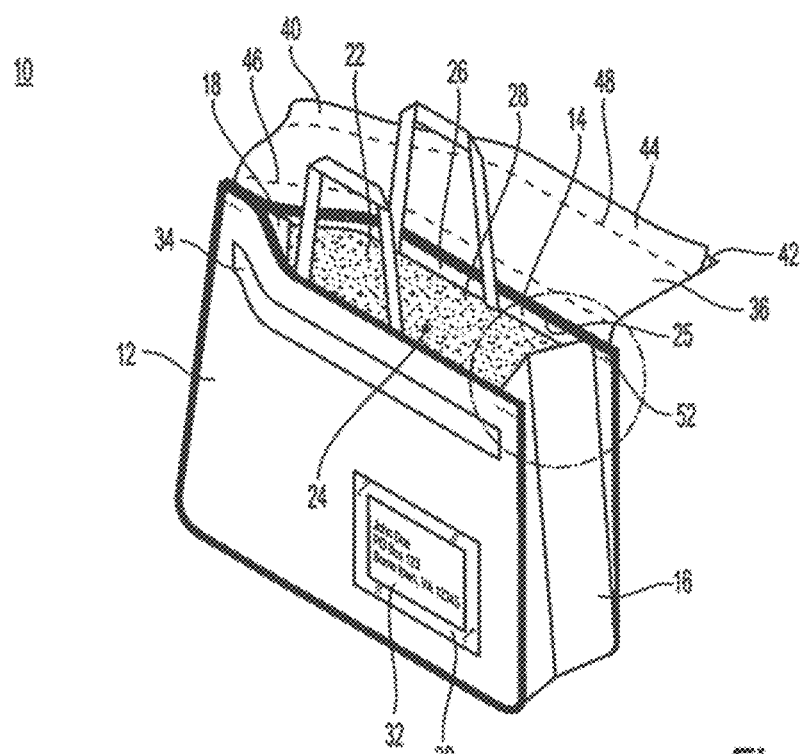
FIG. 1 is a perspective view of a reusable mailer bag provided in accordance with the present disclosure.
Figure 2:
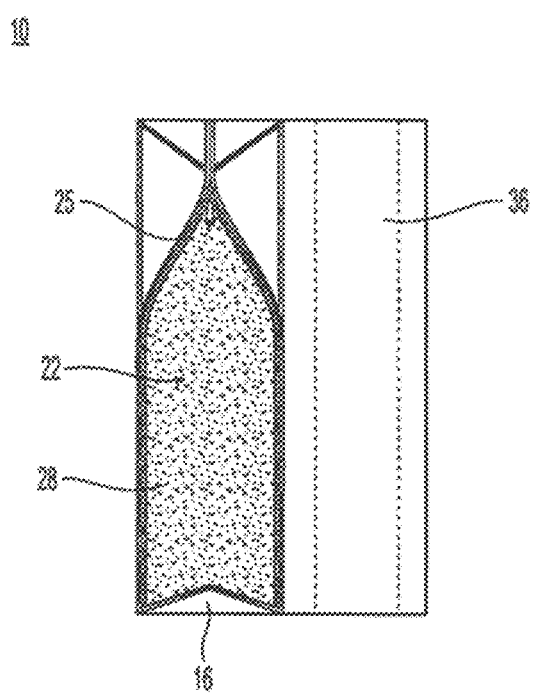
FIG. 2 is a top view of the reusable mailer bag of FIG. 1, illustrating the closure mechanism and the carrying volume.
Figure 6:
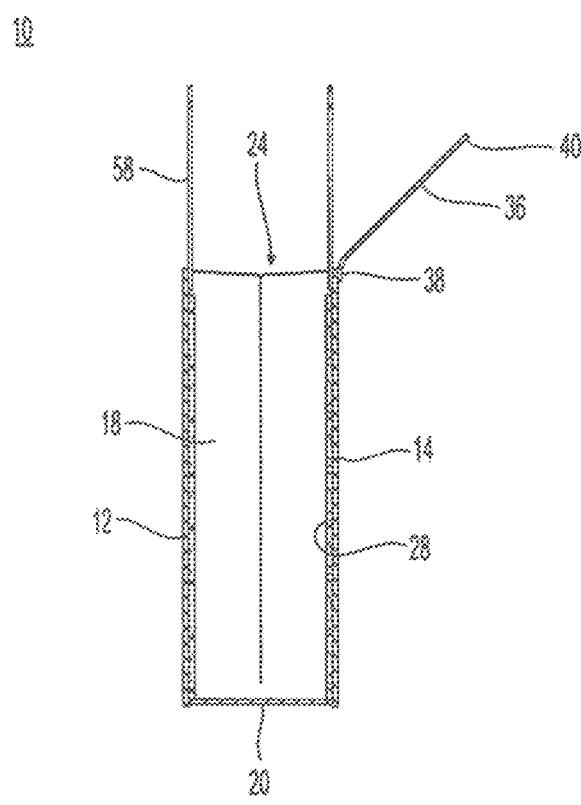
FIG. 6 is a side cross-section view of the reusable mailer bag of FIG. 1.

Referring now to FIG. 1, a mailer bag 10 is provided in accordance with the present disclosure. The mailer bag 10 includes a front panel 12, a rear panel 14, a first side panel 16, a second side panel 18, and a bottom panel 20 (FIG. 6). The panels 12, 14, 16, 18, and 20 are joined together by stitching, gussets, or other similar methods of joining to form a carrying volume 22. An opening 24 opposite the bottom panel 20 provides access to the carrying volume 22. As shown in FIG. 2, carrying volume 22 includes a closure mechanism 25, for example, a zipper, snaps, or other similar forms of closure, adjacent opening 24 that is configured to selectively close opening 24.

Panels 12, 14, 16, 18, and 20 may be formed from a fabric material. For example, panels 12, 14, 16, 18, and 20 may be formed of polypropylene, 120-180 GSM, or other similar materials. The fabric material may be woven or non-woven. The panels 12, 14, 16, 18, and 20 may include various graphical art designs including four color art designs and may include sublimation imprints. The graphical art designs may include advertising. The outer surfaces of panels 12, 14, 16, 18, and 20 may also be laminated to provide resistance to weather elements such as, for example, water. In an embodiment, the outer surfaces of panels 12, 14, 16, 18, and 20 may be formed of or may be laminated with a material that is resistant to common adhesives such as those commonly used with shipping labels. Accordingly, in some embodiments, common adhesives may not be sufficient to secure a shipping label or other materials to the outer surfaces of panels 12, 14, 16, 18, and 20. In this instance a user would adhere the shipping label 32 and flap 36 to the respective tape layers 30 and 34 as described in more detail below.

As shown in FIG. 1, the interior surface 26 of carrying volume 22, i.e., the interior surfaces of panels 12, 14, 16, 18, and 20, may include a plastic bubble lined protection layer 28 for protecting items transported in the carrying volume 22. The protection layer 28 may be removable and may include, for example, perforations, removable adhesive, or other similar features that allow for separation of the protection layer 28 from the interior surface 26 of carrying volume 22.

Figure 3:
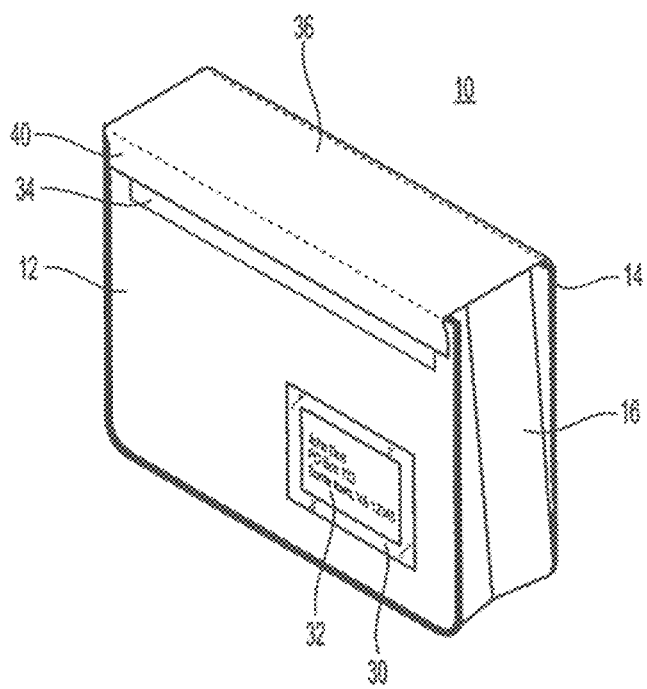
FIG. 3 is a perspective view of the reusable mailer bag of FIG. 1, illustrating the flap extended over the opening and secured to the front panel.
Figure 4:
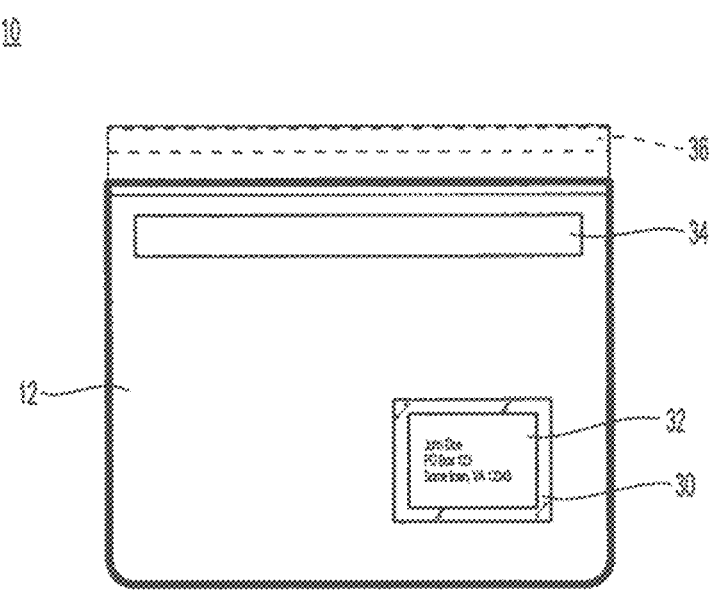
FIG. 4 is a side view of the front panel of the reusable mailer bag of FIG. 1.

As shown in FIGS. 3 and 4, a first tape layer 30 is adhered to front panel 12 and provides an adhesive friendly surface for receiving a shipping label 32. First tape layer 30 may be transparent and may be formed of a plastic material. First tape layer 30 may include an adhesive backing. In an embodiment, the adhesive backing may include an adhesive such as, for example, adhesives sold by 3M Company, that are suitable for adhering to the outer surfaces of panels 12, 14, 16, 18, and 20. In this instance, the particular adhesive of the first tape layer 30 adheres to the panels 12, 14, 16, 18, and/or 20 even if the panels 12, 14, 16, 18, or 20 are made from a material or are coated with a laminate that generally resists common adhesives. Hence, only designated tapes 30, 34 may be adherable (or adherable in a substantially secure manner) to the panels 12, 14, 16, 18, and 20 at specified locations.

Figure 7:
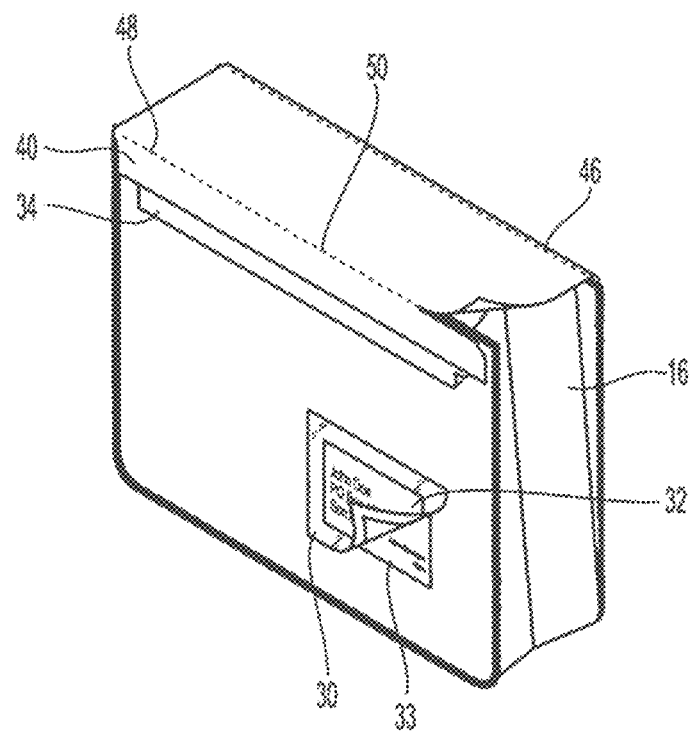
FIG. 7 is a perspective view of the reusable mailer bag of FIG. 2, illustrating partial removal of tape layers and tear strips of the reusable mailer bag.

Shipping label 32 and/or first tape layer 30 may be removable by an end user to reveal a hidden surface 33, as shown, for example, in FIG. 7. For example, in an embodiment, hidden surface 33 may include a promotional code that may be redeemable by the end user online or in a brick-and-mortar store. In an alternative embodiment, hidden surface 33 may include advertising. In yet another alternative embodiment, hidden surface 33 may include a writable surface on which the end user may take notes. Mailer bag 10 may also include a writing instrument (not shown), such as, for example, an erasable or non-permanent marker, within carrying volume 22 for use by an end user to write on the writable surface.

With continued reference to FIGS. 3 and 4, a second tape layer 34 is adhered to front panel 12 adjacent opening 24 to provide an adhesive friendly surface for receiving attachment of a flap 36. Second tape layer 34 may be transparent and may be formed of a plastic material. Second tape layer 34 may include an adhesive backing. In an embodiment, the adhesive backing may include adhesives such as, for example, adhesives sold by 3M Company, that are suitable for adhering to the outer surfaces of panels 12, 14, 16, 18, and 20. In this instance, the particular adhesive of the first tape layer 30 adheres to the panels 12, 14, 16, 18, and/or 20 even if the panels 12, 14, 16, 18, or 20 are made from a material or are coated with a laminate that generally resists common adhesives. Hence, only designated tapes 30, 34 may be adherable (or adherable in a substantially secure manner) to the panels 12, 14, 16, 18, and 20 at specified locations. Rear panel 14 may also include a third tape layer (not shown) similar to second tape layer 34.

First and second tape layers 30 and 34 are removably attached to front panel 12 by the adhesive backing or other similar forms of attachment. In an embodiment, the adhesive backing may include an adhesive that is a different kind of adhesive than that used for shipping label 32 to provide for adhesion to outer surfaces of panels 12, 14, 16, 18, and 20 when the outer surfaces of panels 12, 14, 16, 18, and 20 are resistant to adhesion of common adhesives such as those used for shipping labels.

Flap 36 is attached to rear panel 14 at a first end 38 (FIG. 6) and is configured to extend across the opening 24 to cover opening 24, as shown in FIG. 3. A second end 40 of flap 36 is securable to the second tape layer 34 of front panel 12 by an adhesive strip 42 (FIG. 3). As shown in FIG. 1, flap 36 includes a protective layer 44 covering adhesive strip 42 which is removable from flap 36 prior to securing second end 40 to second tape layer 34 of front panel 12. Flap 36 includes a first tear strip 46 adjacent first end 38 and a second tear strip 48 adjacent second end 40 which are tearable to remove flap 36 from mailer bag 10, as shown, for example, in FIG. 7. First and second tear strips 46 and 48 may include perforations 50. Specifically, the first and second tear strips 46 and 48 may include fine perforations that allow for the clean separation of two portions of the fabric, e.g., two portions of the flap 36, while providing a substantially smooth edge on each of the portions of the fabric. The fine perforations may be created by using needles having a specific size and shape and by creating each perforation a specific distance from adjacent perforations. In embodiments, the perforations are made in a unique pattern to optimize a smooth edge after being torn while maintaining structural integrity during shipping.

Figure 5:
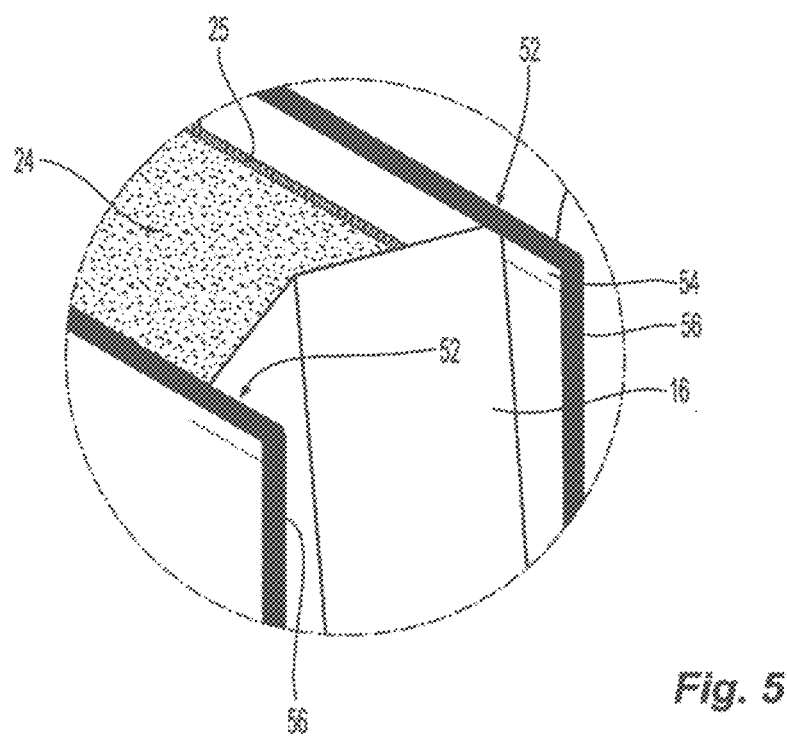
FIG. 5 is an enlarged view of the area of detail depicted in the FIG. 1.

As shown in FIG. 1, each of first and second side panels 16 and 18 includes recessed portions 52 adjacent opening 24 to provide additional protection against pilfering when the flap 36 is secured to front panel 12 to close opening 24. As shown in more detail in FIG. 5, recessed portions 52 are formed by attaching each of side panels 16 and 18 to front and back panels 12 and 14 respectively adjacent opening 24 through the use of stitching, heat welding, or other similar methods, such that side panels 16 and 18 are recessed relative to the side edges 56 of front and back panels 16 and 18. Recessed portions 52 are also configured to inhibit carrying volume 22 and mailer bag 10 from being reversed. In some embodiments, the mailer bag 10 is non-reversible.

As shown in FIGS. 1 and 6, each of front panel 12 and rear panel 14 includes a handle 58, 60 attached to interior surface 26 adjacent opening 24. Handles 58 and 60 are configured to be received entirely within carrying volume 22 and are extendable out of opening 24 when opening 24 is not closed by flap 36.

The use and operation of mailer bag 10 will now be described below.

In an initial state, opening 24 is uncovered with flap 36 attached to rear panel 14, as shown in FIG. 1. An item or product (not shown) to be shipped to an end user, e.g., a customer or consumer, is inserted into carrying volume 22 and a shipping label 32 is applied to the first tape layer 30. Handles 58 and 60 are positioned entirely within carrying volume 22 and the protective layer 44 of flap 36 is removed to expose adhesive strip 42. Flap 36 is then extended across opening 24 to close opening 24, as shown in FIG. 3. Adhesive strip 42 is attached to second tape layer 34 of front panel 12 to secure flap 36 in place. Mailer bag 10 is now prepared for shipping to an end user.

Referring now to FIG. 7, after shipping, once the end user has received mailer bag 10, the flap 36 is removed by tearing along the tear strips 46 and 48 of flap 36. In addition, or alternatively, the second tape layer 34 may be removed from front panel 12 to remove flap 36. In an embodiment, first end 38 of flap 36 may also be removable from rear panel 14 by removing a third tape layer (not shown) on rear panel 14 that is similar to second tape layer 34.

With continued reference to FIG. 7, the end user may remove the shipping label 32 and/or first tape layer 30 to reveal hidden surface 33 which, as described above, may include promotional codes, advertising, or a writable surface.

Once the flap 36 has been removed, handles 58 and 60 may be extended from the carrying volume 22 through opening 24 such that mailer bag 10 is converted into a carrying bag or tote.

In an embodiment, replacement first and second tape layers (not shown) may be provided or included with mailer bag 10 that are similar to first and second tape layers 30 and 34 may be added to front panel 12 by the end user. A new shipping label 32 may then be attached to the replacement first tape layer to allow for further shipping. In this embodiment, an additional adhesive strip (not shown) and protective layer (not shown) which is similar to adhesive strip 42 and protective layer 44 may be provided on flap 36 adjacent tear strip 46. The flap 36 is partially detached from mailer bag 10 by only tearing along tear strip 46 to provide access to carrying volume 22 through opening 24 and the flap 36 may be extended over opening 24 to close carrying volume 22 once an item to be shipped has been added to carrying volume 22. The additional adhesive strip and protective layer allows flap 36 to be secured to the second replacement tape layer in a similar manner to that described above for adhesive strip 42, protective layer 44, and second tape layer 34 to provide a second closure of the opening 24 for the second shipping. In this manner the mailer bag 10 may be re-used by the end user for shipping another item or product.

Figure 8:
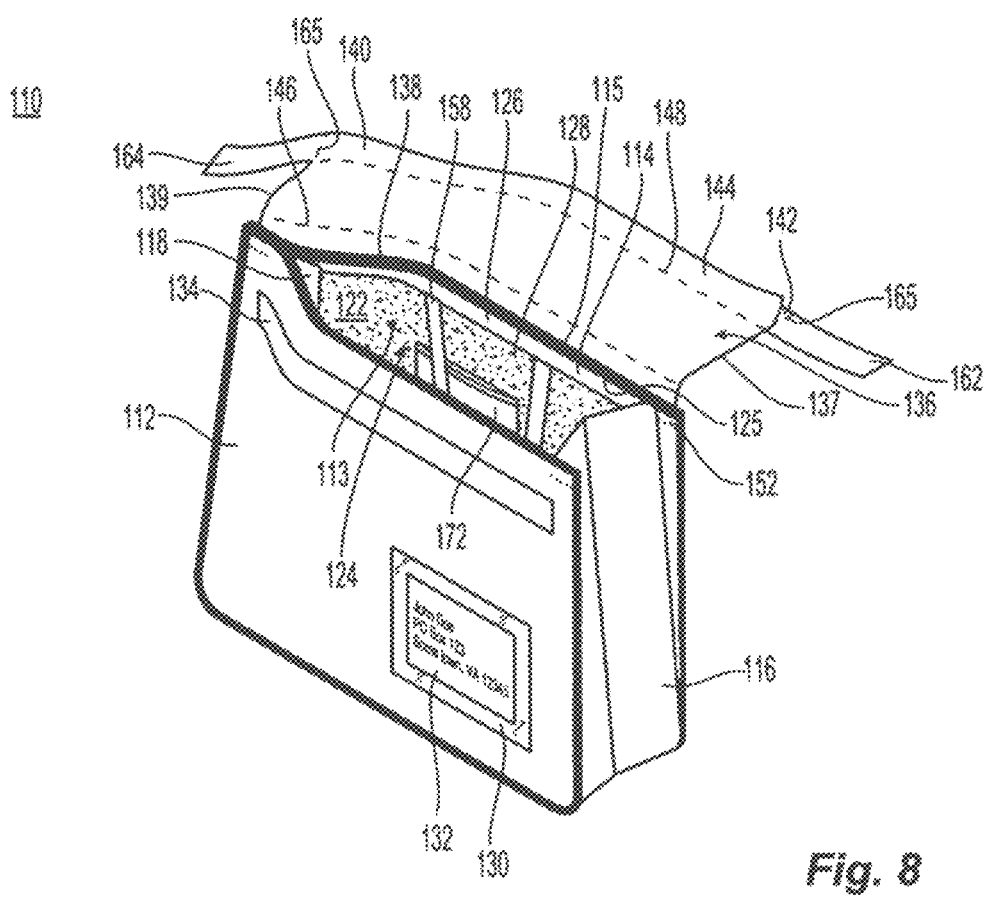
FIG. 8 is a perspective view of another reusable mailer bag provided in accordance with the present disclosure.
Figure 9:
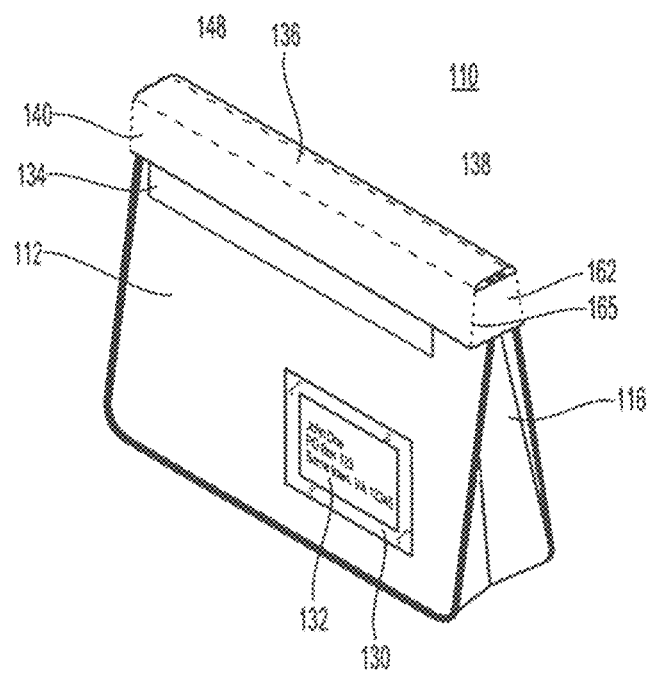
FIG. 9 is a perspective view of the reusable mailer bag of FIG. 8, illustrating a flap extended over an opening of the bag and a side extension secured to a rear panel.
Figure 10:
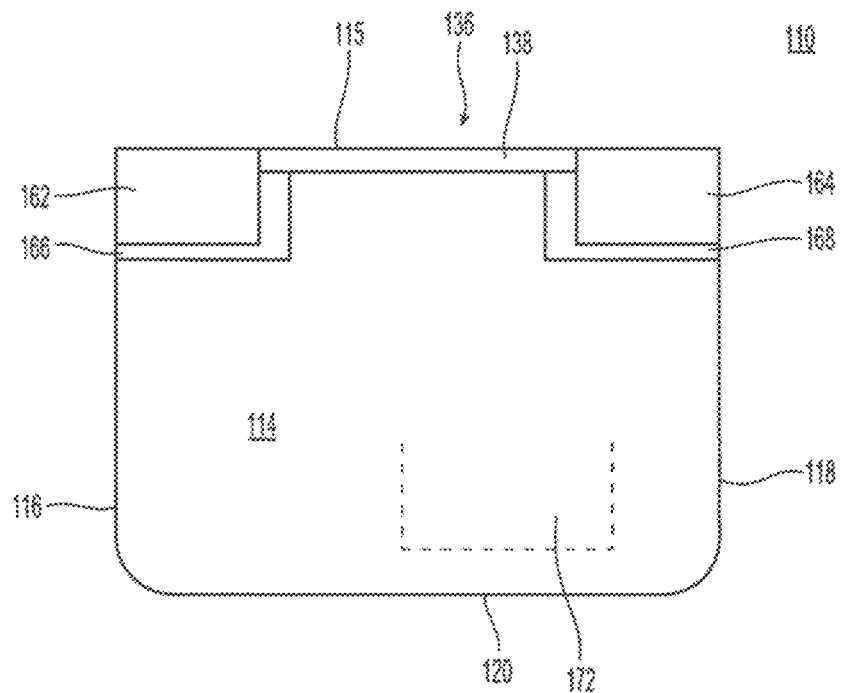
FIG. 10 is a rear view of the reusable mailer bag of FIG. 8.

With reference to FIGS. 8-10, another mailer bag 110 is provided in accordance with the present disclosure. The mailer bag 110 is similar to the mailer bag 10 detailed above with like elements labeled with a similar label with a "1" preceding the previous label and will not be detailed herein for brevity. The mailer bag 110 includes a front panel 112, a rear panel 114, first side panel 116, a second panel 118, and a bottom panel 120 that are joined together by stitching, gussets, adhesives, welding, or other similar methods of joining to form a carrying volume 122.

The mailer bag 110 includes a flap 136 configured to extend across and close an opening 124 of the mailer bag 110, which is opposite the bottom panel 120. The flap 136 includes a first end portion 138, a second end portion 140, a first side flap or extension 162, and a second side flap or extension 164. The first end portion 138 is attached to the rear panel 114 and the second end portion 140 is securable to the front panel 112. The front panel 112 includes a first tape layer 130 and a second tape layer 134 that are releasably attached to the front panel 112. The second end portion 140 of the flap 136 may be secured to the front panel 112 by the second tape layer 134.

The rear panel 114 may include a third tape layer 166 and a fourth tape layer 168. The third tape layer 166 is adjacent a top edge 115 of the rear panel 114 and the first side panel 116. The fourth tape layer 168 is adjacent the top edge 115 and the second side panel 118. The third and fourth tape layers 166, 168 may form a single continuous tape layer adjacent the top edge 115.

The first side extension 162 extends from a first side edge 137 of the flap 136 and the second side extension 164 extends from a second side edge 139 of the flap 136. In embodiments, the first and second side extensions 162, 164 extend from portions of the first and second side edges 137, 139 entirely along the second end portion 140 of the flap 136. The flap 136 may include tear strips 165 along the first and second side edges 137, 139 where the first and second side extensions 162, 164 meet the first and second side edges 137, 139. The tear strips 165 may form a continuous tear strip with a tear strip 148 between the second end portion 140 and a main portion of the flap 136.

The first and second side extensions 162, 164 are configured to cover portions of the first and second side panels 116, 118, respectively, to prevent tampering with contents in the carrying volume 112 when the mailer bag 110 is sealed for mailing. The first and second side extension 162, 164 may allow for mailer bags having side panels 116, 118 having a dimension along the bottom panel 120 greater than eight inches. For example, the side panels 116, 118 may have a dimension along the bottom portion 120 in a range of about 8 inches to about 14 inches.

In some embodiments, the first and second side extension 162, 164 extend from the first and second side edges 137 of the flap along the first end portion 140 of the flap 136 such that the first and second side extensions 162, 164 extend from the rear panel 114 and releasably secure to the front panel 112. In such embodiments, the third and fourth tape layers 166, 168 may be disposed on the front panel 112. Alternatively, the third and fourth tape layers 166, 168 may be disposed on a surface of the second end portion 140 opposite a surface of the second end portion 140 that is secured to the front panel 112 such that the first and second side extension 162, 164 are secured directly to the second end portion 140. In embodiments, the first and second side extensions 162, 164 may secure to the second tape layer 134 and include the third and fourth tape layers 166, 168 on a surface opposite the surface that secures the second tape layer 134 such that the second end portion 140 is secured to the second, third, and fourth tape layers 134, 166, 168 to close the opening 124.

The front and/or rear panel 112, 114 may include an internal pocket 172 on an inner surface 113 defining the carrying volume 122. The internal pocket 172 may be formed of a sheet of material secured to the inner surface 113. The internal pocket 172 may allow the items to be secured to the front and/or rear panel 112, 114 and secured separate from the carrying volume 122. For example, a cooling medium, e.g., dry ice, may be secured within the internal pocket 172 to keep the carrying volume 122 at or below a desired temperature during shipping. The internal pocket 172 may include a closure mechanism similar to the closure mechanism 125 to selectively close the internal pocket 172.

In some embodiments, the front, rear, bottom, and/or side panels 112, 114, 116, 118, 120 may be insulated, padded, and/or coated to protect the contents of the carrying volume and/or the mailer bag 110.

Continuing to refer to FIGS. 8-10, the use of the mailer bag 110 to ship one or more items and then to convert the mailer bag 110 into a tote is described in accordance with the present disclosure. The mailer bag 110 may be provided in a flat, folded configuration such that handles 158 of the mailer bag 110 are disposed within a carrying volume 122 of the mailer bag 110. The mailer bag 110 is unfolded such that the carrying volume 122 is accessible through the opening 124. The item or items to be shipped are placed within the carrying volume 122. The item or items may be wrapped in protective packaging. In some embodiments, a cooling medium, e.g., dry ice, may be secured in the internal pocket 172 of the mailer bag 110 before or after the item(s) is placed in the carrying volume 122.

With the item(s) to be shipped are placed within the carrying volume 122, a closure mechanism 125 may be used to close the opening 124 of the mailer bag 110. The closure mechanism 125 may be a zipper, string and eyelets, a hook and loop fastener system, or another suitable closure mechanism. A top portion of each of the front and rear panels 112, 114 are pinched together to close the opening 124 for shipping. As the front and rear panels 112, 114 are pinched together, each of the first and second side panels 116, 118 may be folded into the carrying volume 122. The flap 136 is then folded over the opening 124 and the second end portion 140 is secured to the second tape strip 134. To secure the second end portion 140 to the second tape strip 134, a protective layer 144 may be removed from over an adhesive strip 142 to expose the adhesive strip 142 which is subsequently pressed into the second strip 134 and/or the front panel 112.

The first and second side extensions 162, 164 are then folded over the respective first or second side panel 116, 118 and secured to the respective one of the third or fourth tape strip 166, 168. The first and/or second side extensions 162, 164 may include an adhesive strip and protective layer similar to the adhesive strip 142 and protective layer 144. The first and second side extension 162, 164 further protect access to the carrying volume 122 when the mailer bag 110 is in transit.

The mailer bag 110 may be labeled and shipped in a manner similar to the mailer bag 10 detailed above.

When the mailer bag 110 is received, the first side extension 162, second side extension 164, and/or the flap 136 may be pulled to open the mailer bag 110. Specifically, as the respective one of the extensions 162, 164 or the flap 136 is pulled, the tear strips 146, 148, 165 may rip to allow for access to the carrying volume 122. When the mailer bag 110 includes a closure mechanism 125, the closure mechanism 125 may prevent access to the carrying volume 122 and may also need to be opened, e.g., unzipped, to access the carrying volume 122 after the tear strip or strips 146, 148, 165 are ripped. The tear strips 146, 148, 165 are designed to be able to withstand the rigors of being shipped and to be easily ripped when force is directly applied along or adjacent the respective tear strip 146, 148, 165. In addition, the tear strips 146, 148, 165 are configured to rip such that a clean edge remains after the tear strip 146, 148, 165 is ripped. Such a clean edge may be aesthetically preferred to a jagged edge when the mailer bag 110 is reused.

With the carrying volume 122 accessible through the opening 124, the contents may be removed from the carrying volume 122. The mailer bag 110 may then be converted to reusable tote by removing the first, second, third, and/or fourth tape strips 130, 134, 166, 168 from the respective panel to remove any remaining portions of the flap 136, first side extension 162, and/or second side extension 164 from the mailer bag 110. The handles 158 may then be pulled from within the carrying volume 122 such that the mailer bag 110 is converted into a reusable tote. As a reusable tote, the closure mechanism 125 may be used to close the carrying volume 122.

Figure 11:
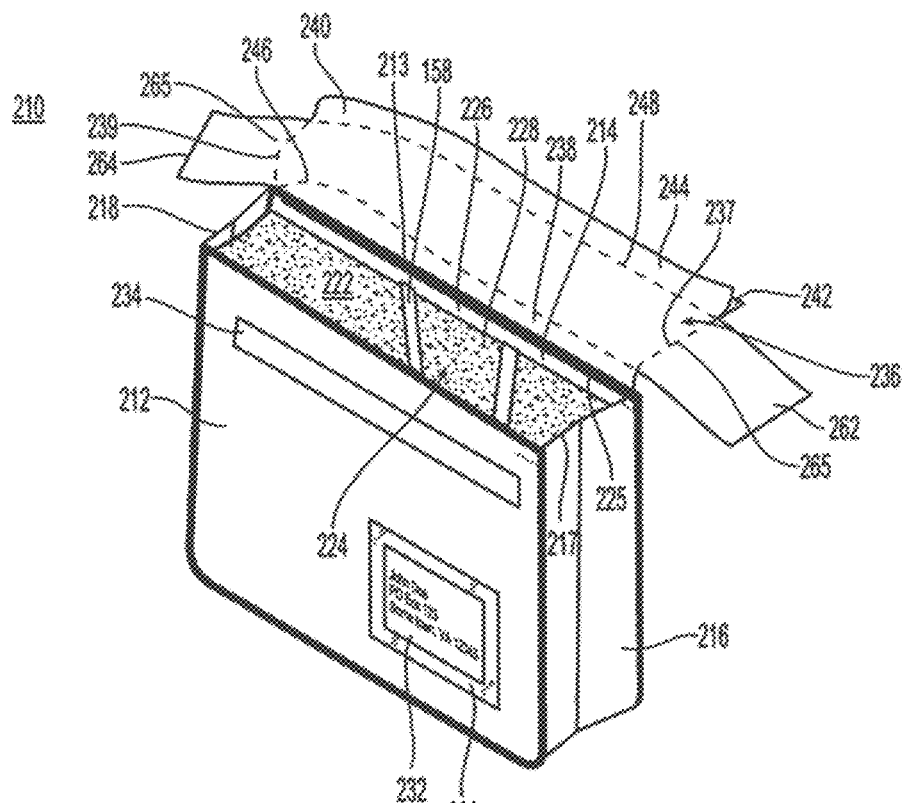
FIG. 11 is a perspective view of another reusable mailer bag provided in accordance with the present disclosure.
Figure 12:
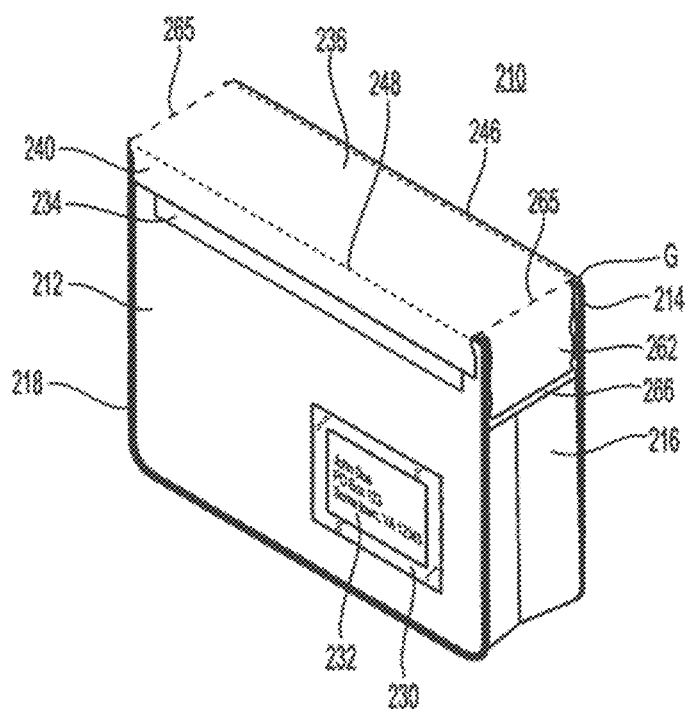
FIG. 12 is a perspective view of the reusable mailer bag of FIG. 11, illustrating a flap extended over an opening of the bag and a side extension secured to a side panel.

With reference to FIGS. 11 and 12, another mailer bag 210 is provided in accordance with the present disclosure. The mailer bag 210 is similar to the mailer bag 10 detailed above with like elements labeled with a similar label with a "2" preceding the previous label and will not be detailed herein for brevity. The mailer bag 210 includes a front panel 212, a rear panel 214, first side panel 216, a second panel 218, and a bottom panel 220 that are joined together by stitching, gussets, adhesives, welding, or other similar methods of joining to form a carrying volume 222.

The mailer bag 210 includes a flap 236 configured to extend across and close an opening 224 of the mailer bag 210, which is opposite the bottom panel 220. The flap 236 includes a first end portion 238, a second end portion 240, a first side flap or extension 262, and a second side flap or extension 264. The first end portion 238 is attached to the rear panel 214 and the second end portion 240 is securable to the front panel 212. The front panel 212 includes a first tape layer 230 and a second tape layer 234 that are releasably attached to the front panel 212. The second end portion 240 of the flap 236 may be secured to the front panel 212 by the second tape layer 234.

The first side panel 216 may include a third tape layer 266 and the second side panel 218 may include a fourth tape layer (not explicitly shown). The third and fourth tape layers 266 are adjacent a top edge 217 of the respective side panel 216, 218.

The first side extension 262 extends from a first side edge 237 of the flap 236 and the second side extension 264 extends from a second side edge 239 of the flap 236. In embodiments, the first and second side extensions 262, 264 extend from portions of the first and second side edges 237, 239 disposed between the first and second end portions 238, 240 of the flap 236. The flap 236 may include tear strips 265 along the first and second side edges 237, 239 where the first and second side extensions 262, 264 meet the first and second side edges 237, 239. The tear strips 265 may form a continuous tear strip with a tear strip 248 between the second end portion 240 and a main portion of the flap 236 and/or a tear strip 248 between the first end portion 238 and the main portion of the flap 236.

The first and second side extensions 262, 264 are configured to cover a gap G between the flap 236 and a respective one of the first or second side panels 216, 218 to prevent tampering with contents in the carrying volume 212 when the mailer bag 210 is sealed for mailing. As shown, the mailer bag 210 is scalable without pinching a top portion of the front and rear panels 212, 214 together such that the mailer bag 210 remains substantially cuboidic in shape, i.e., a three-dimensional shape having six rectangular surfaces. The first and second side extension 262, 264 may allow for mailer bags having side panels 216, 218 having a dimension along the bottom panel 220 greater than eight inches. For example, the side panels 216, 218 may have a dimension along the bottom portion 220 in a range of about 8 inches to about 24 inches.

With continued reference to FIGS. 11 and 12, the use of the mailer bag 210 to ship one or more items and then to convert the mailer bag 210 into a tote is described in accordance with the present disclosure. The mailer bag 210 may be provided in a flat, folded configuration such that handles 258 of the mailer bag 210 are disposed within a carrying volume 222 of the mailer bag 210. The mailer bag 210 is unfolded such that the carrying volume 222 is accessible through the opening 224. The item or items to be shipped are placed within the carrying volume 222. The item or items may be wrapped in protective packaging. In some embodiments, a cooling medium, e.g., dry ice, may be secured in an internal pocket 272 of the mailer bag 210 before or after the item(s) is placed in the carrying volume 222.

With the item(s) to be shipped are placed within the carrying volume 222, a closure mechanism 225 may be used to close the opening 224 of the mailer bag 210. The closure mechanism 225 may be a zipper, string and eyelets, a hook and loop fastener system, or another suitable closure mechanism. The flap 236 is then folded over the opening 224 and the second end portion 240 is secured to the second tape strip 234. To secure the second end portion 240 to the second tape strip 234, a protective layer 244 may be removed from over an adhesive strip 242 to expose the adhesive strip 242 which is subsequently pressed into the second strip 234 and/or the front panel 212.

The first and second side extensions 262, 264 are then folded over the respective first or second side panel 216, 218 and secured to the respective one of the third or fourth tape strip 266. The first and/or second side extensions 262, 264 may include an adhesive strip and protective layer similar to the adhesive strip 242 and protective layer 244. The first and second side extension 262, 264 further protect access to the carrying volume 222 when the mailer bag 210 is in transit while allowing the mailer bag 210 to remain in a substantially cuboidic shape.

The mailer bag 210 may be labeled and shipped in a manner similar to the mailer bag 20 detailed above.

When the mailer bag 210 is received, the first side extension 262, second side extension 264, and/or the flap 236 may be pulled to open the mailer bag 210. Specifically, as the respective one of the extensions 262, 264 or the flap 236 is pulled, the tear strips 246, 248, 265 may rip to allow for access to the carrying volume 222. When the mailer bag 210 includes a closure mechanism 225, the closure mechanism 225 may prevent access to the carrying volume 222 and may also need to be opened, e.g., unzipped, to access the carrying volume 222 after the tear strip or strips 246, 248, 265 are ripped. The tear strips 246, 248, 265 are designed to be able to withstand the rigors of being shipped and to be easily ripped when force is directly applied along or adjacent the respective tear strip 246, 248, 265. In addition, the tear strips 246, 248, 265 are configured to rip such that a clean edge remains after the tear strip 246, 248, 265 is ripped. Such a clean edge may be aesthetically preferred to a jagged edge when the mailer bag 210 is reused.

With the carrying volume 222 accessible through the opening 224, the contents may be removed from the carrying volume 222. The mailer bag 210 may then be converted to reusable tote by removing the first, second, third, and/or fourth tape strips 230, 234, 266 from the respective panel to remove any remaining portions of the flap 236, first side extension 262, and/or second side extension 264 from the mailer bag 210. The handles 258 may then be pulled from within the carrying volume 222 such that the mailer bag 210 is converted into a reusable tote. As a reusable tote, the closure mechanism 225 may be used to close the carrying volume 222.

Figure 14C:
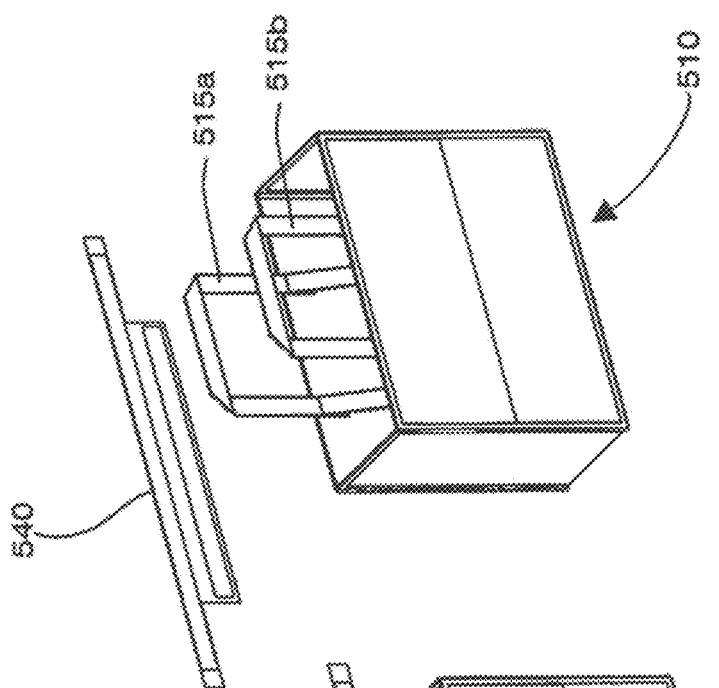
FIGS. 14A-14C show a flow diagram of another envisioned method of receiving and opening the mailer bag and method of reusing the reusable mailer bag.
Figure 14B:
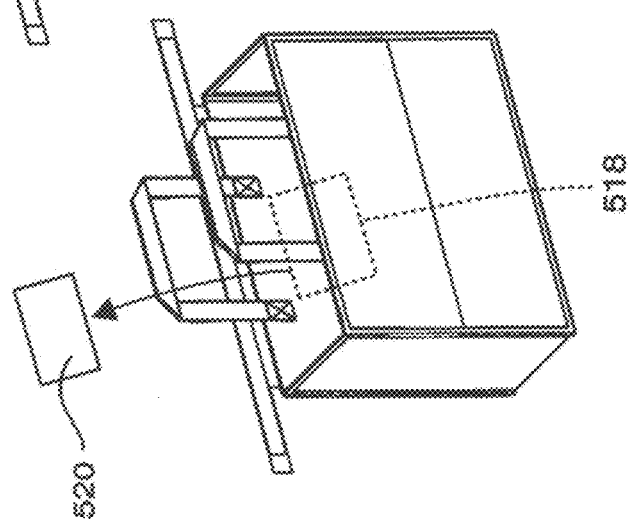
Figure 14A:
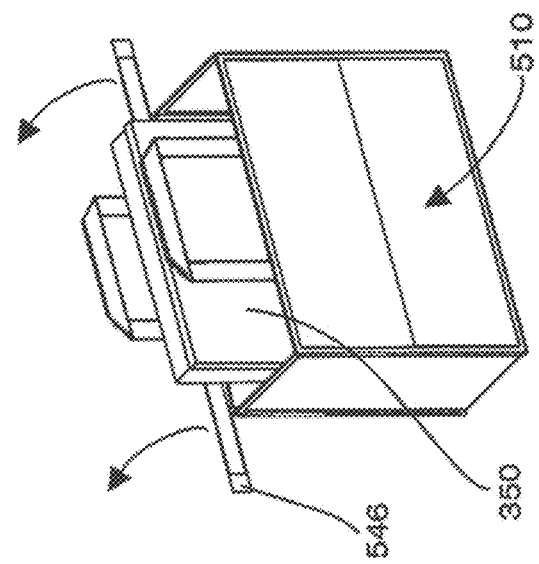

FIGS. 13A-13F show another embodiment of a reusable mailer bag 510 for use in accordance with the present disclosure and a method of assembling the same for mailing. FIGS. 14A-14C show one envisioned method of removing the contents of the mailer bag 510 for reuse. Turning initially to FIGS. 13A-13F, reusable mailer 510 is similar to the other reusable mailer bags described herein and incorporates all of the same features and advantages attributed thereto, but for the purposes of brevity will only be described in such detail as necessary to explain the unique differences of mailer 510. Mailer bag 510 includes a removable tab or strip 540 that is attached to the rear 514 via a PSA adhesive 542 (or other similar type adhesive).

Once a gift item 350 is purchased at a local store, the gift item 350 can be carried around within the store within the mailer bag 510 until checkout via handles 515a, 515b. A gift card 520 comes with the mailer bag 510 and can be coordinated based on a Holiday, particular event (e.g., Birthday, Anniversary, Graduation, etc.), store-of-purchase, city, college, country, advertising, etc. After checkout, the user can simply fill in the card 520 with a given sentiment to personalize the card 520, place the card 520 within the pouch 518 defined within the inside surface of the front 512 or rear 514 panel of the mailer bag 510 and close the pouch 518. The user then tucks the handles 515a, 515b within the inside of the mailer bag 510 and then inserts the gift item 350 into the mailer bag 510.

Since the mailer bag 510 essentially acts as durable gift wrapping, the user simply collapses the sides 517 of the mailer bag 510 and adheres first portion 542 (after peeling protective mask therefrom) of the protective strip 540 to the rear panel 514 and pulls the remaining part of the protective strip 540 and second portion 545 around the top of the mailer bag 510 to enclose the gift 350 and adheres the second portion 545 (after peeling protective mask therefrom) to the front panel 512 of the mailer bag 510. The user then folds the side tabs 546 of the strip 540 around the sides 517 of the mailer bag 510. Once sealed, the user places the proper postage on the mailer bag 510 (onto the front or rear panel 512, 514, respectively) and mails the mailer bag 510 to the intended recipient. In embodiments, a postage compartment 521 may be included on the front or rear panels 512, 514, respectively.

In embodiments, the first portion 542 and side tabs 546 of the strip 540 may be made from a stretchable or elastic material to facilitate or accommodate larger gift items 350 within the reusable bag 510. In embodiments, the pouch 518 includes a self-closing mechanism 519 to facilitate retention of items contained therein and for the purposes of reuse. In other embodiments, the self-closing mechanism 519 of the pouch 518 includes a flap to retain items therein. In still other embodiments, the self-closing mechanism 519 of the pouch 518 includes a locking mechanism to secure items contained therein such as a magnetic clasp, hook and loop fasteners commonly sold under the trademark Velcro®, snap-locks, tab locks or other locking mechanisms know in the art.

In embodiments, once the gift item 350 is secured within the reusable mailer bag 510, one of the front panel 512 or rear panel 514 may include a pre-paid mailing label (not shown) that simply needs to be scanned at the register or input into a kiosk with a mailing address to print a mailing label and the checkout counter can accept the package for shipping. The mailing label may be secured within the postage compartment 521.

In FIGS. 14A-14C, upon receipt of the reusable mailer bag 510, the recipient peels backs the side tabs 546 of the strip 540 and peels off the first and second portions 542, 545 of the protective strip 540 from the front of the reusable bag 510 to open the sides 517 and expose the interior of the mailer bag 510 revealing the gift item 350 contained therein. The gift recipient then removes the gift item 350 from the mailer bag 510 revealing the card pouch 518 containing the personalized gift card 520 therein. Once the gift item 350 has been opened and the sentiment conveyed, the recipient can convert the reusable mailer bag 510 into a tote 510' simply by removing the protective strip 540 from the front panel 512 and rear panel 514 and exposing the handles 515a, 515b from within the interior of the reusable mailer bag 510.

In other embodiments, users may custom print a reusable mailer bag 510 and gift card 520 on a kiosk or on-line. Again, the reusable mailer bags 510 may be themed based on Holidays, events, birthdays, stores, advertising, colleges, countries, etc. In these envisioned embodiments, the user would log onto a kiosk or computer and enter data or pick from a pre-organized menu of different mailer bags 510 based on the size of bag, size of gift, cost, detail of graphics, type of material, shipping cost, etc. Some reusable mailing bags 510 might be available to be customized and printed with basic graphics at the kiosk while others might be available in a few days or weeks. Other more common reusable mailer bags 510 with coordinating gift cards 520, e.g., Holiday themes, Birthday, Weddings, Anniversaries, etc., as discussed above, may be made "ready for purchase" and/or for use immediately at the store, on-line or at point of purchase.

FIGS. 15A-15I show another embodiment of a reusable mailer bag 610 for use in accordance with the present disclosure and a method of using the same. More particularly, reusable mailer 610 is similar to the other reusable mailer bags, in particular, mailer bag 510 described above, and incorporates all of the same features and advantages attributed thereto, but for the purposes of brevity will only be described in such detail as necessary to explain the unique differences of mailer 610. Mailer bag 610 includes a removable tab or strip 640 that is attached to the rear panel 614 via a PSA adhesive 642 (or other similar type adhesive).

Once a gift item 350 is purchased, the gift item 350 can be carried around within the mailer bag 610 until checkout via handles 615a, 615b. A gift card 520 comes with the mailer bag 610 (or can be purchased along-side or separately) and can be coordinated based on one or more specialized events as described above. After checkout, the user personalizes the card 520 and places the card 520 within the pouch 618 defined within the front 612 or rear 614 panel of the mailer bag 610 and closes the pouch 618. The user then tucks the handles 615a, 615b within the mailer bag 610 and inserts the gift 350.

Similar to above, the user collapses the sides 617 of the mailer bag 610 and the adheres the first and second portions 642, 645 of the strip 640 around the top of the mailer bag 610 as described above to close the gift within the mailer bag 610. In this instance, however, a protective peel-away film 613 is disposed on the front panel 612 and back panel 614 of the mailer bag 610 and the strip 640 is adhered to the protective film 613 on the rear panel 614 in the initial step (FIG. 15A) and to the front panel 612 to close the mailer bag 610 with the gift 350 disposed therein in the step shown in FIG. 15E. The user then folds the side tabs 646 of the strip 640 around the sides panel 617 of the mailer bag 610 and adheres the sides tabs 646 of the strip 640 to the protective film 613.

Once sealed, the user places the proper postage on the mailer bag 610 (onto the front or rear panel 612, 614, respectively) and mails the mailer bag 610 to the intended recipient. In embodiments, a postage compartment 621 may be included on the front or rear panels 612, 614, respectively.

Similar to the above embodiments, the first and second portions 642, 645 and sides 646 of the strip 640 may be made from a stretchable or elastic material to facilitate or accommodate larger gift items 350 within the reusable bag 610. Moreover, pouch 618 may include a self-closing mechanism, e.g., a locking mechanism 619. Further, a pre-paid mailing label (not shown) may be scanned at the register or input into a kiosk with a mailing address to print a mailing label at the checkout counter for shipping purposes.

Turning now to FIGS. 15G-15I, upon receipt of the reusable mailer bag 610, instead of trying to peel the protective strip 640 from the bag 610 as described above, in this envisioned embodiment, the gift recipient peels the protective film 613 from either the front or rear panel 612, 614, respectively, of the mailer bag 610 which, in turn, peels the protective strip 640 and exposes the contents of the mailer bag 610. It is envisioned that the protective film 613 may be made from a different material that is easier to peel from the mailer bag 610 thereby facilitating the process of opening the mailer bag 610 and exposing the gift 350. Moreover, it is envisioned that the protective film 613 may be distinguishable in color or texture from the mailer bag 610 or the protective strip 640 making the protective film 613 easier to locate, handle, grasp, and/or peel from the mailer bag 610, or in some cases, discard.

It is envisioned that the protective strip 640 and the protective film 613 may be made from materials or include an adhesive that has a higher bonding strength to one another than the protective film 613 has to the mailer bag 610 for both shipping and handling purposes and for facilitating removal of the protective film 613 from the mailer bag 610 by the gift recipient. Or the protective film 613 may use a first adhesive having one bonding strength or coefficient of adhesion to the mailer bag 610 and the protective strip 640 may use a different adhesive having a higher bonding strength.

In embodiments, both the protective strip 640 and protective film 613 may be made from recyclable or biodegradable materials. The protective film 613 may include indicia 627 printed thereon facilitating assembly of the mailer bag 610, e.g., directions for use, may include visual or fiducial markings for placing the protective strip 640 and side tabs 646 on the front and rear panels 612, 614, respectively, of the mailer bag 610, and/or may include advertising or holiday themes which can be imprinted on the protective film 613 and adhered to the mailer bag 610.

As can be appreciated, in certain instances, it would be desirable to have the indicia 627 imprinted on the protective film 613 come off with the protective film 613, e.g., directions, fiducial markings, etc., so the mailer bag 610 can be used as a reusable tote 610', whereas in other instances, it would be desirable to have the certain elements of the mailer bag 610 remain, e.g., collegiate advertising or store indicia. In embodiments, the protective film 613 may have a dual purpose and be utilized to expose secondary indicia 629, e.g., additional advertising, a secondary layer of store indicia or, in certain instances, a promotional item, gift, discount coupon/code, or prize. As can be appreciated, the protective film 613 would need to include some level of opaqueness or color to preclude the user from visualizing the secondary indicia 629 behind the protective film 613. In certain instances, indicia 627 may be imprinted onto protective film 613 in such a manner as to hide the secondary indicia 629.

As shown in FIG. 15G, the gift recipient pulls the protective film 613 from the front panel 612 (or rear panel 614), which, in turn, peels the protective strip 640 therealong. The gift recipient pulls the protective film 613 across the face of the front panel 612 in the direction of the arrows "$P_1$" (generally across the face of the mailer bag 610 and towards the top thereof), then pulls the protective film 613 around one side 617 of the mailer bag 610 to release the side tabs 646 of the protective strip 640 and then peels the remainder of the protective film 613 from the rear panel 614 to expose the gift 350 within the mailer bag 610.

The gift recipient then removes the gift item 350 from the mailer bag 610 revealing the card pouch 618 containing the personalized gift card 520 therein. Once the gift item 350 has been opened and the sentiment conveyed, the recipient can convert the reusable mailer bag 610 into a tote 610' simply by removing the protective film 613 and protective strip 640 as described above from the mailer bag 610 and exposing the handles 615a, 615b from within the interior of the reusable mailer bag 610 (FIG. 15I).

FIGS. 16A-16C show various views of another embodiment of the reusable mailer bag which is shaped in the form of a lunch box, hereinafter termed "mailer/lunch box 710". Again, for the purposes of brevity, mailer/lunch box 710 is similar to the other reusable mailer bags described above and incorporates all of the same features and advantages attributed thereto but will only be described in such detail as necessary to explain the unique differences of mailer/lunch box 710.

Similar to the mailer bags above, mailer/lunch box 710 includes a removable tab or strip 740 that is attached to the top panel 712 via an adhesive. Assembling the mailer/lunch box 710 for mailing and removing the gift 350 from within the mailer/lunch box 710 are similar to the mailer bags described above with the exception that top panel 712 of the mailer/lunch box 710 includes a zipper 795 disposed along the side 717 thereof which is configured to enclose the gift 350 therein for shipping and secure contents therein during transport when converted after shipping to a lunch box 710'. Other mechanism for securing the items within the carrying volume are also contemplated, e.g., magnetically engaging elements, latch and catch mechanism, and mechanically interlocking hook and loop fasteners.

Mailer/lunch box 710 also includes an insulated internal liner 755 disposed therein which is configured to thermally insulate the components of the mailer/lunch box 710 during transport or the lunch box 710' after conversion. The internal liner 755 may also be waterproof and include multiple layers of material, e.g., a layer of semi-pliable aluminum foil 755a (or a material with similar insulative, waterproof, thermally conductive properties), a layer of additional insulation 755b, and a rubberized or vulcanized bottom layer 755c (FIG. 16C). Other known insulating liners are envisioned. A removable strap 791 may be enclosed within the carrying volume and selectively engaged to the opposing side panels 717 after mailing.

FIGS. 17A-17D show various views of another embodiment of the reusable mailer bag which is shaped in the form of a lunch bag, hereinafter termed "mailer/lunch bag 810". Mailer/lunch bag 810 is similar to the mailer/lunch box 710 described above, and incorporates all of the same features and advantages attributed thereto such as a protective strip 840 (FIG. 17A), but also includes removable handles 815a, 815b similar to the other bags described above for use as a lunch tote 810" (FIG. 17B) and the zipper 895 is elongated handle to enclose the top of the mailer/lunch bag 810 (FIG. 17C) and lunch bag 810' (FIG. 17D). Mailer/lunch bag 810 also includes an insulated internal liner 855 disposed therein which is configured to thermally insulate the components of the mailer/lunch bag 810 during transport or the lunch bag 810' after conversion or lunch tote 810" when carrying.

FIGS. 18A-18C show various views of another embodiment of the reusable mailer bag which is shaped in the form of a backpack, hereinafter termed "mailer/backpack 910". Mailer/backpack 910 is similar to the other reusable bags described above with the exception that the top 918 of the mailer/backpack 910 defines a carrying volume 919 that closes via a common drawstring 925 that is tucked into the mailer/backpack 910 during mailing assembly and then exposed and mechanically assembled to the outer panels 912 or 914 for use as a backpack 910'. More particularly, to use as a mailer, the mailer/backpack 910 the gift 350 is inserted into the mailer/backpack 910 similar to the bags described above and the top 918 of the mailer/backpack 910 is cinched by pulling common drawstring 925. The protective strip 940 is then used to further secure the gift 350 for mailing purposes.

When the gift recipient receives the mailer/backpack 910, the gift recipient opens the mailer/backpack 910 is a similar fashion as described above, e.g., by pulling protective tab 940 from the mailer/backpack front and rear panels 912, 914, respectively, and manually opens the top 918 of the mailer/backpack 910 to expose the gift 350. The drawstring 925 is removed from the mailer/backpack 910 to form two straps 925a, 925b, respectively, which are attached through loops 935a, 935b of respective sides 917a, 917b of the mailer/backpack 910. Stays 926a, 926b may be employed to retain the straps 925a, 925b within the respective loops 935a, 935b. Other known mechanical attachments are also envisioned. The two straps 925a, 925b may be adjustable depending upon a particular purpose. The mailer/backpack 910 is now usable as a backpack 910'.

A storage compartment 913 may be disposed within the front or rear panel 912, 914, respectively, of the mailer/ backpack 910 for storing the gift card 520 during mailing. The storage compartment 913 may act as a secondary compartment for supplies when used as a backpack 910'.

In an alternative embodiment, the mailer/backpack 910 may be used as a mailer when disposed in an inverted or inside-out orientation such that the drawstring 925, storage compartment 913 (with gift card 520), loops 935a, 935b and stays 926a, 926b, and other mechanical features are all disposed internally during mailing. This eliminates issues with mailing and exposed features later necessary with the mailer/backpack 910. Once the gift recipient receives the mailer/backpack 910, the gift recipient removes the protective strip 940 and exposes the gift 350 and card 540 (as described above) but inverts the mailer/backpack 910 to convert the mailer/backpack 910 for use as a backpack 910'. As can be appreciated, this eliminates the need to assemble the straps 925a, 925b or other external mechanical components for use as a backpack 910'. Any of the other mailer bags described above may be suitable for inversion depending upon a particular purpose.

In embodiments, only a portion of the protective tape 940 may be removed depending upon a particular purpose, e.g., durability, convenience, type of tape, type of mailer bag 910, compatibility between mailer bag 910 and protective tape 940, etc. For example, in one envisioned embodiment, after removing the front portion of the protective tape 940 from the front panel 912 of the backpack 910', the protective tape 940 remains attached to the rear panel 914 and is configured to wrap around an inside edge 921 of the carrying volume 919 giving the backpack 910' added strength and durability.

FIGS. 19A-19B is an illustrative example of a reusable mailer bag (but may be any of the mailer bags described above) which may be reused for a second or possibly multiple times for mailing gift items and converted to a tote, lunch box/bag or backpack generally referred to as "multi-usable mailer bag 1010". Multi-usable mailer bag 1010 may be designed for use as any of the above bags but specifically designed for reuse of one or more reusable or disposable mailing features, e.g., the protective strip 1040, mailing label 1060, and in some instances, protective film 1013, are all selectively removable, disposable and replaceable components for use with any of the aforementioned mailer bags.

As can be appreciated, one or all of these replaceable and disposable components, e.g., protective strip 1040, mailing label 1060, and in some instances, protective film 1013, may be sold separately or in multi-packs for subsequent use. It is envisioned that designing and utilizing any of the above reusable mailer bags or reusable mailer bags with the features described herein will greatly reduce the amount of waste associated with a normal mail cycle in that only the replaceable and disposable components become waste or are recycled while the remainder of the mailer bag serves another purpose, e.g., converts to a tote, lunch box/bag, backpack, reusable mailer and/or other envisioned consumer product.

As can be appreciated, the various mailer bags described above may be made from a variety of different products depending upon a particular purpose which can vary due to price point, theme, quality or design of the tote, lunch box/bag, backpack, etc., material for mailing or material for use (e.g., quality of material of tote or bag, insulation, and/or other features such as straps, handles, etc.). In addition, the removable and disposable components may be made from an environmentally friendly material, e.g., biodegradable, recyclable, etc.

For example, it is envisioned that in addition to the many examples described above, aspects of the design may be simplified or the method of converting the mailer to a tote may be simplified or otherwise altered depending upon a different purpose, e.g., to make the mailer-to-tote more (or less) environmentally friendly, to make the mailer-to-tote more (or less) user friendly, to make mailer-to-tote more (or less) user safe, to make mailer-to-tote less (or more) expensive, to make the mailer-to-tote more (or less) user safe, to make mailer-to-tote more (or less) durable, to make the mailer-to-tote more (or less) user safe, to make mailer-to-tote for one time mailer usage, etc.

In order to accomplish one or more of the above objectives, in embodiments, the mailer, e.g., mailer 510 (FIG. 13A-14C), may be made from a highly durable material that is resistant to tearing. The removeable strip 540 and adhesive 542 are press-fit onto the mailer 510 for shipping purposes as described above. Obviously, the adhesive-to-mailer contact integrity is essential during shipping so the contents of the mailer 510 are not lost during shipping.

When the recipient receives the mailer 510 and tears removeable strip 542 from the mailer 510 to open the mailer 510, it is important that the mailer 510 remain intact for subsequent use as a tote 510'. In this instance, it is envisioned that the removable strip 540 may be fully removeable from the mailer 510 or only partially removeable from the mailer 540 via an engineered tear strip (not shown but disposed anywhere along and across the removeable strip 540. When the removeable strip 540 is fully removed from the mailer 510, the mailer 510 must be made from a material that durable enough to resist the forces required to peel the removeable strip 540 from the mailer 510 without tearing or conversion to a tote 510' will be moot. Further, careful considerations with mailer material and adhesive choices must be made under all shipping conditions, e.g., heat, cold, humid, wet, dry, etc.

When the removeable strip 540 is only partially removed, the remaining portion or edges of the removeable strip 540 may help fortify the exposed upper rim of the mailer 510 now being used as a tote 510'. The mailer 510 may need to include indicia disposed thereon to help align the removeable strip 540 when orienting the removeable strip on the mailer 510 for shipping in this instance. Or, alternatively, the mailer 510 may be sold with the removable strip 540 already pre-aligned for shipping purposes (as with any embodiment described herein).

In embodiments, the mailer, e.g., 510, may be manufactured such that after the gift is inserted within the mailer 510, aligned and sealed via the removable strip 540, and mailed to the gift recipient, the gift recipient is instructed to tear the mailer 510 along a predefined line across the mailer 510 on the front and back panel 512, 514 or the mailer 510 to expose the gift. This line is positioned below the removable strip 540 on both the front and back panel 512, 514 and is an engineered tear strip (not shown) across and around the mailer 510 below the removeable strip 540 when sealed. Both the removeable strip 540 and the portion of the mailer 510 adhered to the removable strip 540 are discarded in this instance. In addition, the mailer 510 would typically include the removeable strip 540 already adhered to one panel, e.g., rear panel 514, and an indica line of the front panel (not shown) for alignment purposes to ensure proper placement of the removeable strip 540 when sealing the mailer 510 for shipping. In this instance, the mailer 510 is typically envisioned for use only one time as a mailer 510 whereas other bags described above may be utilized multiple times as a mailer 510 if desired by purchasing additional removeable strips 540. The upper or remaining edge of the tear strip may be reinforced with yet another adhesive strip which flaps over and around the entire exposed edge or the remaining edge may remain exposed in a decorative fashion, e.g., soft geometric edge pattern.

In embodiments, the card pouch, e.g., card pouch 618, may be located on the outside of the mailer bag 610 and secured for mailing using the same or a second protective tape or other type of closing mechanism. Although not ideal as the card (or other item disposed within the pouch) would be vulnerable to damage or tampering during transport, it may be useful for a particular purpose to design a mailer bag, backpack, lunch cooler in this fashion. Alternatively, two or more pouches could be utilized, e.g., one as described in detailed above on the inside of the mailer bag 610 and a second (or more) disposed on the outside of the mailer bag 610 for a particular purpose.

FIGS. 20-39D show additional embodiments of reusable mailer bags in accordance with the present disclosure. Generally, the mailer bags shown in FIGS. 20-39D may be constructed in accordance with any of the other mailer bags described herein with the noted exceptions described below. As such, only those features are discussed in detail for the purposes of brevity.

Figure 20:
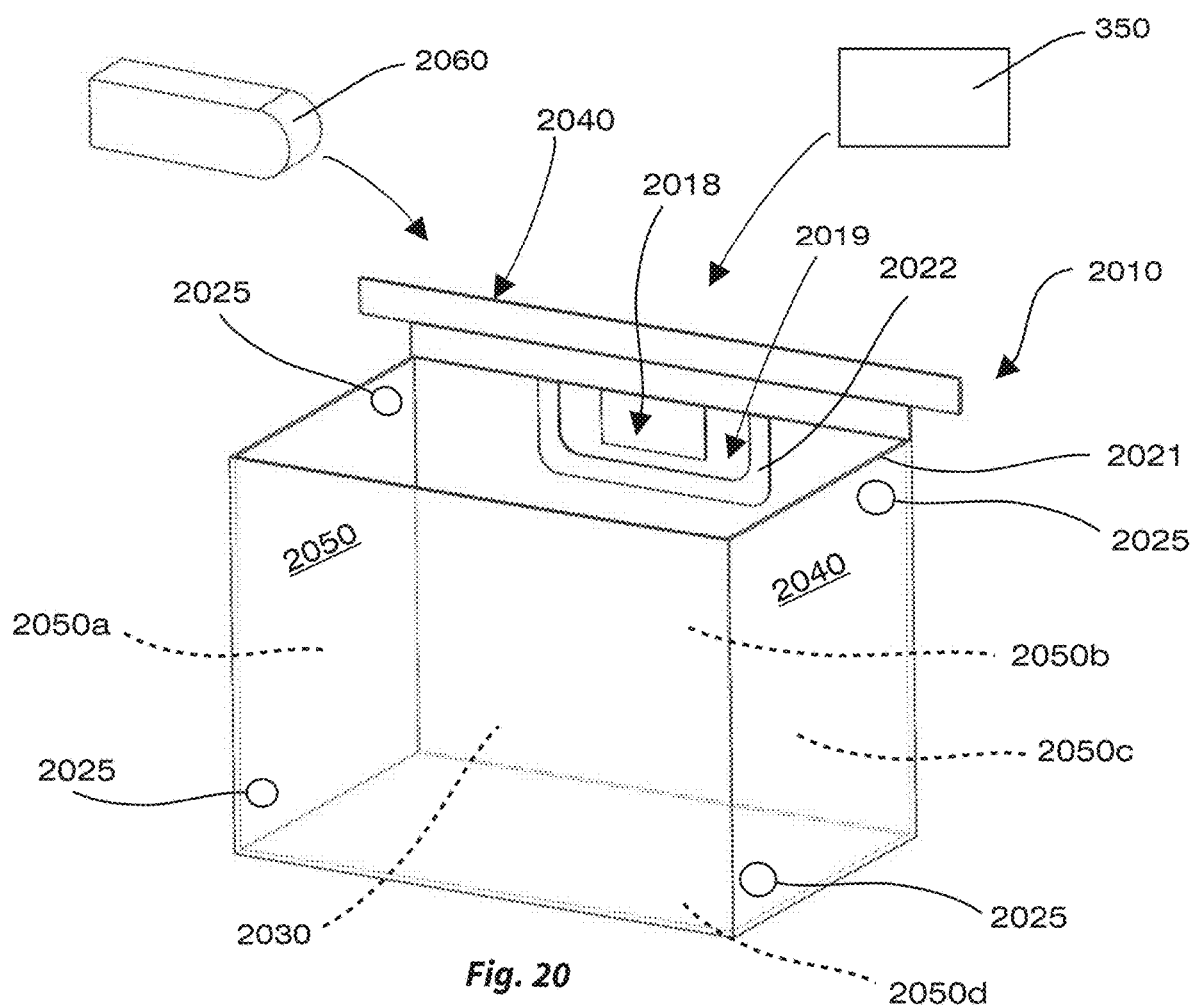
FIG. 20 shows another embodiment of a reusable mailer bag with carrying volumes that invert to form a variety of differently-shaped and sized objects including toys, pillows, stockings, purses, pouches, handbags, holiday-themed pillows, sports-themed pillows, the reusable mailer bag including an insertable filler disposed within the carrying volume that may be used to fill the object once inverted.

Turning initially to FIG. 20, the reusable mailer 2010 includes a carrying volume 2019 defining a top opening 2021 configured to receive a package 350 therein. The carrying volume 2019 is defined by an outer peripheral surface 2045 and an internal periphery surface 2050. The outer peripheral surface 2045 is made from a tough material suitable for mailing purposes such as propylene, polypropylene, polyethylene, and combinations thereof in nonwoven, woven and high density fibrous variations. The internal peripheral surface 2050 may be any geometric configuration or free-form (e.g., bag-like) and generally includes opposing side walls 2050a, 2050c and opposing front and rear walls 2050b, 2050d cooperating to form the carrying volume 2019. One or more of the walls 2050a-2050d may be at least partially covered with a plush material 2030 or other material as explained in more detail below.

In embodiments, the plush material 2030 is made from at least one of felt, fleece, cotton, polyester, acrylic, flannel, faux suede, faux fur, minky, wool, sherpa and/or rubber. In embodiments, more than one plush material 2030 is used to cover one or more walls 2050a-2050d.

A first portion of a piece of protective tape 2040 removably adheres to the outer peripheral surface of the wall 2050b of the carrying volume and is configured to extend across the top opening 2021 and a second portion of the protective tape 2040 is configured to removably adhere to the outer peripheral surface of wall 2050d to close the carrying volume 2019 to configure the carrying volume 2019 for mailing purposes. After mailing, the protective tape 2040 is selectively removed (or one or both portions thereof) to expose the gift/package 350 within the carrying volume 2019. Once the gift 350 is removed from the carrying volume 2019, the carrying volume 2019 is selectively inverted to transition the plush material 2030 to the outer peripheral surface such that the reusable mailer 2010 may be used as a plush object or toy.

In aspects according to the present disclosure, the plush object is selected from the group consisting of toys, sleeping pillows, throw pillows, stockings, co-sleepers, sleep pads for babies, neck pillows, heating pads, themed toys, headwear, hand or finger puppets, jewelry case, thermos, clothing, and cooling pads. In other aspects according to the present disclosure, the reusable mailer 2010 includes handles 2022 disposed within the carrying volume, the handles 2022 being selectively exposable when the carrying volume 2019 is inverted.

In aspects according to the present disclosure, the plush material 2030 is configured to insulate and/or protect the gift 350 disposed within the carrying volume 2019 during mailing.

In aspects according to the present disclosure, the reusable mailer 2010 includes one or more closing mechanisms 2025 configured to close the carrying volume 2019 after inversion, the closing mechanism 2025 may be selected from the group consisting of zippers, press-locks, hook and loop fasteners, buttons, snaps, interlocking tabs, magnetic locking devices, and additional pieces of protective tape.

In aspects according to the present disclosure, the reusable mailer 2010 includes an insertable filler 2060 selectively insertable within the carrying volume 2019 (or otherwise associated with the reusable mailer 2010, e.g., disposed within (liner) or one or more of the walls 2050a-2050d) with the gift 350 prior to mailing. The insertable filler 2060 may be made from an expandable material and packed in the carrying volume 2019 in a greatly-reduced volume for mailing purposes, wherein, after the gift 350 and insertable filler 2060 are removed from the carrying volume 2019 and the carrying volume 2019 is inverted, the insertable filler 2060 is unpacked so that the insertable filler 2060 expands and is used to fill the inverted carrying volume 2019. In embodiments, the insertable filler 2060 is configured to expand to match the shape of the desired plush object.

In embodiments, the insertable filler 2060 is made from a viscoelastic material and vacuum-packed in a greatly-reduced volume for mailing purposes, wherein, after the gift 350 and insertable filler 2060 are removed from the carrying volume 2019 and the carrying volume 2019 is inverted, the insertable filler 2060 is unpacked so that the insertable filler 2060 expands and is used to fill the inverted carrying volume 2019. In embodiments, the insertable filler 2060 includes one or more photopolymer resins containing heat-activated foaming agents that are 3D printed with ETEC Digital Light Processing technology such as those sold under the trademark Freefoam™ owned by Desktop Metal. Using insertable fillers 2060 of this type may allow the carrying volume to expand to a specific shape when heated with customized hardness or softness. In embodiments, the re-usable mailer 2010 may be vacuum-packed and the interior carrying volume may be lined with a vacuum-packed and expandable material (FIGS. 23E-23H).

In embodiments, memory foam may be used for the insertable fillers 2060. For example, the memory foam may be vacuum-packed in a reduced-volume shape and/or size and packed with the package 350 for mailing purposes and then expanded to fill the inverted carrying volume 2019 for use as a plush object or toy.

In embodiments, the inner peripheral surface 2050 may include indicia disposed thereon that is exposed when the carrying volume 2019 is inverted for a variety of different purposes. For example, the walls 2050a-2050d may: include one or more favorite movie, television or cartoon characters, that may be used as posters or for collection purposes; be used for arts, crafts or coloring purposes; be used for various games such as tic-tac-toe, hang-man, crossword puzzles, or even simple board games; may be used as instructional bases or boards for art projects or holiday decoration projects; may be used for special notes for loved ones (or Santa Clause) from or for one or more individuals wherein the carrying volume 2019 is inverted prior to mailing to inscribed the note; may be used as a X-mas or Holiday list to send to Santa wherein after the original gift 350 is received and the carrying volume 2019 is inverted to expose a blank X-mas list on at least one of the walls 2050a-2050d for completion by a child, the carrying volume 2019 is re-inverted and the X-mas list is sent to Santa (a mailing label for Santa and other special indicia may also be included to help sell the concept).

In embodiments where the carrying volume 2019 is inverted to expose arts and crafts projects, art projects, or decorative projects for the holidays, it is envisioned that the carrying volume 2019 may include a secondary pocket (not shown) that is configured to carrying one or more elements or products necessary for the intended project. These elements or products may be customized by the person mailing the reusable mailer 2010 or may be pre-packaged and sold as a project or decorative kit.

Figure 21A:
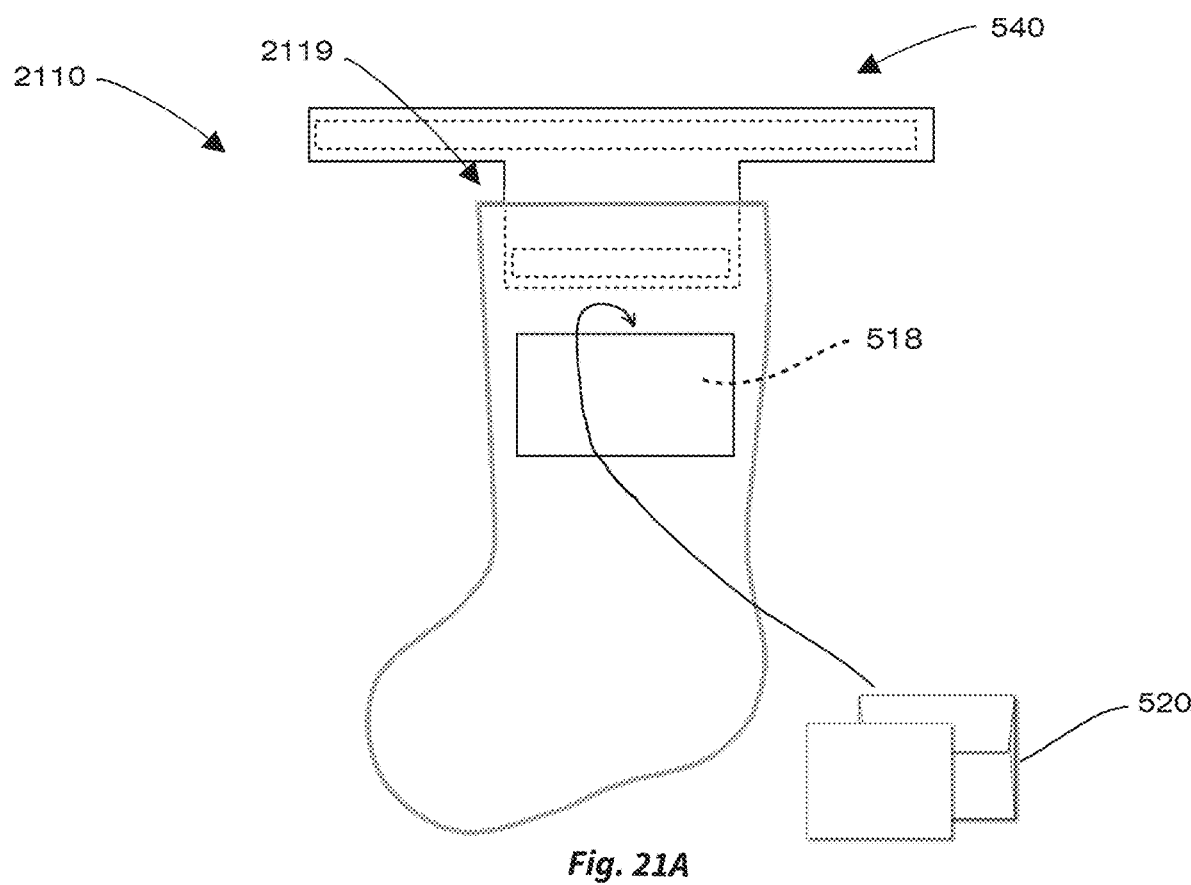
FIGS. 21A-21B show another embodiment of a reusable mailer bag with carrying volumes that form a Christmas or Holiday stocking.
Figure 21B:
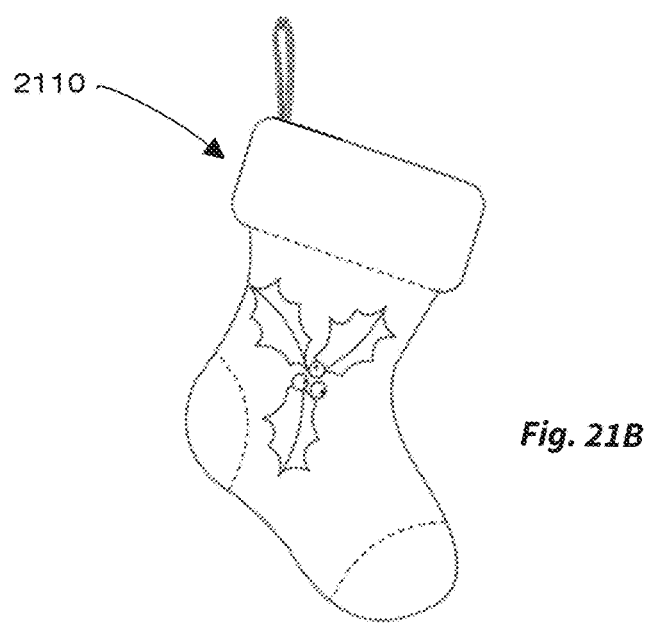

FIGS. 21-39D show various embodiments of the reusable mailer 2010 wherein the carrying volume 2019 when inverted turns into a predesignated plush object, toy, pillow, garment, puppet, jewelry case, thermos, etc. FIGS. 21A and 21B show the reusable mailer 2110 wherein the carrying volume 2119 is converted into a Christmas or Holiday stocking (or other Holiday Items) when inverted. As can be appreciated, the stocking may include various Holiday (or other) indicia depicted on the outer surface thereof. The Holiday indicia may be customizable prior to mailing the mailer bag 2110 and/or after inversion. The outer surface, when converted may include a Holiday-themed image, a writeable surface or may be made of a plush material or combinations thereof as explained in the examples below.

Figure 22A:
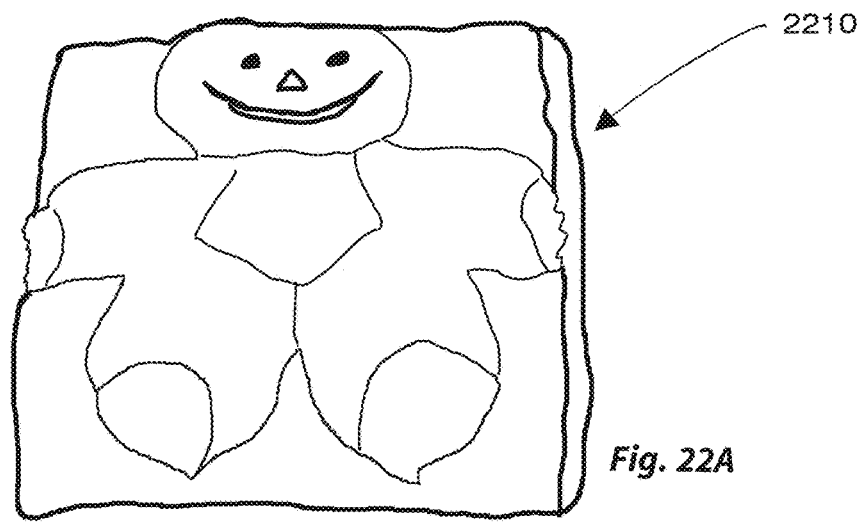
FIGS. 22A-22F shows another embodiment of a reusable mailer bag with carrying volumes that form various plush objects.

FIG. 22A illustrates on envisioned embodiment of a reusable mailer 2210 wherein the reusable mailer 2210 converts into a rollable pillow or TV pillow, co-sleeper or child or infant bed. Expandable material may be employed to provide a filler or a filler material may be required to stuff inside the carrying volume once inverted.

Figure 22B:
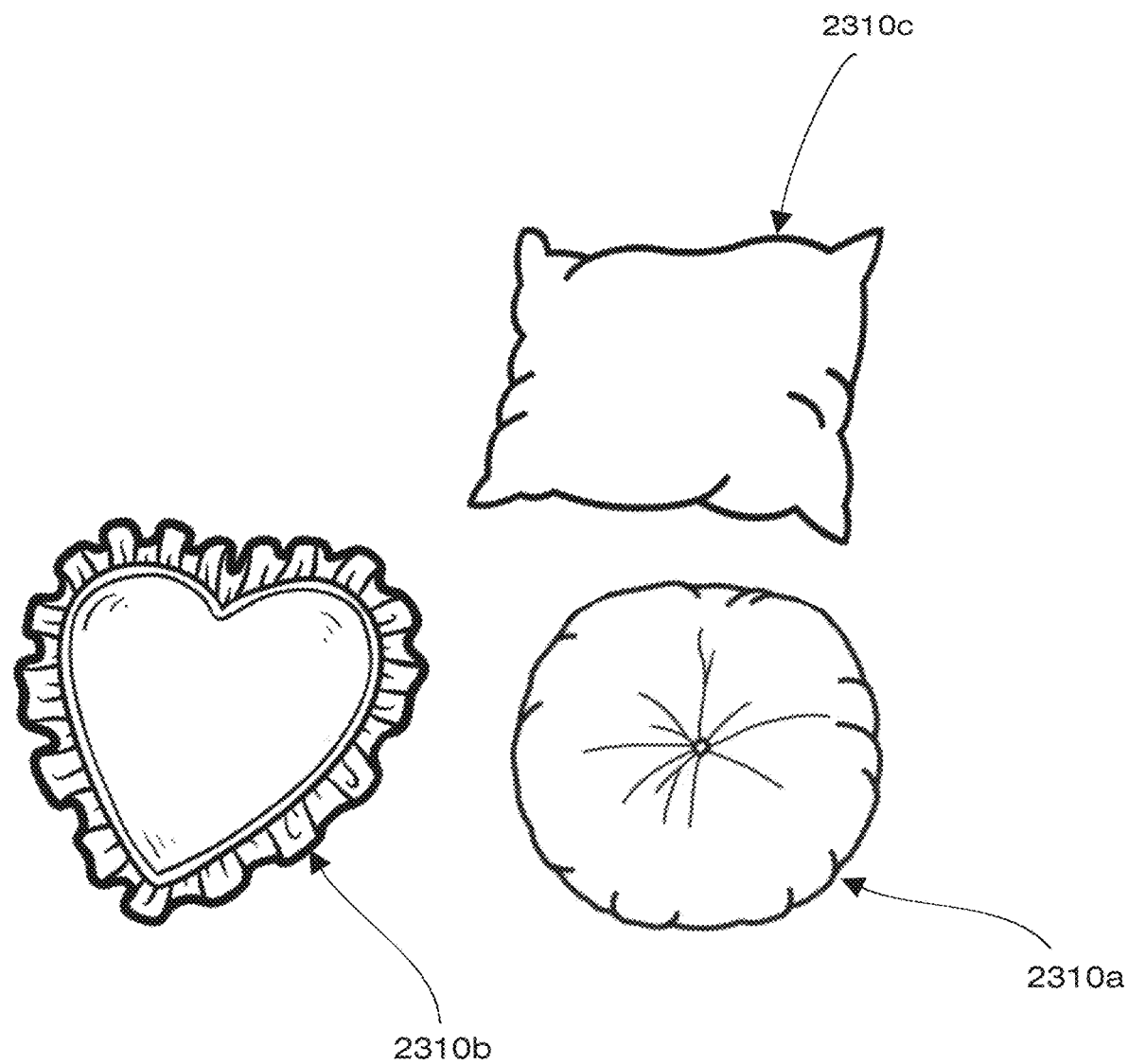
Figure 22C:
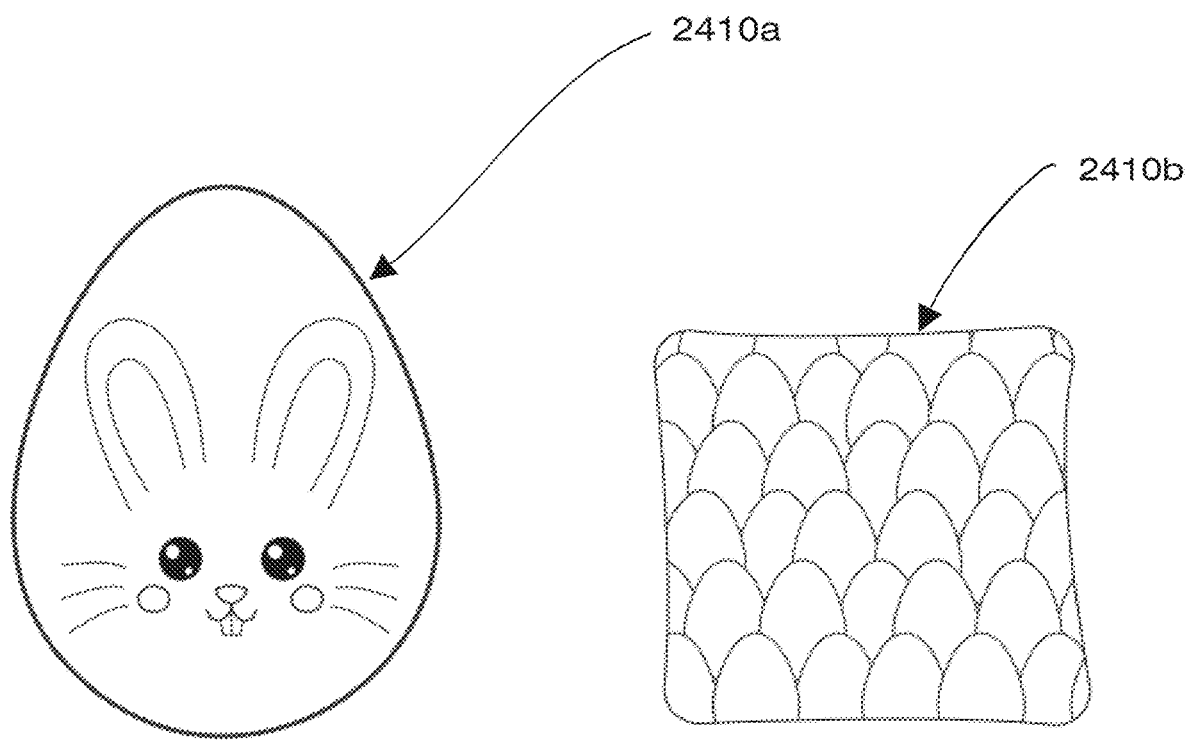
Figure 22D:
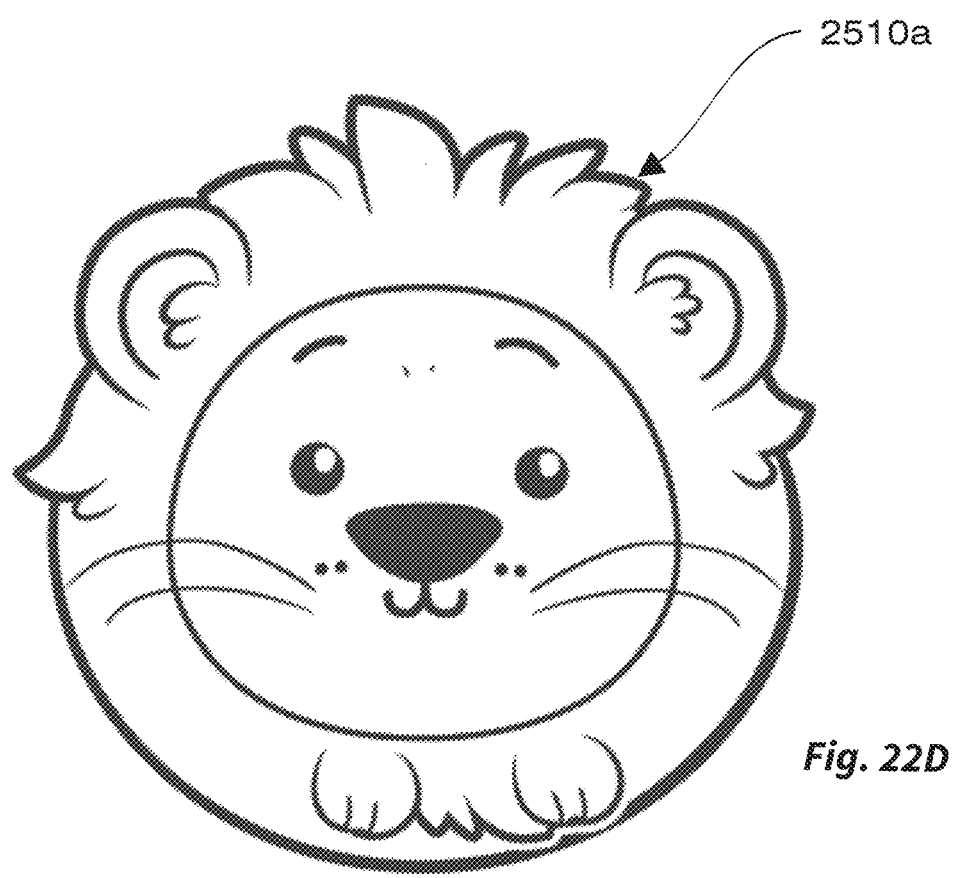
Figure 22E:
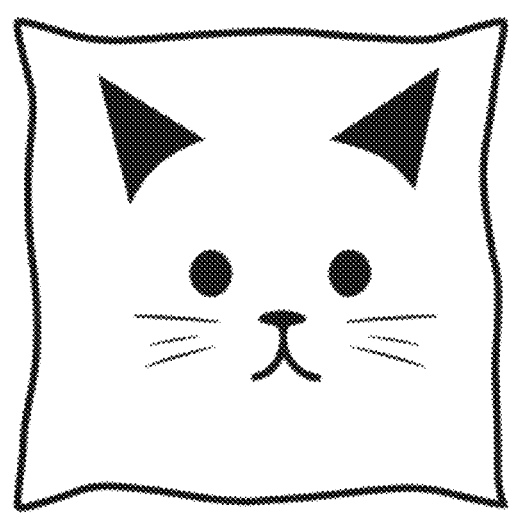
Figure 22F:
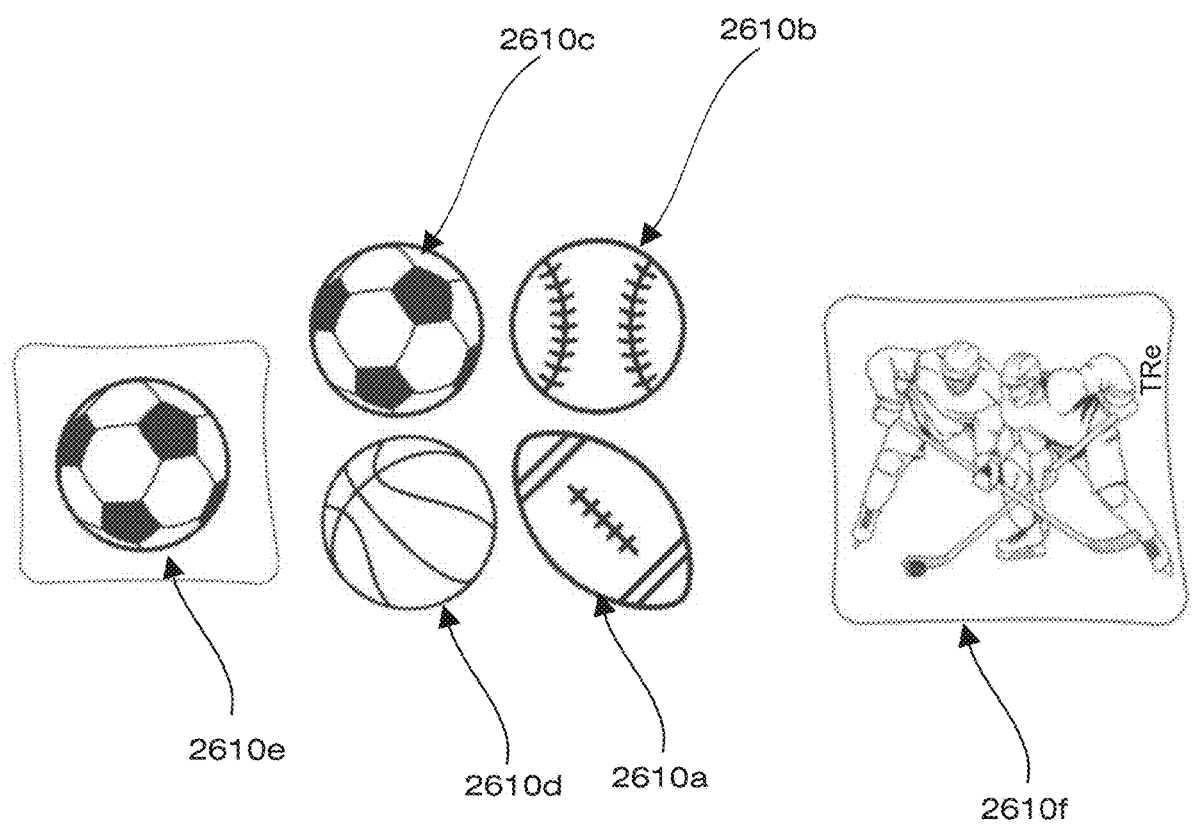
Figure 23:
FIG. 23 shows another embodiment of a reusable mailer bag with a carrying volume that inverts to form a plush hand puppet.
Figure 24:
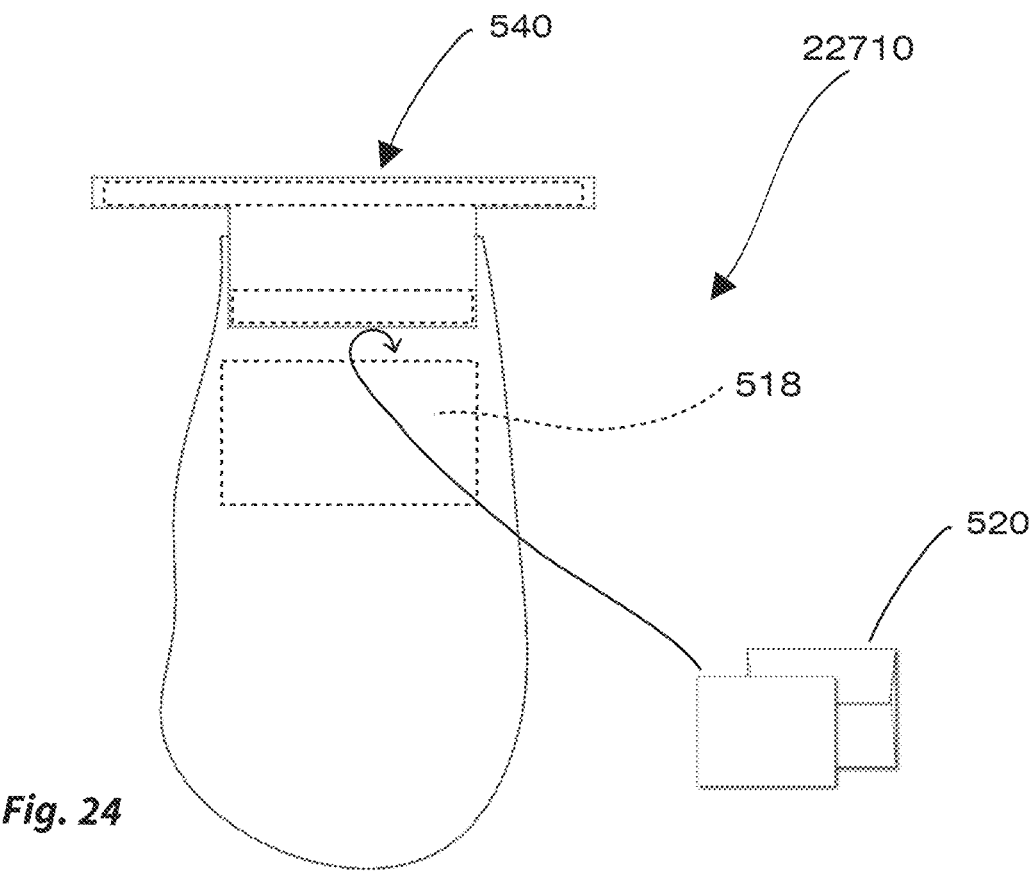
FIG. 24 shows the embodiment of the reusable mailer bag of FIG. 23 in a mailing configuration and prior to mailing.
Figure 26A:
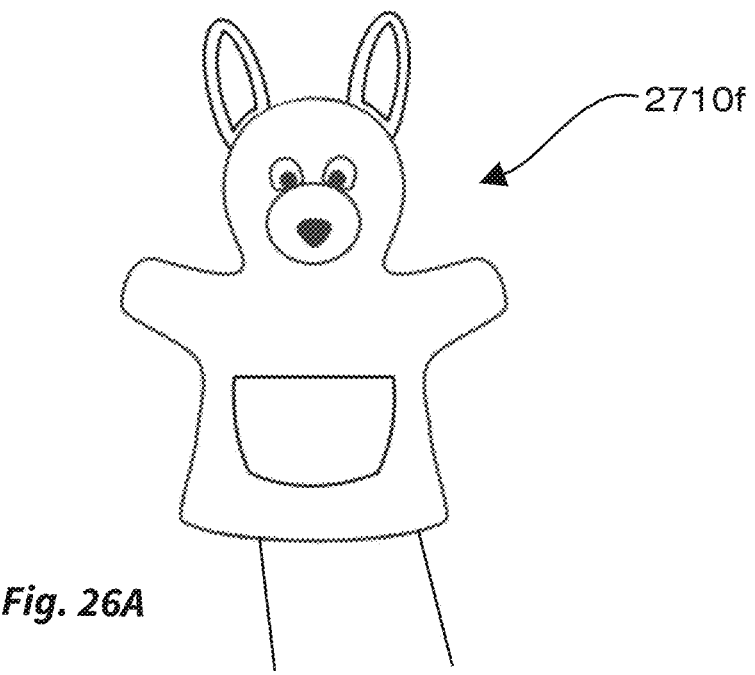
FIGS. 26A and 26B show another embodiment of the reusable mailer bag of FIG. 24 with carrying volumes that invert to form additional plush hand puppets and matching finger puppets (included inside the carrying volume)
Figure 26B:
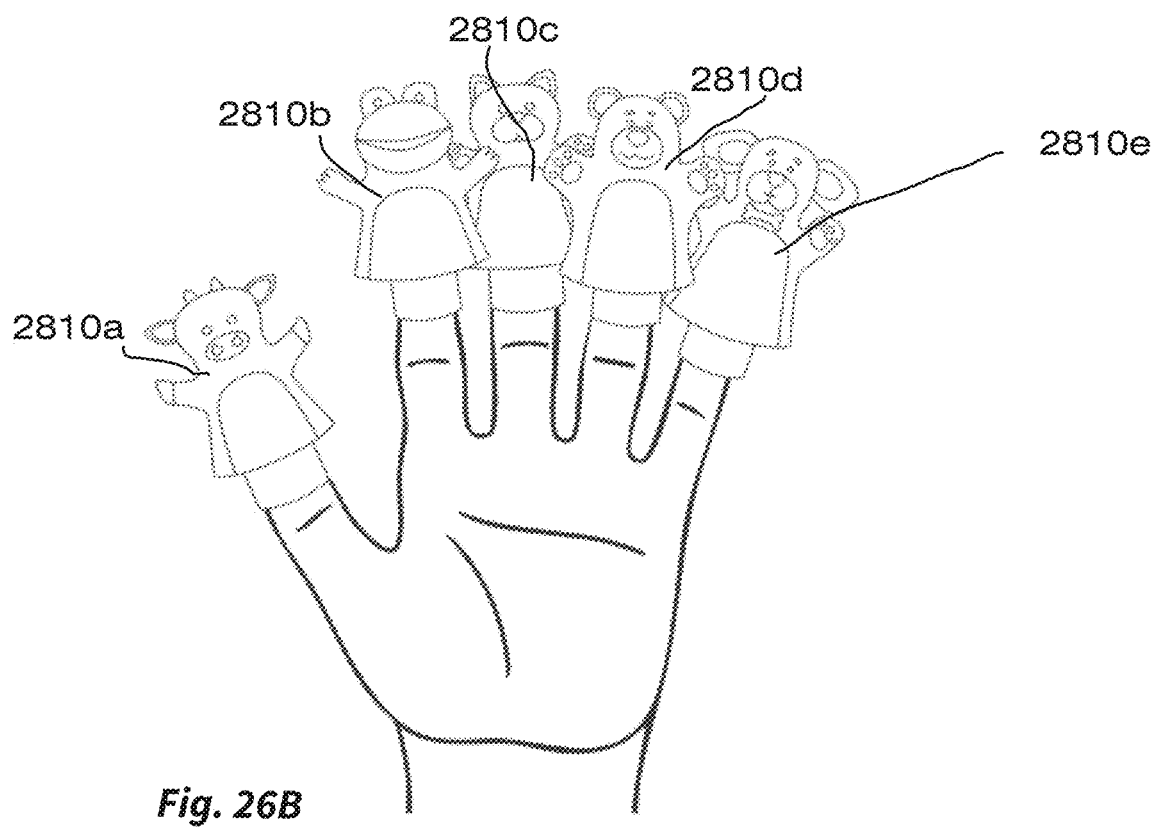

FIG. 22B show various embodiments of the reusable mailer 2310a-2310c wherein the reusable mailer 2310a-2310c when inverted turns into a plurality of differently-shaped and sized plush throw pillows. As mentioned above, the carrying volume, e.g., carrying volume 2019, may be filled in a manner to facilitate forming the shape and/or size of the throw pillow. FIGS. 22C-22E illustrate reusable mailer 2410a, 2410b, 2510a, and 2510b that convert into a pillow having a themed character disposed thereon. The character may be 2D or 3D and may be a generic character or may be a licensed character from the movies, television or the like. In a similar fashion, FIG. 22F illustrates a reusable mailer 2610a-2610f converting into a pillow, throw pillow or toy having a sports theme or sports teams depicted thereon. Again, sports theme may be 2D or 3D and may be a generic sports theme or may be a licensed sports franchise from any sport.

FIGS. 23-26B show various embodiments of the reusable mailer 2710 wherein the reusable mailer 2710 when inverted turns into a variety of different hand puppets 2710a-2710f (FIG. 25), finger puppets 2810a-2810c (FIG. 26B) and/or dolls (not shown). In this instance, the carrying volume, e.g., carrying volume 2019, is not necessarily filled with filler materials, but instead is utilized as a place for a user's hand or fingers to manipulate the hand or finger puppet. The outer surfaces of the respective reusable mailer 2710, 2810 when inverted, may be plush or include a writable surface or other indicia. The finger puppets 2810a-2810e of FIG. 26B may be included within the carrying volume 2019 as a promotional gift item.

FIGS. 27A-30 show various embodiments of reusable mailers 2910, 3010, 3110, and 3210 wherein the reusable mailers 2910, 3010, 3110, and 3210 include a writeable surface on the outer surface thereof when disposed in a mailer configuration (FIGS. 27A-28) or includes a writeable or craft-like surface on the inner peripheral surface of the carrying volume, e.g., carrying volume 2019, such that, when inverted, the writing or craft-like surface is disposed on the outside. Reusable mailers 2910, 3010 may be sold with markers, crayons, pencils, pens, etc. such that a personalized message may be inscribed or drawn on the writable surface. The surface maybe craft-like meaning that is receptive to various glues and adhesives. As mentioned above, the writable surface may be used for writing notes to loved ones or Santa Clause. Moreover, the entire surface of the bag, when inverted may include a writeable or drawable surface FIG. 30.

In embodiments and as shown in FIGS. 31A-32B, the reusable mailer 3310, when inverted, may be configured to turn into a beach or boat bag. The beach bag may include an outer surface which, when inverted, is canvas-like and rugged for beach environments. Rope-like or cord-like handles 3223a may be included or may be configured to easily attach to the reusable bag 3310 once inverted. The reusable mailer 3310, when converted into a reusable boat bag (FIGS. 32A and 32B), may be made from a waterproof and leakproof material and include a beverage sleeve 3317.

In embodiments, the reusable boat bag 3310 when inverted is scalable such that it is completely waterproof and leak proof. Any known sealing or closing mechanism 3347 is envisioned to accomplish this purpose. In embodiments, the reusable boat bag 3310 may be configured to act as a floatation device or flotation assistance mechanism when sealed. Simply by throwing in an air cartridge, the reusable mailer 3310 when configured as a reusable boat bag 3310 may be filled with air. An air valve 3349 may also be disposed on the reusable mailer 3310. A safety light 3351 may also be disposed on the reusable mailer 3310 which may be water activated.

FIGS. 33A-33D show various embodiments of a reusable mailer 3410 wherein the carrying volume, e.g., carrying volume 2019, when inverted turns into a predesignated plush pouch, handbag or purse with handle. The purse or handbag may include any type of material on the inner surface of the mailer 3410 for shipping purposes which, when inverted, forms the outer surface 3450 (sec, e.g., FIG. 33) of the handbag or purse. In certain instances, more emphasis may be placed on the protection of the gift 350 during mailing and thus the inner surface of the carrying volume, e.g., carrying volume 2019, will be designed primarily for gift/package 350 protection purpose with a secondary feature being the look, feel and design of the outer surface of the handbag or purse. In other instances, the design of the inner surface will primarily focus on the look, feel and design of the handbag or purse when the carrying volume 2019 is inverted.

Figure 33A:
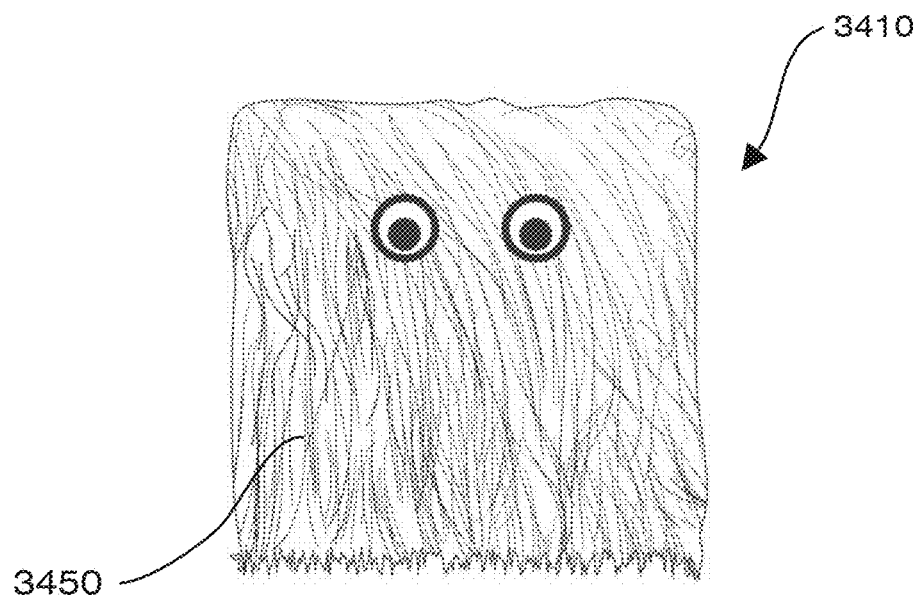
FIGS. 33A-33D show another embodiment of a reusable mailer bag with a carrying volume that inverts to form a plush themed bag or purse with handle.
Figure 33B:
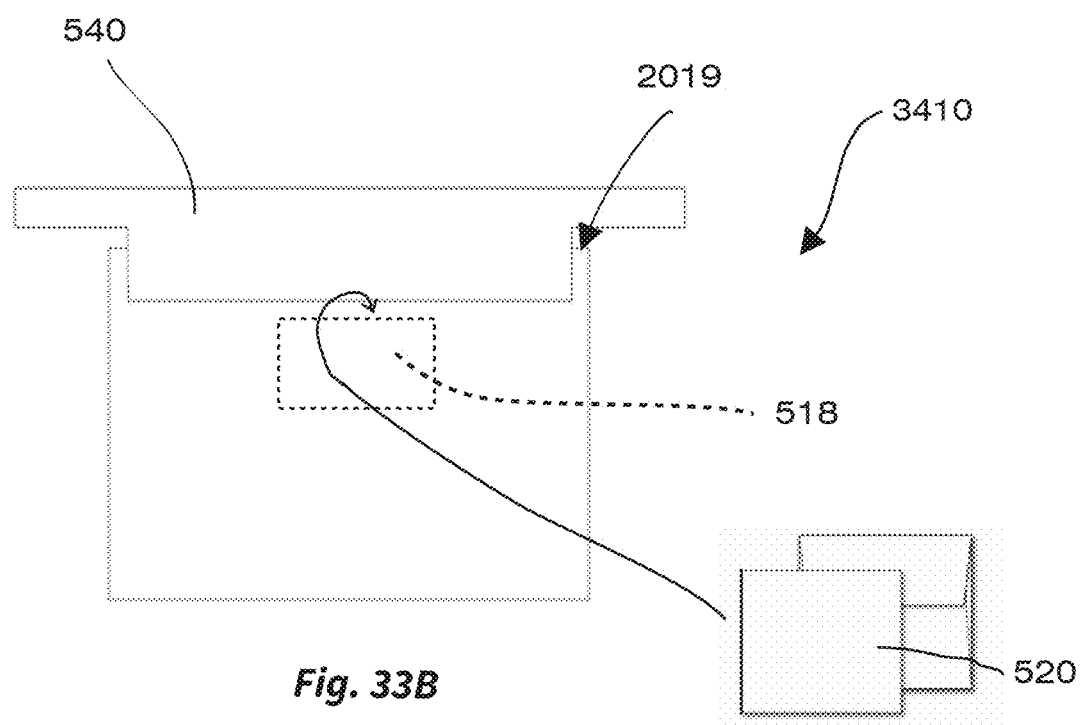
Figure 33C:
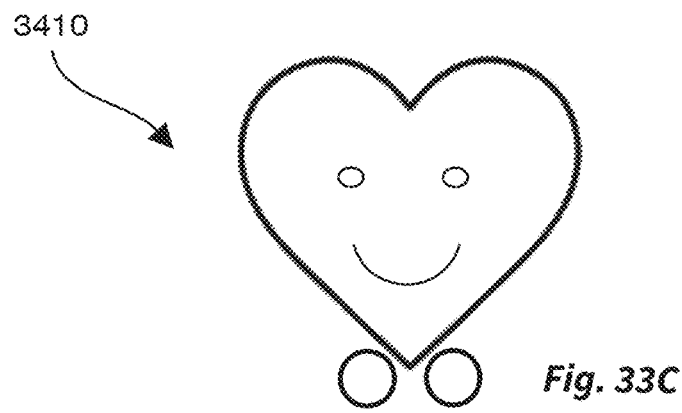
Figure 33D:
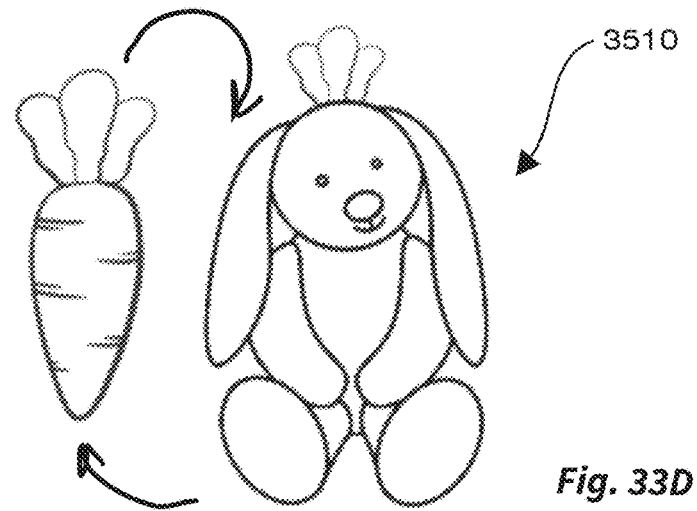
Figure 33E:
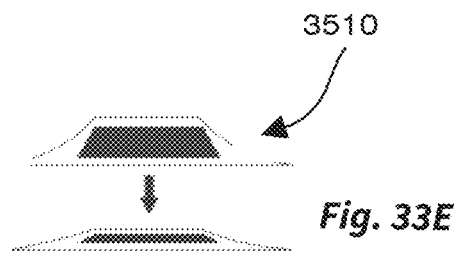
FIGS. 33E-33H show the steps for expanding a reusable mailer bag that is received in a vacuum-packed configuration.
Figure 33F:
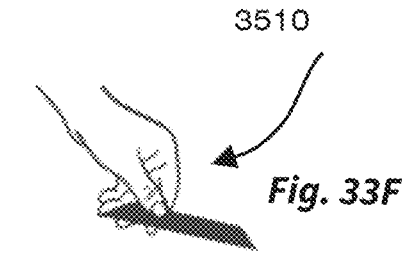
Figure 33G:
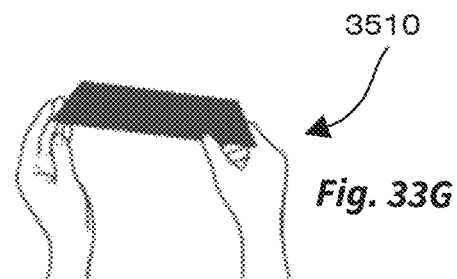
Figure 33H:
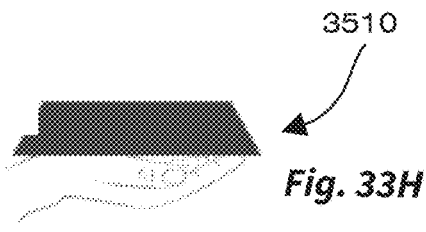

FIGS. 33E-33H show one envisioned embodiment of the reusable mailer 3410 wherein the inner lining of the carrying volume, e.g. carrying volume 2019, is filled with an expandable material and the reusable mailer 3410 comes in a vacuum-packed configuration. FIGS. 33E-33H show the various steps to releasing the reusable mailer 3410 from a vacuum configuration and expanding the material to form the designated bag: 1) open or release the reusable mailer 3410 from the vacuum package (FIG. 33E); 2) stretch the reusable mailer 3410 (FIG. 33F); 3) manipulate the reusable mailer 3410 to stretch the expandable material (FIG. 33G);

and 4) let the reusable mailer 3410 sit for approximately 24 hours to fully recover the desired shape (FIG. 33H).

Figure 34A:
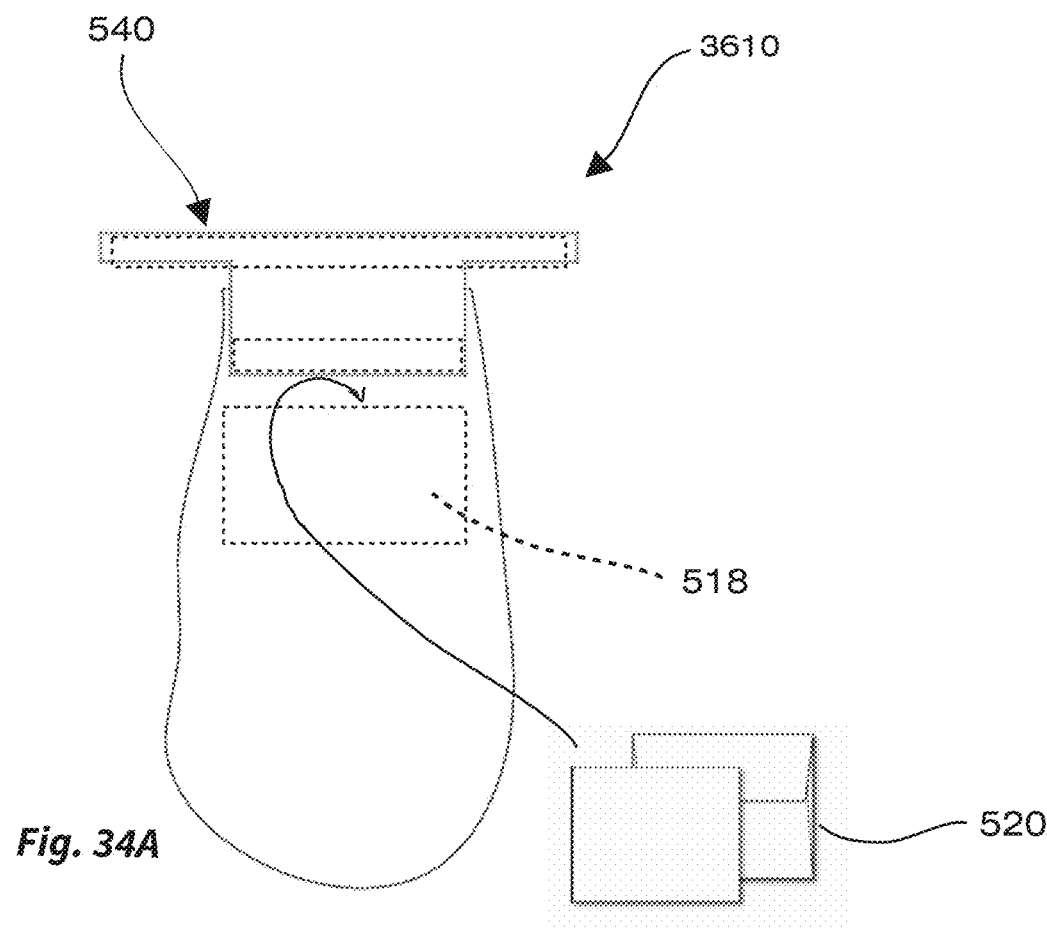
FIGS. 34A-34C show another embodiment of a reusable mailer bag with a carrying volume that inverts to form headwear, e.g., a hat or head piece.
Figures 34B, 34C:
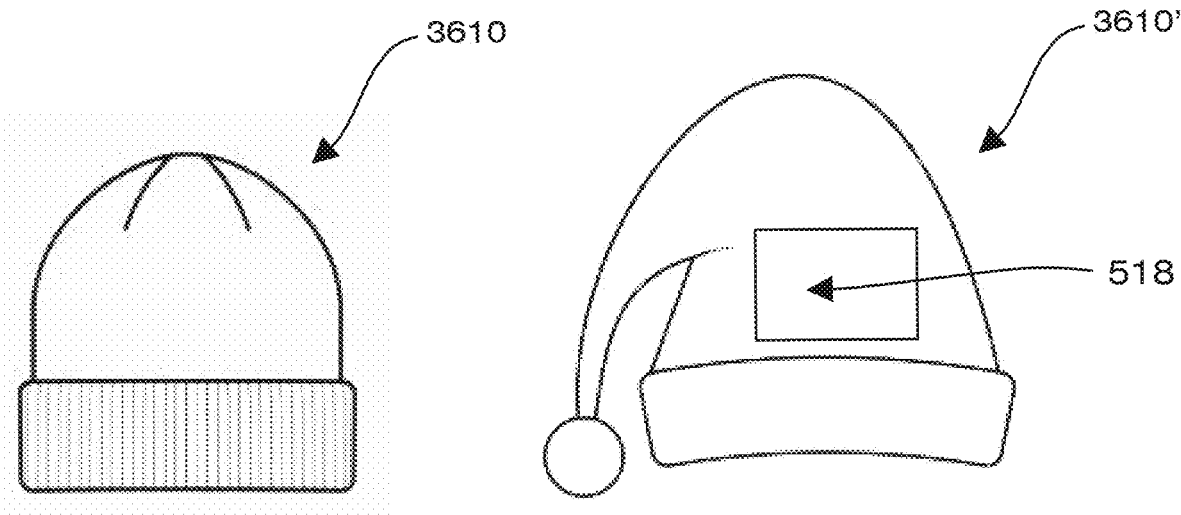
Figure 35E:
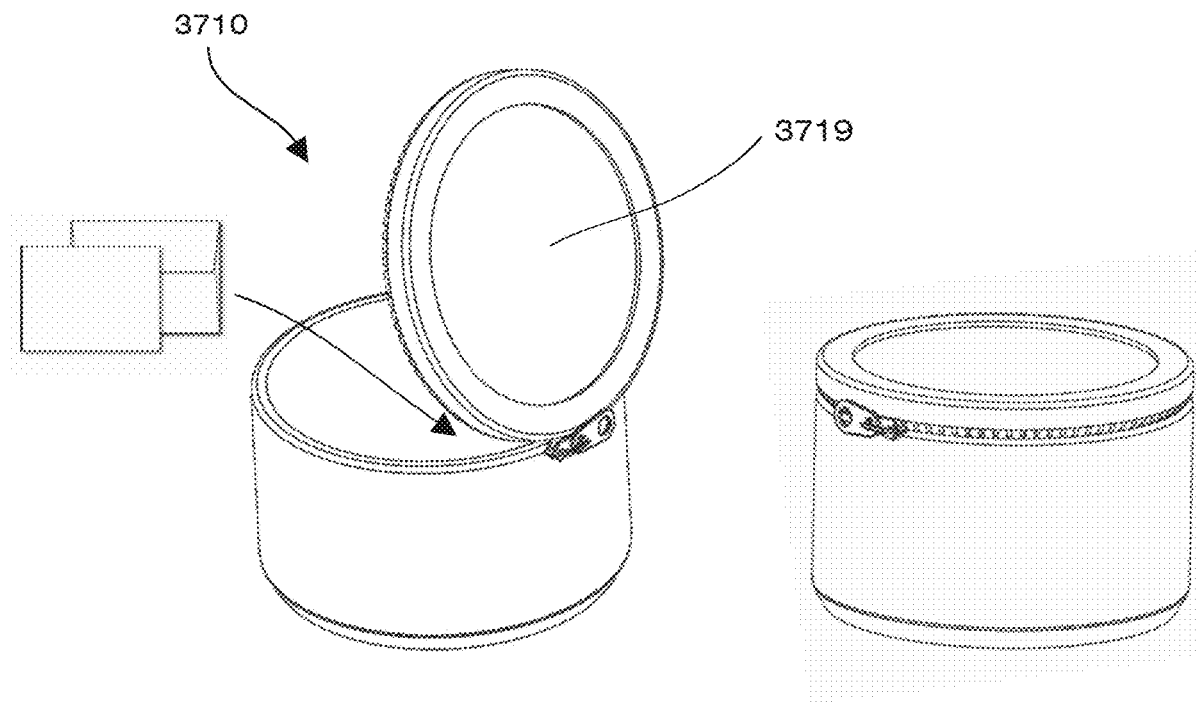
Figure 36A:
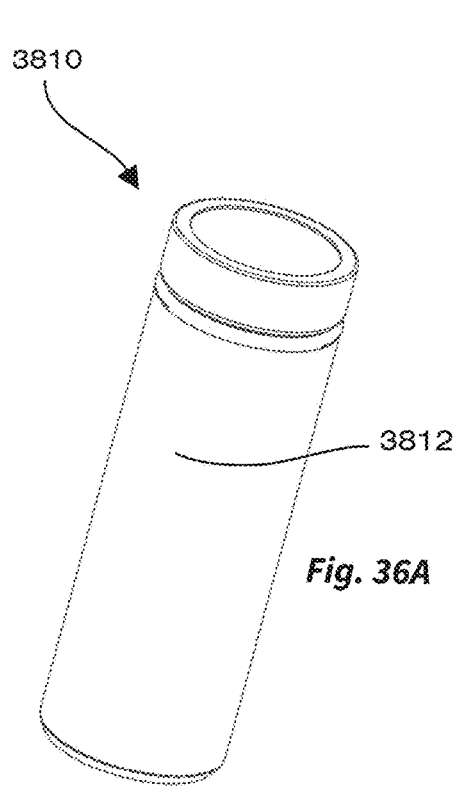
FIGS. 36A-36E show another embodiment of a reusable mailer container that can be used as a thermos, the thermos may come as a hard shell or come with a stiffening material or stiffener which is inserted within the carrying volume to solidify the container for use.
Figure 36B:
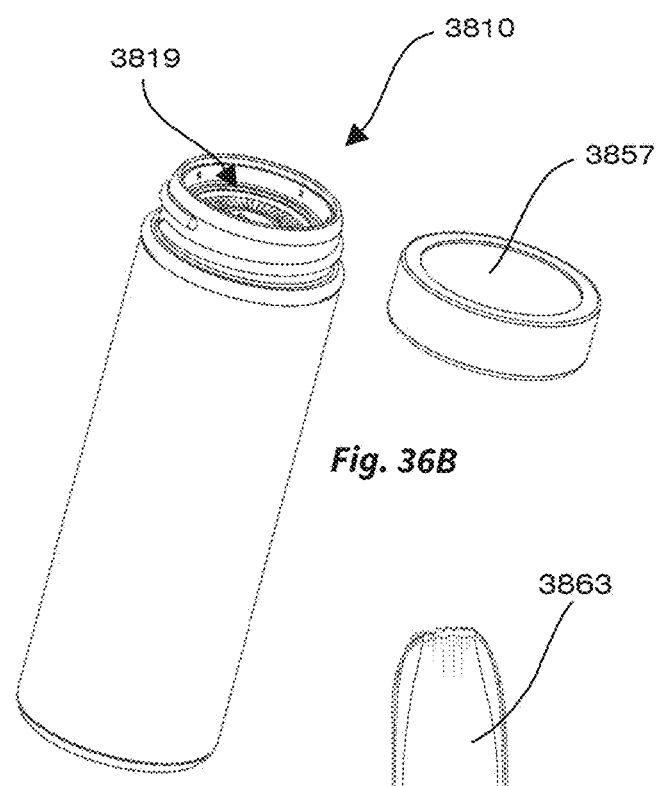
Figure 36C:
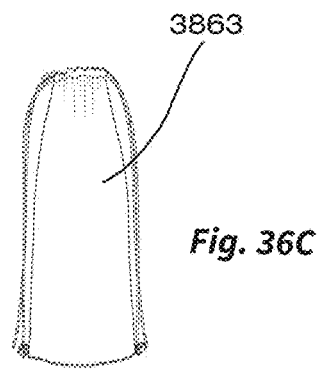
Figure 36D:
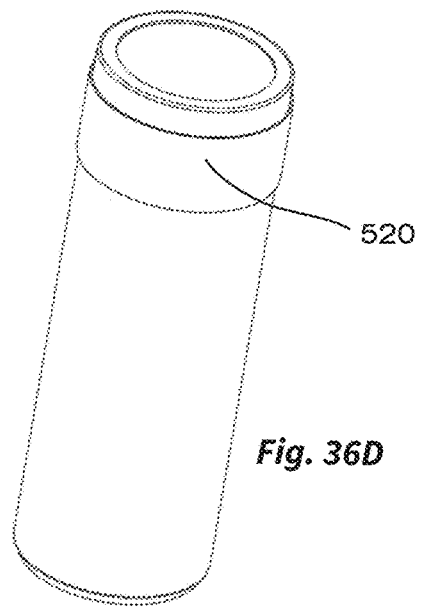
Figure 36E:
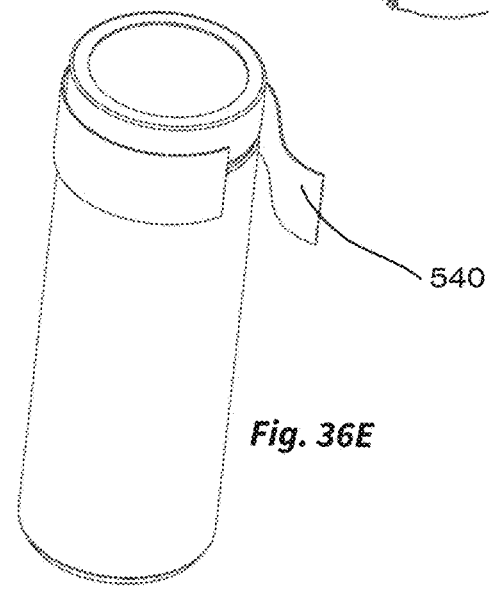

FIGS. 34A-34B show one envisioned embodiment of the reusable mailer 3610 wherein the reusable mailer 3610, when inverted, turns into a piece of clothing, e.g., a hat or other type of headwear. E show one envisioned embodiment of the reusable mailer 3710 wherein the reusable mailer 3710 turns into a jewelry box or case. Similar to the method of shipping the reusable mailers 3710 as described above, the reusable mailer 3710 is taped closed for shipping purposes via tape 540. However, in this instance the reusable mailer 3710 is not intended to be inverted when received (although in configurations it may be inverted). In this instance a stiffener material 3739 is configured to be inserted into the carrying volume, e.g., 3719, to stiffen the jewelry case 3710 for use. In embodiments, the reusable mailer 3710 is shipped as a relatively soft material and then stiffened via use of the stiffener 3739 for use as a jewelry case 3710. The stiffener 3739 may be shipped with the reusable mailer 3710, e.g., forming a bottom surface thereof, or may be otherwise attached to the reusable mailer 3710 or purchased separately. In embodiments, the stiffener 3739 is made from a material that is transitionable from a soft material to a hardened material by some sort of chemical reaction or the like, e.g., when exposed to water. A zipper 3727 may be included to close the top 3719 of the reusable mailer during shipping and later to secure the contents of the jewelry case 3710.

FIGS. 36A-36E show one envisioned embodiment of the reusable mailer 3810 wherein the reusable mailer 3810 turns into a thermos. Similar to the method of shipping the reusable mailers 3810 as described above (FIGS. 35A-35F), the reusable mailer 3810 is taped closed for shipping purposes via tape 540. A lid 3857 may be screwed onto the top of the reusable mailer 3810 to close the carrying volume 3819. In this instance the reusable mailer 3810 is not intended to be inverted when received (although in configurations it may be inverted).

Figure 37A:
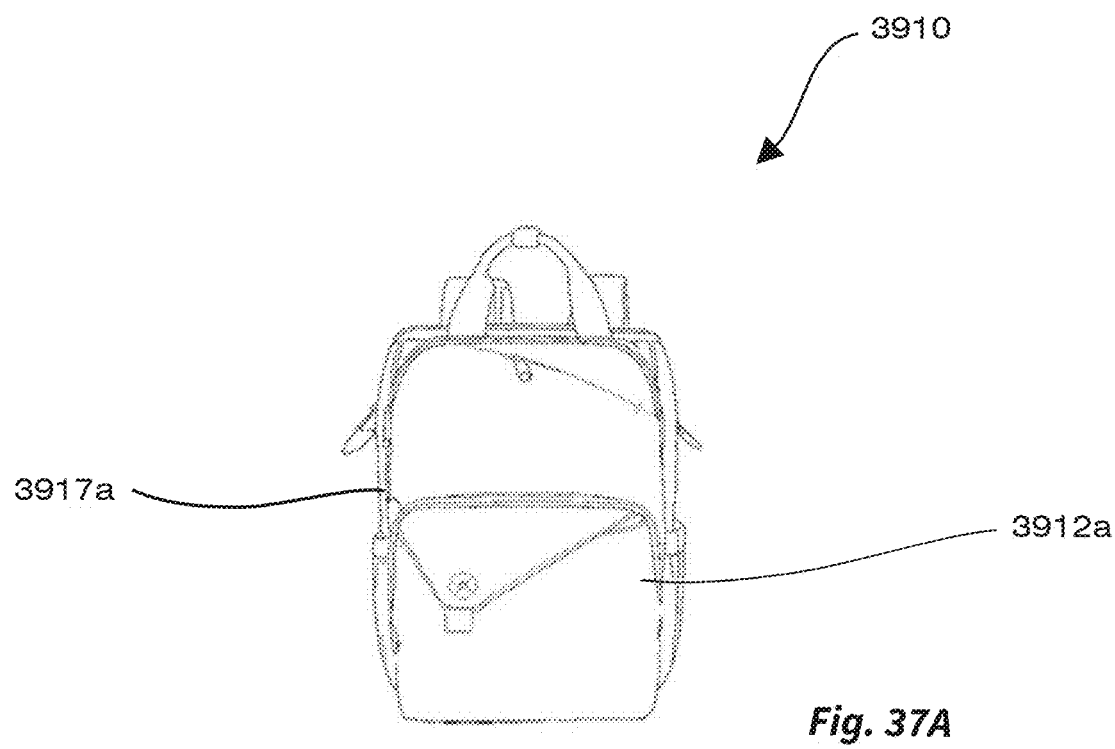
FIGS. 37A-37B show another embodiment of a reusable mailer bag with a carrying volume that inverts to form a diaper bag which may be waterproof and cleanable.
Figure 37B:
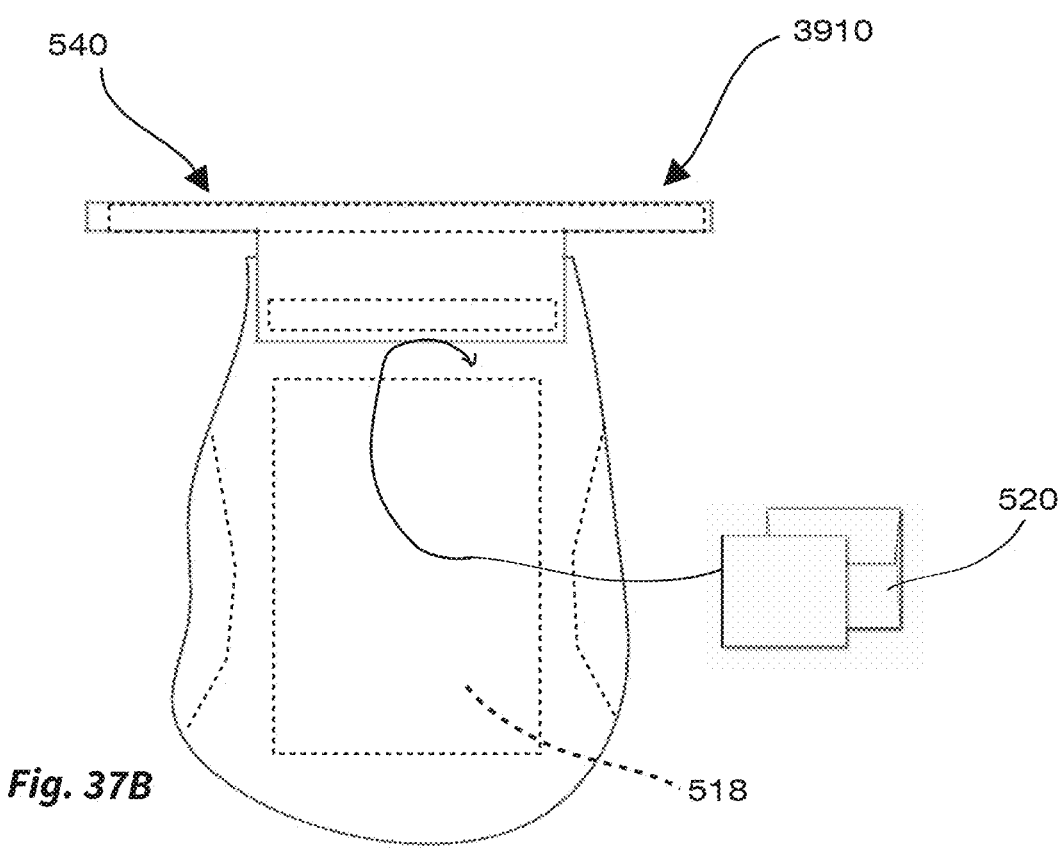
Figure 39A:
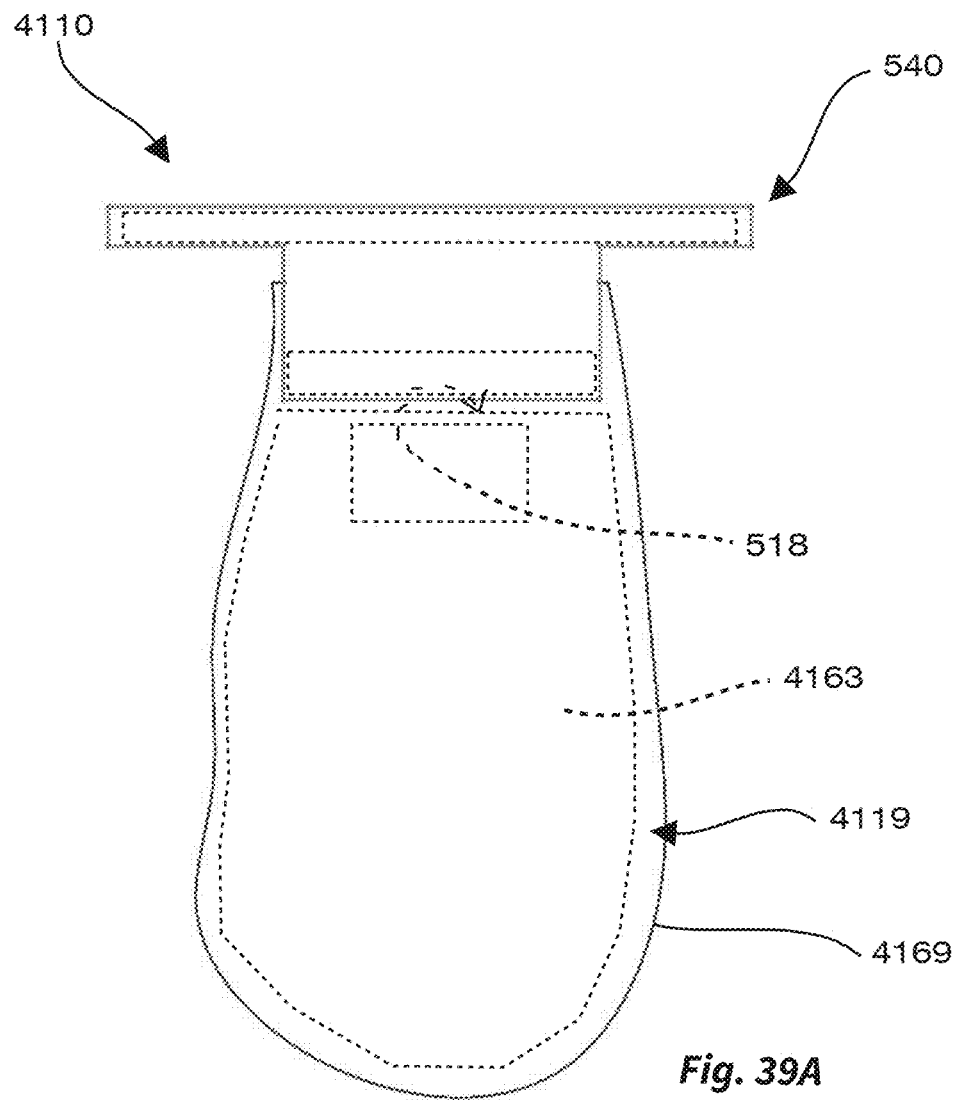
FIGS. 39A-39D show another embodiment of a reusable mailer bag with a carrying volume that inverts to form a clothing garment such as a shirt, hoodie, sweatshirt, beachwear, sun dress, bathing suit, sarong, robe, etc.
Figure 39B:
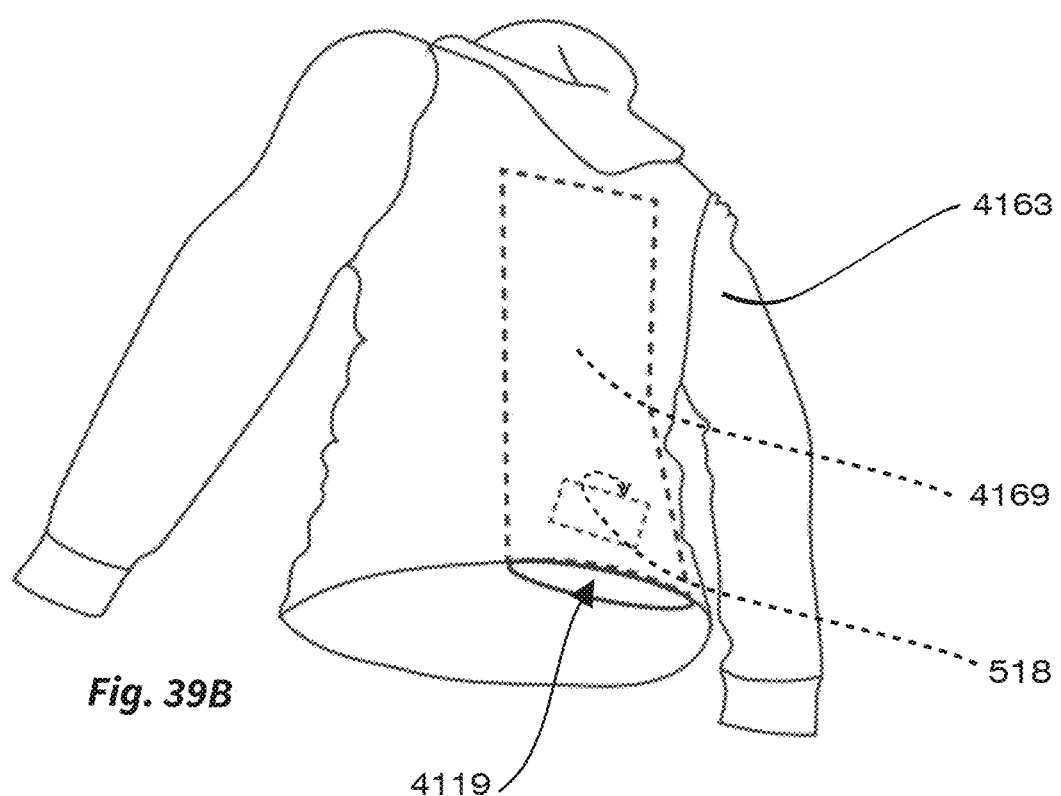
Figure 39C:
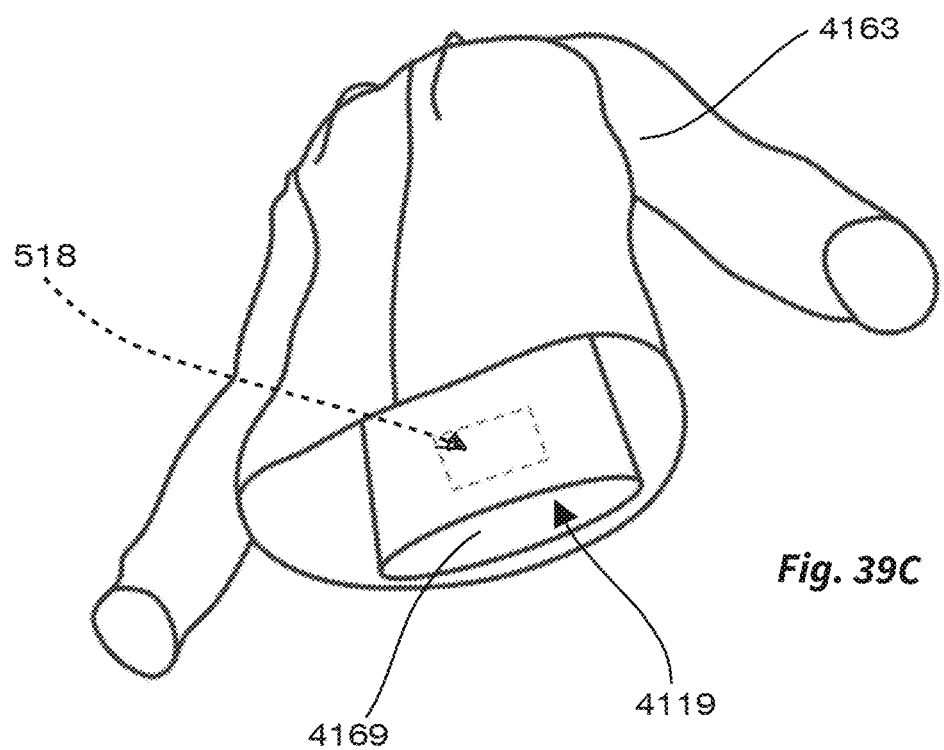
Figure 39D:
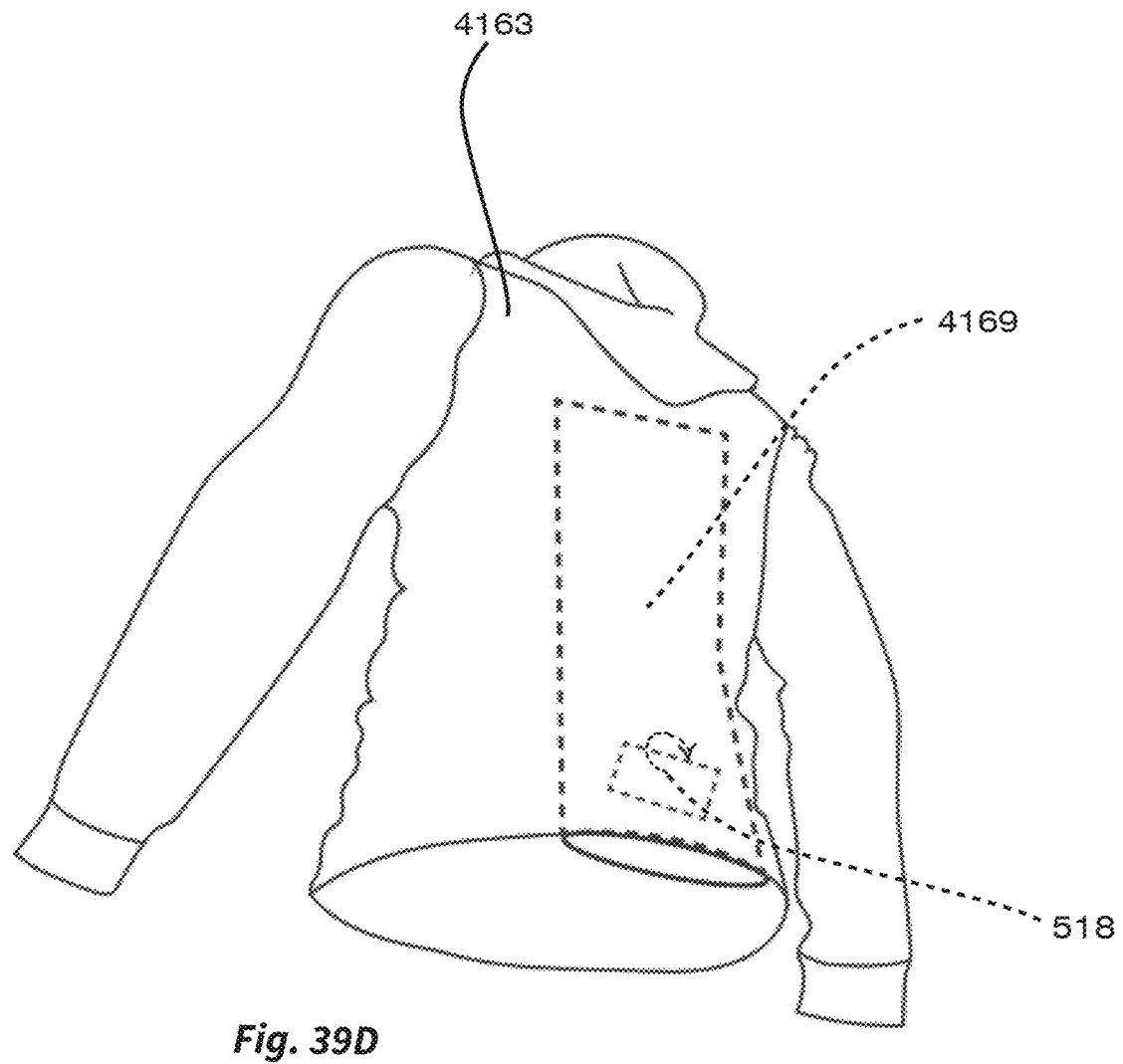

FIGS. 37A-34B show one envisioned embodiment of the reusable mailer 3910 wherein the reusable mailer 3910, when inverted, turns into a diaper bag. The diaper bag may include a writable surface 3912a (see also FIGS. 27A-30) and one or more compartments 3917a disposed on the outside of the diaper bag when inverted. A series of zippers may be employed to close the various compartments.

FIGS. 38A-38B show one envisioned embodiment of the reusable mailer 4010 wherein the reusable mailer 4010, when inverted, turns into an evening purse. The evening purse may include a flap 4512a to selectively close the carrying volume, e.g., carrying volume 2019, and one or more compartments disposed on the outside of the purse when inverted similar to the diaper bag of FIGS. 37A-37B. The evening purse may include a handle 4023 that may be selectively attached to the evening purse or may be integrally associated therewith.

FIGS. 39A-39D show one envisioned embodiment of the reusable mailer 4110 wherein the reusable mailer 4110, when inverted, turns into clothing 4163, e.g., a hoodie, sweatshirt, windbreaker, jacket, coat, t-shirt, polo, pants, etc. The reusable mailer 4110 in this instance acts as a storage pouch 4169 for the clothing 4163. When the reusable mailer 4110 is received, the clothing 4163 is packed within the carrying volume 4119 in a compressed, vacuum-packed or other condition to allow room for the gift 350 within the carrying volume 4119. In embodiments, the clothing item 4163 may be the actual gift 350 that is stored within the carrying volume 4119 and shipped. In other embodiments, the clothing item 4163 can act as a liner within the carrying volume 4119 for protecting the gift 350.

Once received, the gift 350 is removed and the clothing item 4163 is inverted from the carrying volume 4119 to reveal the clothing item 4163. In embodiments, the reusable mailer 4110, when inverted, is disposed within the clothing item 4163 and acts as a convenient storage pouch 4169 wherein the clothing item 4163 can be folded back into the storage pouch 4169 for storage and handling. In other embodiments, the clothing item 4163 may be removable from the reusable mailer 4110 by a separation tab (not shown) or other simple means of separating the two items. As mentioned above, any clothing item 4163 may be configured for use with the reusable mailer 4110.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A reusable mailer, comprising: a carrying volume including a top opening configured to receive a package therein, the carrying volume defined by an outer peripheral surface formed from a non-woven polymeric material and an inner peripheral surface defining a stocking shape, the inner peripheral surface at least partially covered by a plush material; and a piece of protective tape including a first portion configured to removably adhere to a rear portion of the outer peripheral surface of the carrying volume and configured to extend across the top opening and a second portion configured to removably adhere to a front portion of the outer peripheral surface of the carrying volume to close the carrying volume and configure the carrying volume for mailing purposes, wherein, after mailing, the piece of protective tape is selectively removable from the front portion and the rear portion of the outer peripheral surface of the carrying volume to expose the package within the carrying volume, and wherein once the package is removed from the carrying volume, the carrying volume is capable of selective inversion to expose the plush material on the inner peripheral surface and transition the mailer to a plush Christmas or holiday stocking, wherein a cuff extending around the top opening is folded over a top portion of the inner peripheral surface within the carrying volume such that when the carrying volume is inverted to define the Christmas or holiday stocking, the cuff forms a folded top portion of the Christmas or holiday stocking, and wherein the reusable mailer includes a writable or drawing surface on at least one of the outer peripheral surface or the inner peripheral surface.

2. The reusable mailer according to claim 1, wherein the plush material is made from a material that is configured to at least one of insulate, waterproof, or protect the package disposed within the carrying volume during mailing.

3. The reusable mailer according to claim 1, wherein the reusable mailer includes a writable or drawing surface on at least one of the outer peripheral surface or the inner peripheral surface.

4. The reusable mailer according to claim 1, wherein the plush material is configured as a craft-like material.

5. The reusable mailer according to claim 4, further comprising a plurality of indicia configured for attachment to the craft-like material to decorate the plush Christmas or holiday stocking.

* * * * *